(12) United States Patent
Suzuki et al.

(10) Patent No.: US 7,931,513 B2
(45) Date of Patent: Apr. 26, 2011

(54) MARINE PROPULSION SYSTEM

(75) Inventors: Takayoshi Suzuki, Shizuoka (JP);
Daisuke Nakamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 178 days.

(21) Appl. No.: 12/393,080

(22) Filed: Feb. 26, 2009

(65) Prior Publication Data

US 2009/0215334 A1 Aug. 27, 2009

(30) Foreign Application Priority Data

Feb. 27, 2008 (JP) ................. 2008-046614

(51) Int. Cl.
*B60W 10/04* (2006.01)
*B63H 21/21* (2006.01)
(52) U.S. Cl. ........................................ 440/86
(58) Field of Classification Search ............... 440/1, 49, 440/75, 86, 88 L
See application file for complete search history.

(56) References Cited

U.S. PATENT DOCUMENTS

| 3,587,511 | A | * | 6/1971 | Buddrus | ........... 440/5 |
| 4,125,039 | A | * | 11/1978 | Helm | ........... 477/111 |
| 2006/0213301 | A1 | | 9/2006 | Mizuguchi et al. | |

FOREIGN PATENT DOCUMENTS

JP  2006-264361 A  10/2006

* cited by examiner

*Primary Examiner* — Daniel V Venne
(74) *Attorney, Agent, or Firm* — Keating & Bennett, LLP

(57) ABSTRACT

A marine propulsion system includes an outboard motor including an engine, a propeller, a shift position switching mechanism, an oil pump, valves, and an ECU. The shift position switching mechanism includes hydraulic clutches arranged to change the connection state between the engine and the propeller. The shift position switching mechanism is switchable among forward, reverse, and neutral. A first valve opens and closes the communication between the oil pump and a first hydraulic clutch. A second valve opens and closes the communication between the oil pump and a second hydraulic clutch. A third valve opens and closes the communication between the oil pump and each of third and fourth valves.

13 Claims, 40 Drawing Sheets

○: Clutch engaged state    ×: Clutch disengaged state

| Name of component (reference numeral) | Clutch engaged state | | | Clutch disengaged state | | |
|---|---|---|---|---|---|---|
| Transmission ratio switching hydraulic clutch (53) | × | × | ×(○) | ○ | ○ | × |
| Second shift switching hydraulic clutch (61) | × | × | × | × | ○ | ○ |
| First shift switching hydraulic clutch (62) | ○ | ○ | × | × | × | × |
| One-way clutch (58) | Prevents reverse rotation | Permits normal rotation | Inoperative | Inoperative | Prevents reverse rotation | Permits normal rotation |
| Shift position | Low-speed forward | High-speed forward | Neutral | Neutral | Low-speed reverse | High-speed reverse |

FIG. 7

MARINE PROPULSION SYSTEM

BACKGROUND OF THE INVENTION

1. Field of the Invention

The present invention relates to a marine propulsion system.

2. Description of the Related Art

A technique for switching the shift position of an outboard motor by driving a shift position switching mechanism of the outboard motor with an electric actuator has been suggested as described in, for example, JP-A-2006-264361. The shift position switching mechanism described in JP-A-2006-264361 is disposed in what is called a shell-shaped portion in which a propeller shaft is disposed. The shift position switching mechanism has a dog clutch for shift position switching. In the shift position switching mechanism described in JP-A-2006-264361, the dog clutch is engaged or disengaged with the electric actuator to achieve a shift position change among forward, reverse, and neutral.

However, with the marine propulsion system described in JP-A-2006-264361, a shift position switching mechanism may fail while maneuvering a vessel.

SUMMARY OF THE INVENTION

In order to overcome the problems described above, preferred embodiments of the present invention provide a marine propulsion system which compensates for a shift position switching mechanism failure.

A marine propulsion system according to a preferred embodiment of the present invention includes a power source, a propeller, a shift position switching mechanism, an oil pump, a first valve, a second valve, a third valve, and a control device. The power source generates rotary force. The propeller is drivable by the power source.

The shift position switching mechanism is located between the power source and the propeller. The shift position switching mechanism has a first hydraulic clutch and a second hydraulic clutch arranged to change the connection state between the power source and the propeller. The shift position switching mechanism is switchable among a first shift position, a second shift position, and a neutral position. In the first shift position, the first hydraulic clutch is engaged and the second hydraulic clutch is disengaged. In the first shift position, the rotary force from the power source is transmitted to the propeller as rotary force in a first rotational direction. In the second shift position, the first hydraulic clutch is disengaged and the second hydraulic clutch is engaged. In the second shift position, the rotary force from the power source is transmitted to the propeller as rotary force in a second rotational direction opposite the first rotational direction. In the neutral position, both the first hydraulic clutch and the second hydraulic clutch are disengaged. In the neutral position, the rotary force from the power source is not substantially transmitted to the propeller.

The oil pump generates hydraulic pressure. The oil pump provides hydraulic pressure to engage and disengage the first valve and the second hydraulic clutch. The first valve is located between the oil pump and the first hydraulic clutch. The first valve opens and closes the communication between the oil pump and the first hydraulic clutch. The second valve is located between the oil pump and the second hydraulic clutch. The second valve opens and closes the communication between the oil pump and the second hydraulic clutch. The third valve is located between the oil pump and the first and second valves. The third valve opens and closes the communication between the oil pump and each of the first valve and the second valve. The control device controls the first valve, the second valve, and the third valve.

According to a preferred embodiment of the present invention, a marine propulsion system allows compensates for a shift position switching mechanism failure while maneuvering the vessel.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 7 is a table showing the engagement states of the first to third hydraulic clutches and the shift positions of the shift mechanism.

DETAILED DESCRIPTION OF THE PREFERRED EMBODIMENTS

Description is hereinafter made of a preferred embodiment of the present invention using an outboard motor 20 shown in FIG. 1 as a marine propulsion system. It should be noted that the following preferred embodiment is merely an example of one preferred form of the present invention. The present invention is not limited to the following preferred embodiment.

A marine propulsion system according to a preferred embodiment of the present invention may be what is called an inboard motor or what is called a stern drive. Stern drives are also called "inboard-outboard motors." A "stern drive" is a marine propulsion system at least the power source of which is mounted on a hull. "Stern drives" include engines also having components mounted on a hull other than the propulsion unit.

Figure 1:
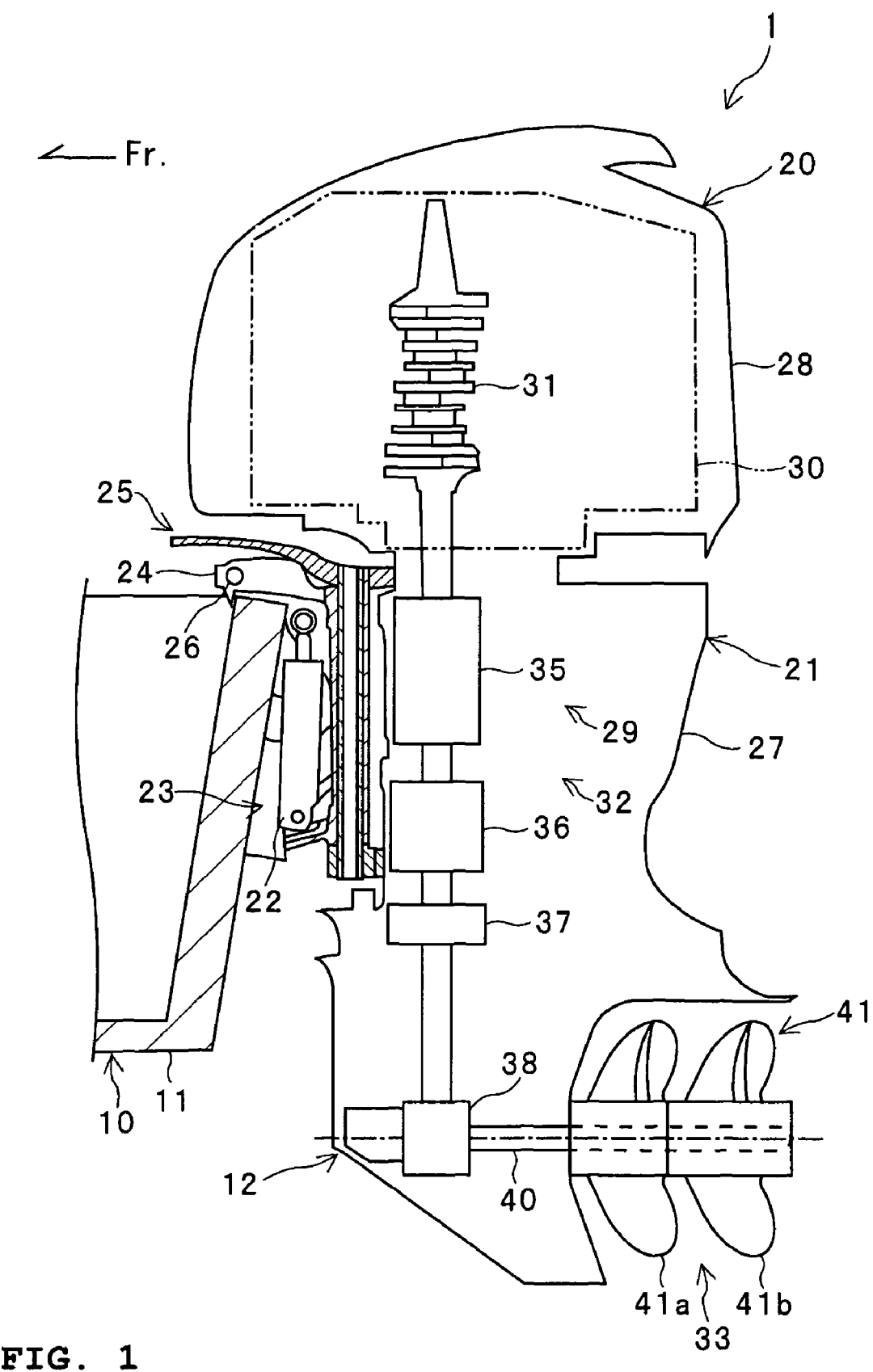
FIG. 1 is a partial cross-sectional view, as seen from one side, of a portion of the stern of a vessel according to a preferred embodiment of the present invention.

FIG. 1 is a schematic partial cross-sectional view, as seen from a side, of a portion of the stern 11 of a vessel 1 according to the present preferred embodiment. As shown in FIG. 1, the vessel 1 has a hull 10 and the outboard motor 20. The outboard motor 20 is attached to the stern 11 of the hull 10.

Outline of Configuration of Outboard Motor 20

The outboard motor 20 has an outboard motor body 21, a tilt-trim mechanism 22, and a bracket 23.

The bracket 23 has a mount bracket 24 and a swivel bracket 25. The mount bracket 24 is secured to the hull 10. The mount bracket 24 and the swivel bracket 25 are connected by a pivot shaft 26. The swivel bracket 25 is swingable about the pivot shaft 26 relative to the mount bracket 24.

The tilt-trim mechanism 22 has one or a plurality of hydraulic cylinders (not shown). The tilt-trim mechanism 22 is used to tilt and trim the outboard motor body 21. Specifically, the tilt-trim mechanism 22 is used to swing the swivel bracket 25 relative to the mount bracket 24.

The outboard motor body 21 has a casing 27, a cowling 28 and a propulsive force generating device 29. The cowling 28 is attached to an upper part of the casing 27. The propulsive force generating device 29 is disposed in the casing 27 and the cowling 28 except for a portion of a propulsion unit 33, which is described later.

Figure 2:
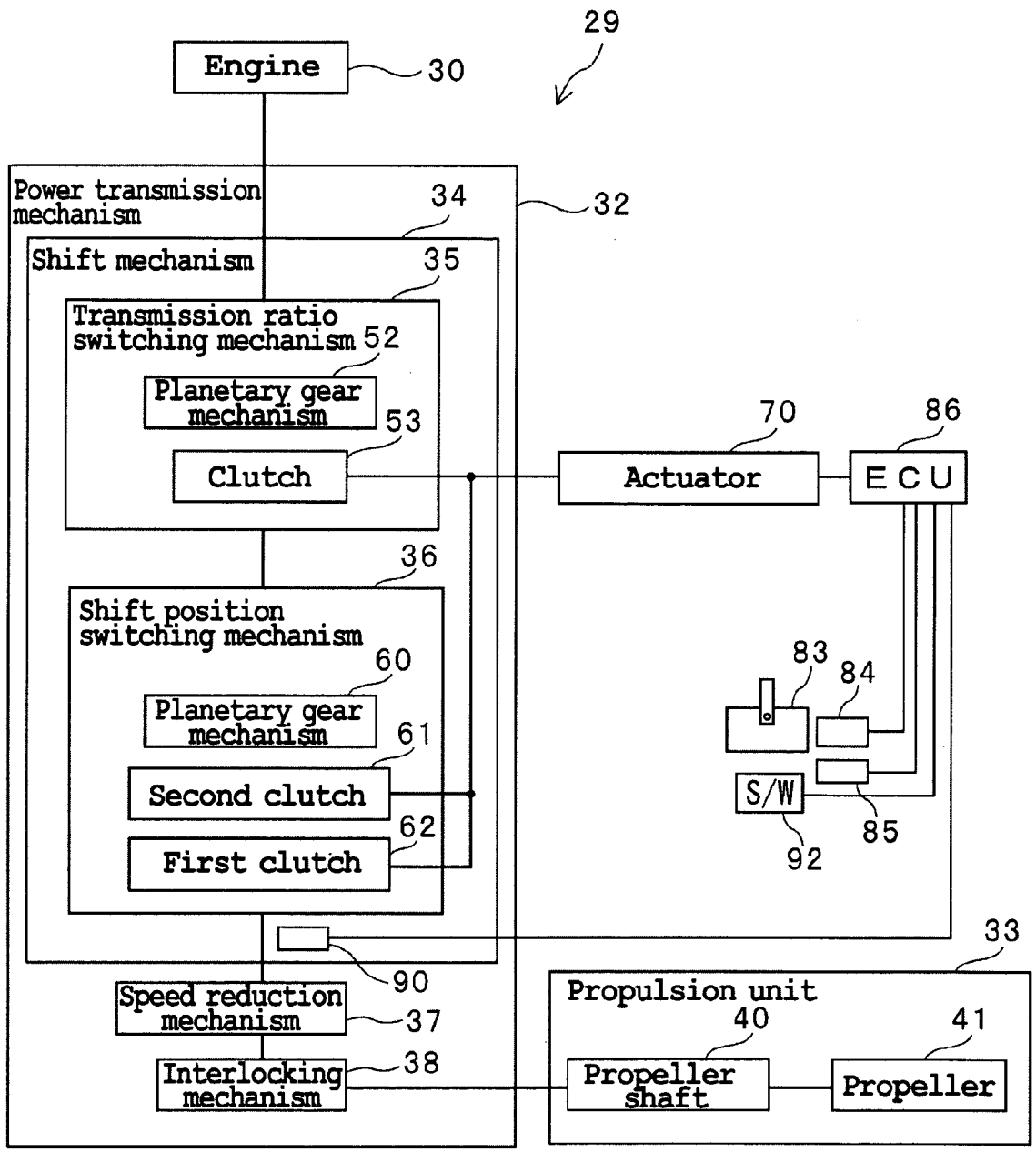
FIG. 2 is a schematic configuration diagram illustrating the configuration of a propulsive force generating device according to a preferred embodiment of the present invention.

As shown in FIG. 1 and FIG. 2, the propulsive force generating device 29 has an engine 30, a power transmission mechanism 32 and the propulsion unit 33.

In this preferred embodiment, an example in which the outboard motor 20 has the engine 30 as a power source is described. However, the power source is not particularly limited as long as it can generate rotary force. For example, the power source may be an electric motor.

Figure 5:
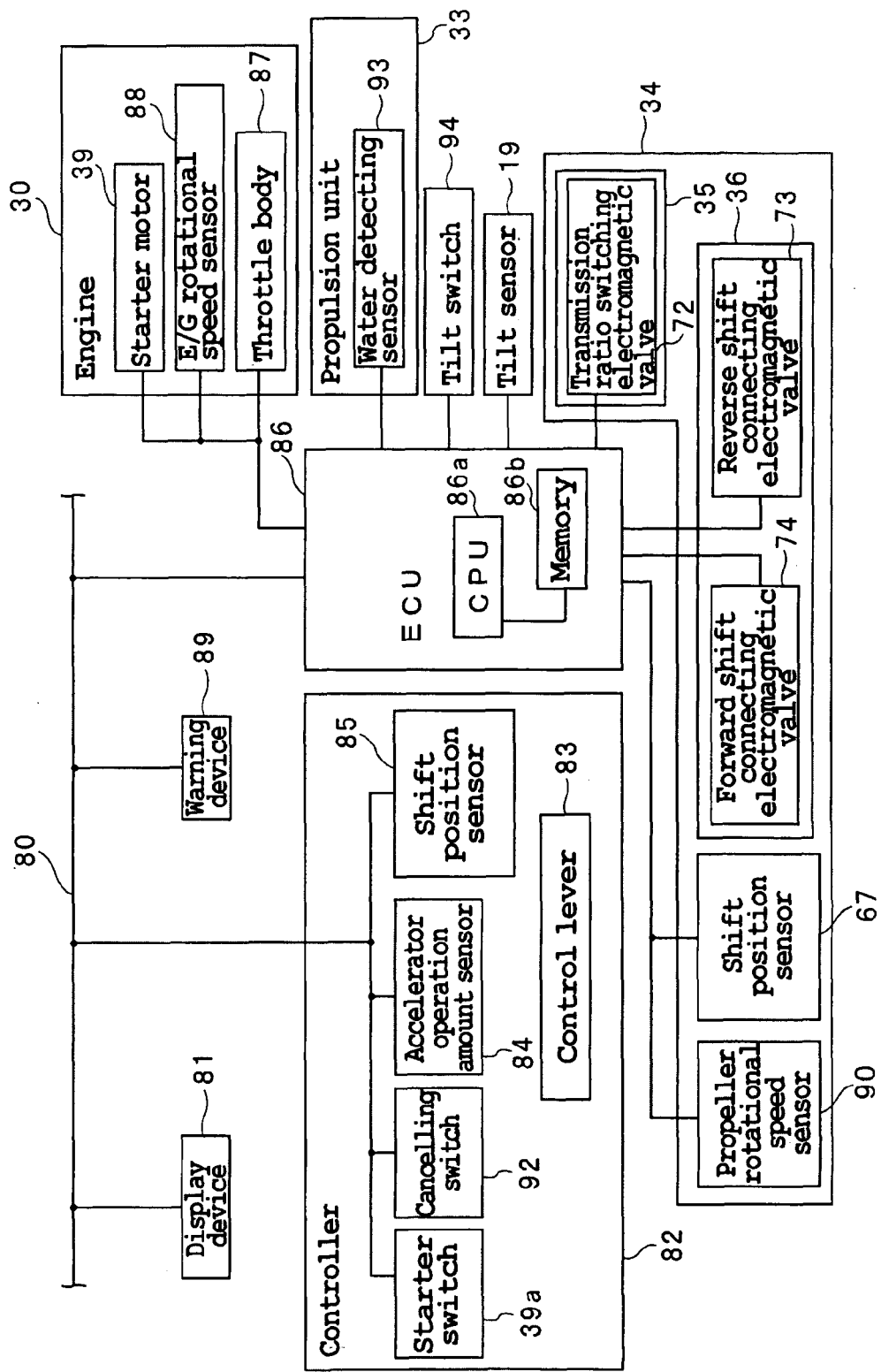
FIG. 5 is a control block diagram of the vessel.

The engine 30 is preferably a fuel injection engine having a throttle body 87 as shown in FIG. 5. In the engine 30, the engine rotational speed and the engine output are adjusted by adjusting the throttle opening. The engine 30 generates rotary force. As shown in FIG. 1, the engine 30 has a crankshaft 31. The engine 30 outputs the generated rotary force through the crankshaft 31.

The power transmission mechanism 32 is located between the engine 30 and the propulsion unit 33. The power transmission mechanism 32 transmits the rotary force generated by the engine 30 to the propulsion unit 33. The power transmission mechanism 32 has a shift mechanism 34, a speed reduction mechanism 37, and an interlocking mechanism 38.

Figure 3:
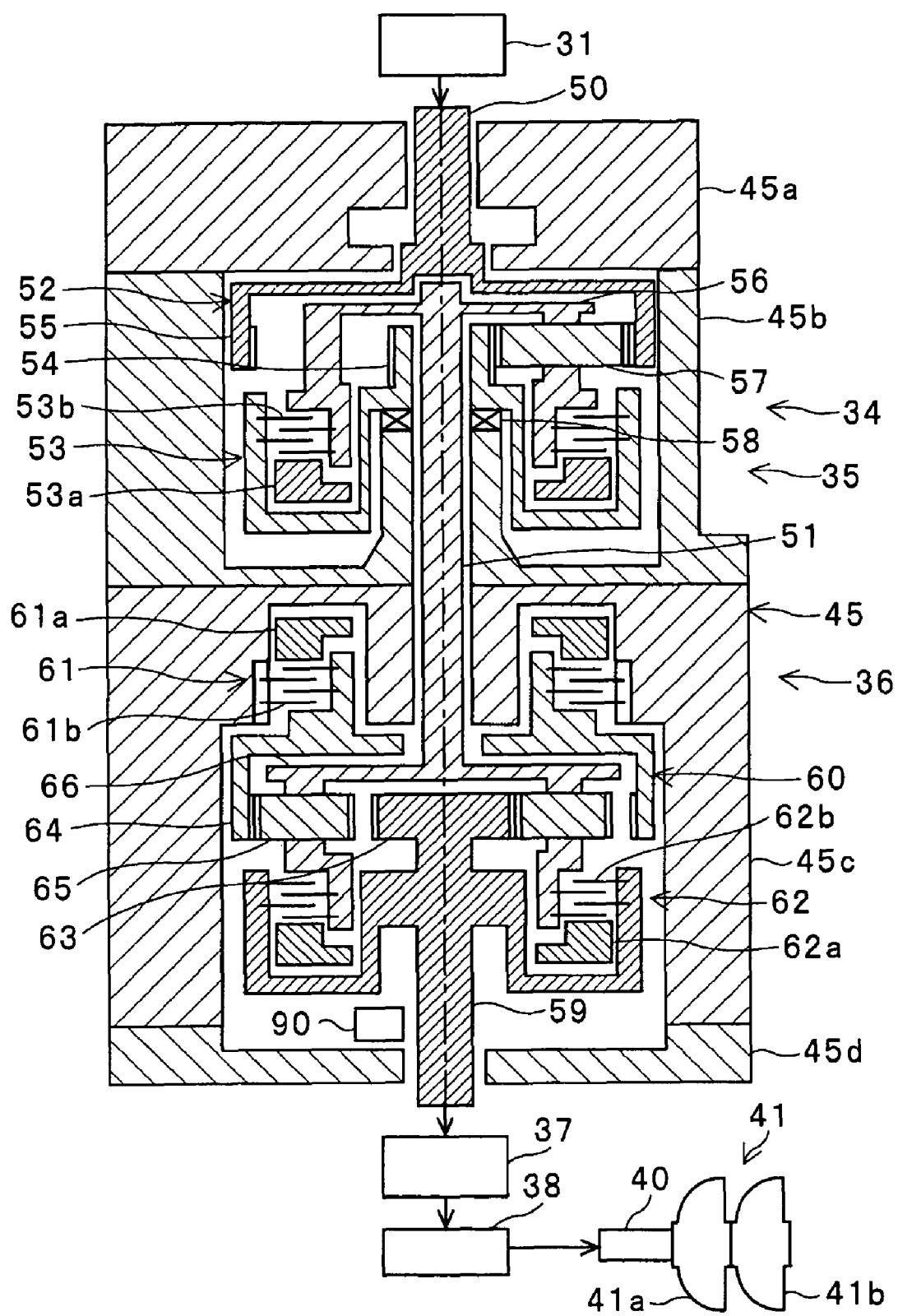
FIG. 3 is a schematic cross-sectional view of a shift mechanism according to a preferred embodiment of the present invention.

The shift mechanism 34 is connected to the crankshaft 31 of the engine 30. The rotary force of the engine 30 is input from the crankshaft 31 to the shift mechanism 34. As shown in FIG. 2 and FIG. 3, the shift mechanism 34 has a transmission ratio switching mechanism 35, and a shift position switching mechanism 36.

The transmission ratio switching mechanism 35 is located between the engine 30 and the shift position switching mechanism 36. The transmission ratio switching mechanism 35 switches the transmission ratio between the engine 30 and the propulsion unit 33 between a high-speed transmission ratio (HIGH) and a low-speed transmission ratio (LOW). Here, the "high-speed transmission ratio" means a ratio of the output rotational speed to the input rotational speed which is relatively large. On the other hand, the "low-speed transmission ratio" means a ratio of the output rotational speed to the input rotational speed which is relatively small.

The shift position switching mechanism 36 is located between the transmission ratio switching mechanism 35 and the propulsion unit 33. The shift position switching mechanism 36 is switchable among three shift positions: forward, reverse, and neutral.

The speed reduction mechanism 37 is located between the shift mechanism 34 and the propulsion unit 33. The speed reduction mechanism 37 transmits the rotary force from the shift mechanism 34 to the propulsion unit 33 at a reduced speed. The structure of the speed reduction mechanism 37 is not particularly limited. The speed reduction mechanism 37 may be a mechanism having a planetary gear mechanism. Also, the speed reduction mechanism 37 may be a mechanism having a reduction gear pair.

The interlocking mechanism 38 is located between the speed reduction mechanism 37 and the propulsion unit 33. To the interlocking mechanism 38 is transmitted the rotation of a third power-transmitting shaft 59 as the output shaft of the shift position switching mechanism 36 shown in FIG. 3 via the speed reduction mechanism 37. The interlocking mechanism 38 transmits the rotation transmitted thereto to a propeller shaft 40.

Specifically, the interlocking mechanism 38 has a bevel gear set (not shown). The bevel gear set changes the direction of the rotary force from the speed reduction mechanism 37 and transmits it to the propulsion unit 33.

The propulsion unit 33 converts the rotary force generated by the engine 30 into propulsive force. The propulsion unit 33 has the propeller shaft 40 and a propeller 41. The propeller 41 is attached to the propeller shaft 40. The propeller shaft 40 extends in a direction different from the direction in which the third power-transmitting shaft 59 as the output shaft of the shift position switching mechanism 36 shown in FIG. 3 extends. Specifically, the direction in which the third power-transmitting shaft 59 extends and the direction in which the propeller shaft 40 extends are generally perpendicular to each other. The propeller shaft 40 transmits the rotary force from the interlocking mechanism 38 to the propeller 41.

As shown in FIG. 1, the propeller 41 preferably includes a plurality of propellers; a first propeller 41a and a second propeller 41b. The spiral direction of the first propeller 41a and the spiral direction of the second propeller 41b are preferably opposite to each other. When the rotary force output from the power transmission mechanism 32 is in the normal rotational direction, the first propeller 41a and the second propeller 41b rotate in opposite directions and produce forward propulsive force. In this case, the shift position is forward. When the rotary force output from the power transmission mechanism 32 is in the reverse rotational direction, each of the first propeller 41a and the second propeller 41b rotates in the opposite direction from that in which it rotates when the vessel 1 travels forward. As a result, reverse propulsive force is generated. In this case, the shift position is reverse.

The propeller 41 may include a single propeller or more than two propellers.

Details of Structure of Shift Mechanism 34

Referring primarily to FIG. 3, the structure of the shift mechanism 34 in this preferred embodiment is next described in detail. FIG. 3 schematically illustrates the shift mechanism 34. Thus, the structure of the shift mechanism 34 shown in FIG. 3 is not precisely identical to the actual structure of the shift mechanism 34.

The shift mechanism 34 has a shift case 45. A planetary gear mechanism 52, a transmission ratio switching hydraulic clutch 53, a planetary gear mechanism 60, a first shift switching hydraulic clutch 62, a second shift switching hydraulic clutch 61 and so on, which are described later, are housed in the shift case 45.

The shift case 45 has a generally cylindrical external shape. The shift case 45 has a first case 45a, a second case 45b, a third case 45c, and a fourth case 45d. The planetary gear mechanism 52 and the transmission ratio switching hydraulic clutch 53 are disposed in a space defined by the first case 45a and the second case 45b. The planetary gear mechanism 60, the first shift switching hydraulic clutch 62, and the second shift switching hydraulic clutch 61 are disposed in a space defined by the third case 45c and the fourth case 45d. The first case 45a, the second case 45b, the third case 45c, and the fourth case 45d are integrally secured to each other preferably by bolts or other fastening or connecting members.

The space inside the shift case 45 is filled with oil. The oil lubricates and seals sliding parts of the shift mechanism 34. The oil also prevents entrance of water into the shift case 45.

Transmission Ratio Switching Mechanism 35

The transmission ratio switching mechanism 35 has a first power-transmitting shaft 50, a second power-transmitting shaft 51, the planetary gear mechanism 52 as a speed change gear set, and the transmission ratio switching hydraulic clutch 53.

The planetary gear mechanism 52 transmits the rotation of the first power-transmitting shaft 50 to the second power-transmitting shaft 51 at the low-speed transmission ratio (LOW) or the high-speed transmission ratio (HIGH). The transmission ratio of the planetary gear mechanism 52 is switched by selectively engaging and disengaging the transmission ratio switching hydraulic clutch 53.

The first power-transmitting shaft 50 and the second power-transmitting shaft 51 are disposed coaxially with each other. The first power-transmitting shaft 50 is rotatably supported by the first case 45a. The second power-transmitting shaft 51 is rotatably supported by the second case 45b and the third case 45c. The first power-transmitting shaft 50 is connected to the crankshaft 31. The first power-transmitting shaft 50 is also connected to the planetary gear mechanism 52.

The planetary gear mechanism 52 has a sun gear 54, a ring gear 55, a carrier 56, and a plurality of planetary gears 57. The ring gear 55 has a generally cylindrical shape. The ring gear 55 has teeth formed on its inner periphery which are in meshing engagement with the planetary gears 57. The ring gear 55 is connected to the first power-transmitting shaft 50. The ring gear 55 is rotatable together with the first power-transmitting shaft 50.

The sun gear 54 is located inside the ring gear 55. The sun gear 54 and the ring gear 55 rotate coaxially with each other. The sun gear 54 is attached to the second case 45b via a one-way clutch 58. The one-way clutch 58 permits rotation in the normal rotational direction but prevents rotation in the reverse rotational direction. Thus, the sun gear 54 is rotatable in the normal rotational direction but not in the reverse rotational direction.

The planetary gears 57 are located between the sun gear 54 and the ring gear 55. Each of the planetary gears 57 is in meshing engagement with both the sun gear 54 and the ring gear 55. Each of the planetary gears 57 is rotatably supported by the carrier 56. Thus, the planetary gears 57 revolve about the axis of the first power-transmitting shaft 50 at the same speed while rotating about their own axis.

In this specification, the term "rotate" means for a member to rotate about an axis lying in it, and the term "revolve" means for a member to travel about an axis lying outside of it.

The carrier 56 is connected to the second power-transmitting shaft 51. The carrier 56 is rotatable together with the second power-transmitting shaft 51.

The transmission ratio switching hydraulic clutch 53 is located between the carrier 56 and the sun gear 54. In this preferred embodiment, the transmission ratio switching hydraulic clutch 53 preferably is a wet multi-plate clutch. In the present invention, however, the transmission ratio switching hydraulic clutch 53 is not limited to a wet multi-plate clutch. The transmission ratio switching hydraulic clutch 53 may be a dry multi-plate clutch or may be a dry single-plate clutch, or what is called a dog clutch, for example.

In this specification, the term "multi-plate clutch" means a clutch having a first member and a second member rotatable relative to each other, one or a plurality of first plates rotatable together with the first member, and one or a plurality of second plates rotatable together with the second member, in which the rotation of the first member and the second member is prevented when the first plate(s) and the second plate(s) are pressed against each other. In this specification, the term "clutch" is not limited to a component disposed between an input shaft into which rotary force is input and an output shaft from which rotary force is output for engaging and disengaging the input shaft and the output shaft.

The transmission ratio switching hydraulic clutch 53 has a hydraulic cylinder 53a, and a plate set 53b including at least one clutch plate and at least one friction plate. When the cylinder 53a is driven, the plate set 53b is brought into a compressed state. Thus, the transmission ratio switching hydraulic clutch 53 is brought into an engaged state. When the cylinder 53a is not being driven, the plate set 53b is in an uncompressed state. Thus, the transmission ratio switching hydraulic clutch 53 is in a disengaged state.

When the transmission ratio switching hydraulic clutch 53 is in the engaged state, the sun gear 54 and the carrier 56 are fixed to each other. Thus, when the planetary gears 57 rotate, the sun gear 54 and the carrier 56 rotate together.

Shift Position Switching Mechanism 36

The shift position switching mechanism 36 is switchable among three shift positions: forward, reverse, and neutral.

In this specification, the term "neutral" means a shift position in which the rotary force of the input shaft of the shift position switching mechanism 36 is not substantially transmitted to the output shaft of the shift position switching mechanism 36. The term "forward" means a shift position in which the rotary force of the input shaft of the shift position switching mechanism 36 is transmitted to the output shaft of the shift position switching mechanism 36, thereby rotating the output shaft of the shift position switching mechanism 36 in the forward direction. The term "reverse" means a shift position in which the rotary force of the input shaft of the shift position switching mechanism 36 is transmitted to the output shaft of the shift position switching mechanism 36, thereby rotating the output shaft of the shift position switching mechanism 36 in the reverse direction.

When the shift position switching mechanism 36 is in "forward" or "reverse", the rotational speed of the output shaft of the shift position switching mechanism 36 may be the same as or different from the rotational speed of the input shaft of the shift position switching mechanism 36. Also, when the rotational speed of the input shaft of the shift position switching mechanism 36 is the same, the rotational speed of the output shaft of the shift position switching mechanism 36 at a time when the shift position switching mechanism 36 is in "forward" and the rotational speed of the output shaft of the shift position switching mechanism 36 at a time when the shift position switching mechanism 36 is in "reverse" may be the same or different from each other.

Specifically, in this preferred embodiment, the ratio between the rotational speed of the second power-transmitting shaft 51 as the input shaft of the shift position switching mechanism 36 and the rotational speed of the third power-transmitting shaft 59 as the output shaft of the shift position switching mechanism 36 in the case where the shift position switching mechanism 36 is in forward is substantially equal to that in the case where the shift position switching mechanism 36 is in reverse. More specifically, the ratio between the rotational speed of the second power-transmitting shaft 51 and the rotational speed of the third power-transmitting shaft 59 in the case where the shift position switching mechanism 36 is in forward is set to a value slightly smaller than that in the case where the shift position switching mechanism 36 is in reverse.

More specifically, in this preferred embodiment, examples of the approximate ratios between the rotational speed of the first power-transmitting shaft 50 and the rotational speed of the third power-transmitting shaft 59 are preferably as follows.

High-speed forward: 1:1, speed reduction ratio 1
High-speed reverse: 1:1.08, speed reduction ratio 0.93
Low-speed forward: 1:0.77, speed reduction ratio 1.3
Low-speed reverse: 1:0.83, speed reduction ratio 1.21

The shift position switching mechanism 36 has the second power-transmitting shaft 51, the third power-transmitting shaft 59 as an output shaft, the planetary gear mechanism 60 as a rotational direction switching mechanism, the second shift switching hydraulic clutch 61, and the first shift switching hydraulic clutch 62.

The planetary gear mechanism 52 switches the direction of rotation of the third power-transmitting shaft 59 with respect to the direction of rotation of the second power-transmitting shaft 51. Specifically, the planetary gear mechanism 52 transmits the rotary force of the second power-transmitting shaft 51 to the third power-transmitting shaft 59 as rotary force in the normal or reverse rotational direction. The rotational direction of the rotary force transmitted by the planetary gear mechanism 52 is switched by selectively engaging and disengaging the second shift switching hydraulic clutch 61 and the first shift switching hydraulic clutch 62.

The third power-transmitting shaft 59 is rotatably supported by the third case 45c and the fourth case 45d. The second power-transmitting shaft 51 and the third power-transmitting shaft 59 are disposed coaxially with each other. In this preferred embodiment, the shift switching hydraulic clutches 61 and 62 are preferably wet multi-plate clutches. The shift switching hydraulic clutches 61 and 62 may be dry multi-plate clutches or dog clutches, though.

The second power-transmitting shaft 51 is a member shared by the transmission ratio switching mechanism 35 and the shift position switching mechanism 36.

The planetary gear mechanism 60 has a sun gear 63, a ring gear 64, a plurality of planetary gears 65, and a carrier 66.

The carrier 66 is connected to the second power-transmitting shaft 51. The carrier 66 is rotatable together with the second power-transmitting shaft 51. Thus, when the second power-transmitting shaft 51 rotates, the carrier 66 rotates and the planetary gears 65 revolve at the same speed.

The planetary gears 65 mesh with the ring gear 64 and the sun gear 63. The second shift switching hydraulic clutch 61 is located between the ring gear 64 and the third case 45c. The second shift switching hydraulic clutch 61 has a hydraulic cylinder 61a, and a plate set 61b including at least one clutch plate and at least one friction plate. When the hydraulic cylinder 61a is driven, the plate set 61b is brought into a compressed state. Thus, the second shift switching hydraulic clutch 61 is brought into an engaged state. As a result, the ring gear 64 is fixed relative to the third case 45c and becomes incapable of rotating. When the hydraulic cylinder 61a is not being driven, the plate set 61b is in an uncompressed state. Thus, the second shift switching hydraulic clutch 61 is in a disengaged state. As a result, the ring gear 64 is not stationary but rotatable relative to the third case 45c.

The first shift switching hydraulic clutch 62 is located between the carrier 66 and the sun gear 63. The first shift switching hydraulic clutch 62 has a hydraulic cylinder 62a, and a plate set 62b including at least one clutch plate and at least one friction plate. When the hydraulic cylinder 62a is driven, the plate set 62b is brought into a compressed state. Thus, the first shift switching hydraulic clutch 62 is brought into an engaged state. As a result, the carrier 66 and the sun gear 63 rotate together. When the hydraulic cylinder 62a is not being driven, the plate set 62b is in an uncompressed state. Thus, the first shift switching hydraulic clutch 62 is in a disengaged state. As a result, the ring gear 64 and the sun gear 63 are rotatable relative to each other.

As shown in FIG. 2, the shift mechanism 34 is controlled by an electronic control unit (ECU) 86 as a control device and an actuator 70. Specifically, the engagement and disengagement of the transmission ratio switching hydraulic clutch 53, the second shift switching hydraulic clutch 61 and the first shift switching hydraulic clutch 62 are effected by the actuator 70. The actuator 70 is controlled by the ECU 86.

Figure 4:
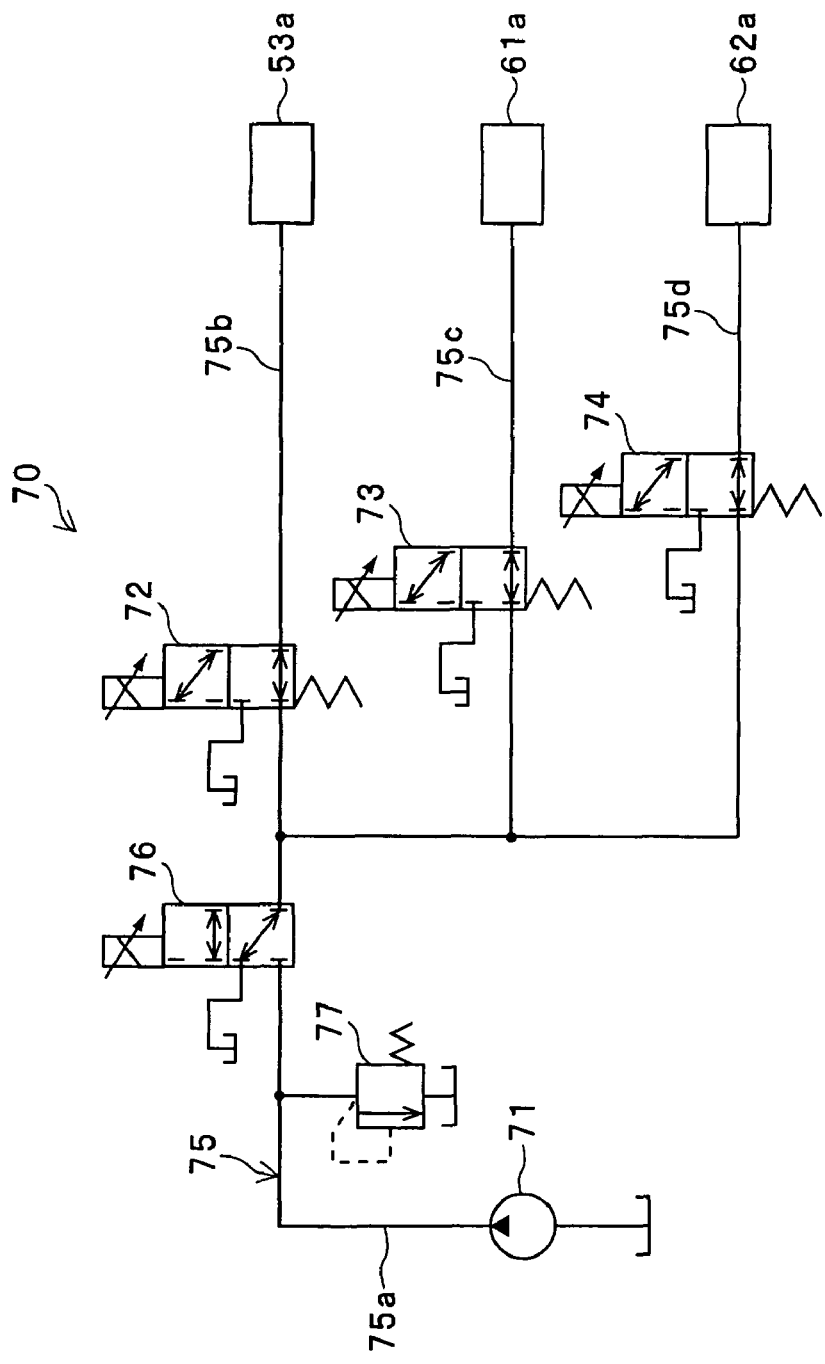
FIG. 4 is an oil circuit diagram according to a preferred embodiment of the present invention.

FIG. 4 illustrates the detailed configuration of the actuator 70. The actuator 70 has an oil pump 71, an oil passage 75, a transmission ratio switching electromagnetic valve 72, a reverse shift connecting electromagnetic valve 73, a forward shift connecting electromagnetic valve 74, a pump-side electromagnetic valve 76, and a relief valve 77.

In this preferred embodiment, the oil pump 71 is driven by the engine 30. Specifically, the oil pump 71 is driven by rotation of the crankshaft 31. In the present invention, however, the oil pump may not necessarily be driven by a power source for supplying power to the propeller. A power source for driving the oil pump may be provided in addition to the power source for supplying power to the propeller. The power source for driving the oil pump may be an internal combustion engine or an electric motor, for example.

The oil pump 71 is connected to the hydraulic cylinders 53a, 61a, and 62a by the oil passage 75. The oil passage includes a first oil passage 75a, a second oil passage 75b, a third oil passage 75c, and a fourth oil passage 75d. The first oil passage 75a is connected to the oil pump 71. The second oil passage 75b connects the first oil passage 75a and the hydraulic cylinder 53a. The third oil passage 75c connects the first oil passage 75a and the hydraulic cylinder 61a. The fourth oil passage 75d connects the first oil passage 75a and the hydraulic cylinder 62a.

The transmission ratio switching electromagnetic valve 72 is located between the oil pump 71 and the hydraulic cylinder 53a. Specifically, the transmission ratio switching electromagnetic valve 72 is interposed in the second oil passage 75b. The hydraulic pressure in the hydraulic cylinder 53a is adjusted by the transmission ratio switching electromagnetic valve 72, thereby adjusting the engaging force of the transmission ratio switching hydraulic clutch 53.

The reverse shift connecting electromagnetic valve 73 is located between the oil pump 71 and the hydraulic cylinder 61a. Specifically, the reverse shift connecting electromagnetic valve 73 is interposed in the third oil passage 75c. The hydraulic pressure in the hydraulic cylinder 61a is adjusted by the reverse shift connecting electromagnetic valve 73, thereby adjusting the engaging force of the second shift switching hydraulic clutch 61.

The forward shift connecting electromagnetic valve 74 is located between the oil pump 71 and the hydraulic cylinder 62a. Specifically, the forward shift connecting electromagnetic valve 74 is interposed in the fourth oil passage 75d. The hydraulic pressure in the hydraulic cylinder 62a is adjusted by the forward shift connecting electromagnetic valve 74, thereby adjusting the engaging force of the first shift switching hydraulic clutch 62.

In this preferred embodiment, each of the transmission ratio switching electromagnetic valve 72, the reverse shift connecting electromagnetic valve 73, and the forward shift connecting electromagnetic valve 74 preferably is a normally high electromagnetic valve, for example. Thus, each of the transmission ratio switching electromagnetic valve 72, the reverse shift connecting electromagnetic valve 73, and the forward shift connecting electromagnetic valve 74 opens the oil passage 75 when no voltage is applied thereto. When a voltage is applied to the transmission ratio switching electromagnetic valve 72, the reverse shift connecting electromagnetic valve 73, and the forward shift connecting electromagnetic valve 74, the flow passage area of the oil passage 75 is reduced such that the oil passage 75 has a flow passage area proportional to the applied voltage.

In the present invention, however, each of the transmission ratio switching electromagnetic valve 72, the reverse shift connecting electromagnetic valve 73, and the forward shift connecting electromagnetic valve 74 is not limited to a normally high electromagnetic valve. Each of the transmission ratio switching electromagnetic valve 72, the reverse shift connecting electromagnetic valve 73, and the forward shift connecting electromagnetic valve 74 may be a normally low electromagnetic valve, for example.

The pump-side electromagnetic valve 76 is located between the oil pump 71 and the transmission ratio switching electromagnetic valve 72, the reverse shift connecting electromagnetic valve 73, and the forward shift connecting electromagnetic valve 74. Specifically, the pump-side electromagnetic valve 76 is interposed in the first oil passage 75a. Thus, when the pump-side electromagnetic valve 76 is closed, the supply of hydraulic pressure to the second oil passage 75b, the third oil passage 75c, and the fourth oil passage 75d is cut off. Therefore, when the pump-side electromagnetic valve 76 is closed, the supply of hydraulic pressure to the hydraulic clutches 53, 61 and 62 is cut off irrespective of the states of the transmission ratio switching electromagnetic valve 72, the reverse shift connecting electromagnetic valve 73, and the forward shift connecting electromagnetic valve 74. Thus, the pump-side electromagnetic valve 76 is normally open when a main switch 96 is on.

In this preferred embodiment, the pump-side electromagnetic valve 76 preferably is a normally low electromagnetic valve. In the present invention, however, the pump-side electromagnetic valve 76 is not limited to a normally low electromagnetic valve. The pump-side electromagnetic valve 76 may be a normally high electromagnetic valve, for example.

The relief valve 77 is located between the pump-side electromagnetic valve 76 and the oil pump 71. Specifically, the relief valve 77 is interposed in the first oil passage 75a. The upper limit of the hydraulic pressure in the second oil passage 75b, the third oil passage 75c, and the fourth oil passage 75d is determined by the relief valve 77.

Each of the transmission ratio switching electromagnetic valve 72, the reverse shift connecting electromagnetic valve 73, the forward shift connecting electromagnetic valve 74, and the pump-side electromagnetic valve 76 is capable of gradually changing the cross-sectional passage area of the oil passage 75. Thus, by using the transmission ratio switching electromagnetic valve 72, the reverse shift connecting electromagnetic valve 73, the forward shift connecting electromagnetic valve 74, and the pump-side electromagnetic valve 76, the pressing forces of the hydraulic cylinders 53a, 61a, and 62a can be gradually changed. Therefore, the engaging forces of the hydraulic clutches 53, 61, and 62 can be gradually changed. Thus, the ratio of the rotational speed of the third power-transmitting shaft 59 to the rotational speed of the second power-transmitting shaft 51 can be adjusted. As a result, the ratio of the rotational speed of the third power-transmitting shaft 59 as the output shaft to the rotational speed of the first power-transmitting shaft 50 as the input shaft can be adjusted substantially and continuously.

In this preferred embodiment, each of the transmission ratio switching electromagnetic valve 72, the reverse shift connecting electromagnetic valve 73, the forward shift connecting electromagnetic valve 74, and the pump-side electromagnetic valve 76 is preferably a PWM (Pulse Width Modulation) controlled solenoid valve, for example. Each of the transmission ratio switching electromagnetic valve 72, the reverse shift connecting electromagnetic valve 73, the forward shift connecting electromagnetic valve 74, and the pump-side electromagnetic valve 76 may be a valve other than a PWM controlled solenoid valve, though. For example, each of the transmission ratio switching electromagnetic valve 72, the reverse shift connecting electromagnetic valve 73, the forward shift connecting electromagnetic valve 74, and the pump-side electromagnetic valve 76 preferably may be an on-off controlled solenoid valve, for example.

Transmission Ratio Changing Operation of Shift Mechanism 34

Referring primarily to FIG. 3 and FIG. 7, the transmission ratio changing operation of the shift mechanism 34 is next described in detail. FIG. 7 is a table showing the engagement states of the hydraulic clutches 53, 61, and 62 and the shift positions of the shift mechanism 34. In the shift mechanism 34, the shift position is switched by selectively engaging and disengaging the first to third hydraulic clutches 53, 61, and 62.

Switching Between Low-Speed Transmission Ratio and High-Speed Transmission Ratio The switching between the low-speed transmission ratio and the high-speed transmission ratio is accomplished by the transmission ratio switching mechanism 35. Specifically, the low-speed transmission ratio and the high-speed transmission ratio are switched by operation of the transmission ratio switching hydraulic clutch 53. More specifically, when the transmission ratio switching hydraulic clutch 53 is in the disengaged state, the transmission ratio of the transmission ratio switching mechanism 35 is the "low-speed transmission ratio." When the transmission ratio switching hydraulic clutch 53 is in the engaged state, the transmission ratio of the transmission ratio switching mechanism 35 is the "high-speed transmission ratio."

As shown in FIG. 3, the ring gear 55 is connected to the first power-transmitting shaft 50. Thus, when the first power-transmitting shaft 50 rotates, the ring gear 55 rotates in the normal rotational direction. Here, when the transmission ratio switching hydraulic clutch 53 is in the disengaged state, the carrier 56 and the sun gear 54 are rotatable relative to each other. Thus, the planetary gears 57 rotate and revolve. As a result, the sun gear 54 is urged to rotate in the reverse rotational direction.

However, as shown in FIG. 7, the one-way clutch 58 prevents the sun gear 54 from rotating in the reverse rotational direction. Thus, the sun gear 54 is held stationary by the one-way clutch 58. As a result, the rotation of the ring gear 55 causes the planetary gears 57 to revolve between the sun gear 54 and the ring gear 55, causing the second power-transmitting shaft 51 to rotate together with the carrier 56. In this case, because the planetary gears 57 both revolve and rotate, the rotation of the first power-transmitting shaft 50 is transmitted at a reduced speed to the second power-transmitting shaft 51. Therefore, the transmission ratio switching mechanism 35 has a "low-speed transmission ratio."

When the transmission ratio switching hydraulic clutch 53 is in the engaged state, the planetary gears 57 and the sun gear 54 rotate together. Thus, the rotation of the planetary gears 57 is inhibited. Therefore, the rotation of the ring gear 55 causes the planetary gears 57, the carrier 56 and the sun gear 54 to rotate in the normal rotational direction at the same rotational speed as the ring gear 55. Here, as shown in FIG. 7, the one-way clutch 58 permits the sun gear 54 to rotate in the normal rotational direction. As a result, the first power-transmitting shaft 50 and the second power-transmitting shaft 51 rotate in the normal rotational direction at the same rotational speed. In other words, the rotary force of the first power-transmitting shaft 50 is transmitted at the same rotational speed and in the same rotational direction to the second power-transmitting shaft 51. Therefore, the transmission ratio switching mechanism 35 has a "high-speed transmission ratio."

Switching Among Forward, Reverse, and Neutral

The switching among forward, reverse, and neutral is accomplished by the shift position switching mechanism 36. Specifically, the switching among forward, reverse, and neutral is accomplished by operation of the second shift switching hydraulic clutch 61 and the first shift switching hydraulic clutch 62.

When the second shift switching hydraulic clutch 61 is in the disengaged state and the first shift switching hydraulic clutch 62 is in the engaged state, the shift position switching mechanism 36 is in "forward." When the second shift switching hydraulic clutch 61 is in the disengaged state, the ring gear 64 is rotatable relative to the shift case 45. When the first shift switching hydraulic clutch 62 is in the engaged state, the carrier 66, the sun gear 63, and the third power-transmitting shaft 59 rotate together. Thus, when the second shift switching hydraulic clutch 61 is in the disengaged state and the first shift switching hydraulic clutch 62 is in the engaged state, the second power-transmitting shaft 51, the carrier 66, the sun gear 63, and the third power-transmitting shaft 59 rotate together in the normal rotational direction. That is, the shift position switching mechanism 36 is in "forward."

When the second shift switching hydraulic clutch 61 is in the engaged state and the first shift switching hydraulic clutch 62 is in the disengaged state, the shift position switching mechanism 36 is in "reverse." When the second shift switching hydraulic clutch 61 is in the engaged state and the first shift switching hydraulic clutch 62 is in the disengaged state, the ring gear 64 is prevented from rotating by the shift case 45. On the other hand, the sun gear 63 is rotatable relative to the carrier 66. Thus, when the second power-transmitting shaft 51 rotates in the normal rotational direction, the planetary gears 65 revolve while rotating. As a result, the sun gear 63 and the third power-transmitting shaft 59 rotate in the reverse rotational direction. That is, the shift position switching mechanism 36 is in "reverse."

When both the second shift switching hydraulic clutch 61 and the first shift switching hydraulic clutch 62 are in the disengaged state, the shift position switching mechanism 36 is in "neutral." When both the second shift switching hydraulic clutch 61 and the first shift switching hydraulic clutch 62 are in the disengaged state, the planetary gear mechanism 60 rotate idly. Thus, the rotation of the second power-transmitting shaft 51 is not transmitted to the third power-transmitting shaft 59. That is, the shift position switching mechanism 36 is in "neutral."

The switching of the transmission ratio in the transmission ratio switching mechanism 35 and the switching of the shift position in the shift position switching mechanism 36 are accomplished as described above. Thus, as shown in FIG. 7, when the transmission ratio switching hydraulic clutch 53 and the second shift switching hydraulic clutch 61 are in the disengaged state and the first shift switching hydraulic clutch 62 is in the engaged state, the shift position of the shift mechanism 34 is "low-speed forward." When the transmission ratio switching hydraulic clutch 53 and the first shift switching hydraulic clutch 62 are in the engaged state and the second shift switching hydraulic clutch 61 is in the disengaged state, the shift position of the shift mechanism 34 is "high-speed forward." When both the second shift switching hydraulic clutch 61 and the first shift switching hydraulic clutch 62 are in the disengaged state, the shift position of the shift mechanism 34 is "neutral" irrespective of the engagement state of the transmission ratio switching hydraulic clutch 53. When the transmission ratio switching hydraulic clutch 53 and the first shift switching hydraulic clutch 62 are in the disengaged state and the second shift switching hydraulic clutch 61 is in the engaged state, the shift position of the shift mechanism 34 is "low-speed reverse." When the transmission ratio switching hydraulic clutch 53 and the second shift switching hydraulic clutch 61 are in the engaged state and the first shift switching hydraulic clutch 62 is in the disengaged state, the shift position of the shift mechanism 34 is "high-speed reverse."

Control Block of Vessel 1

Referring primarily to FIG. 5, the control block of the vessel 1 is next described.

Referring first to FIG. 5, the control block of the outboard motor 20 is described. The outboard motor 20 is provided with the ECU 86 as a control device. Specifically, the ECU 86 is located in the cowling 28 of the outboard motor 20. All the mechanisms in the outboard motor 20 are controlled by the ECU 86.

The ECU 86 is not necessarily located in the outboard motor 20. The ECU 86 may be located in a controller 82. The ECU 86 may be located in both the controller 82 and the outboard motor 20.

Figure 6:
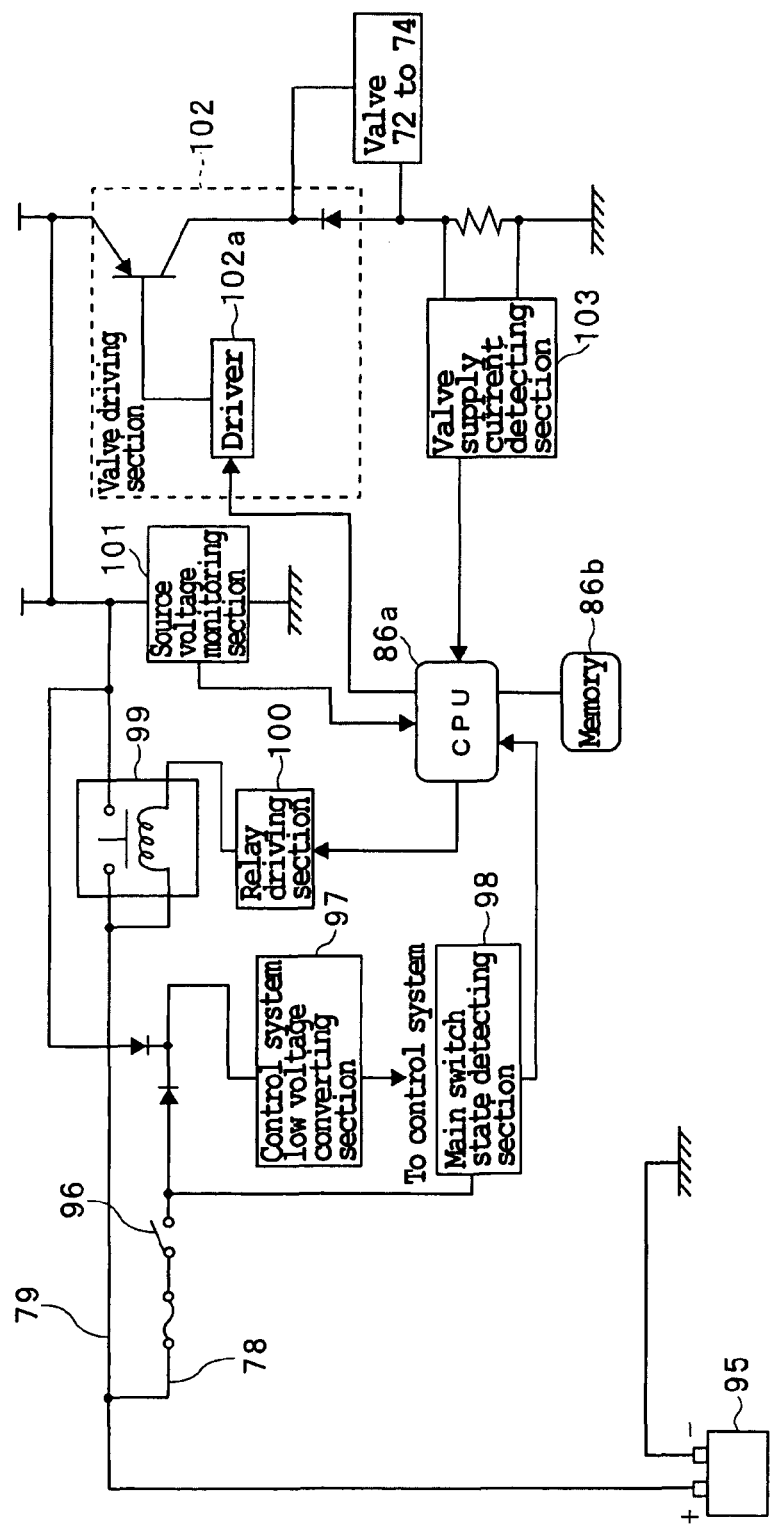
FIG. 6 is a block diagram illustrating the configuration of an ECU.

FIG. 6 illustrates the detailed configuration of the ECU 86 in this preferred embodiment. As shown in FIG. 6, the ECU 86 has a CPU 86a, a memory 86b, the main switch 96 as a first switch, a control system low voltage converting section 97, a main switch state detecting section 98, a relay 99 as a second switch, a relay driving section 100, a source voltage monitoring section 101, a valve driving section 102, and a valve supply current detecting section 103.

The ECU 86 is connected to a battery 95 as an electric power source. More specifically, the ECU 86 is connected to the battery 95 by a first electric line 78 and a second electric line 79. The first electric line 78 and the second electric line 79 are connected to each other at their intermediate portions.

The main switch 96 is interposed in the first electric line 78. When the main switch 96 is operated by the vessel operator, the current flow between the battery 95 and the ECU 86 is turned on and off.

The control system low voltage converting section 97 and the main switch state detecting section 98 are connected to the first electric line 78. The main switch state detecting section 98 detects the state of the main switch 96. Specifically, the main switch state detecting section 98 detects whether the main switch 96 is on or off. The main switch state detecting section 98 outputs the detected state of the main switch 96 to the CPU 86a.

The control system low voltage converting section 97 transforms the relatively high-voltage electric power supplied from the battery 95 to relatively low-voltage electric power to be supplied to the control system such as the CPU 86a. The control system low voltage converting section 97 supplies the transformed electric power to the control system.

The electric power source relay 99 as a second switch is directly connected to the battery 95 by the second electric line 79. Thus, even when the main switch 96 is off, electric power is supplied to the electric power source relay 99 via the second electric line 79.

The second electric line 79 downstream of the electric power source relay 99 and the first electric line 78 downstream of the main switch 96 are connected to each other. Thus, even when the main switch 96 is turned off, a voltage is supplied to the control system low voltage converting section 97 as long as the electric power source relay 99 is on.

The relay driving section 100 is connected to the electric power source relay 99. The electric power source relay 99 is driven by the relay driving section 100. The relay driving section 100 is driven by the CPU 86a.

The electric power source relay 99 is connected to the source voltage monitoring section 101 and the valve driving section 102. The source voltage monitoring section 101 detects the voltage applied thereto. The source voltage monitoring section 101 outputs the detected value of the voltage to the CPU 86a.

The valve driving section 102 has a driver 102a. The driver 102a drives the relief valve 77, the pump-side electromagnetic valve 76, the transmission ratio switching electromagnetic valve 72, the reverse shift connecting electromagnetic valve 73, and the forward shift connecting electromagnetic valve 74. The driver 102a is controlled by the CPU 86a.

The valve supply current detecting section 103 is connected to the relief valve 77, the pump-side electromagnetic valve 76, the transmission ratio switching electromagnetic valve 72, the reverse shift connecting electromagnetic valve 73, and the forward shift connecting electromagnetic valve 74. By the valve supply current detecting section 103, the magnitudes of currents flowing through the relief valve 77, the pump-side electromagnetic valve 76, the transmission ratio switching electromagnetic valve 72, the reverse shift connecting electromagnetic valve 73, and the forward shift connecting electromagnetic valve 74 are detected. The valve supply current detecting section 103 outputs the detected magnitudes of the currents flowing through the valves to the CPU 86a.

The memory 86b is connected to the CPU 86a. In the memory 86b, various settings including maps described later are stored. The CPU 86a reads out necessary information from the memory 86b when it carries out various operations. Also, the CPU 86a outputs the results of the operations to the memory 86b and stores the results of the operations and so on in the memory 86b as needed.

As shown in FIG. 5, the throttle body 87 and a starter motor 39 of the engine 30 are connected to the ECU 86. The throttle body 87 is controlled by the ECU 86. The throttle opening of the engine 30 is therefore controlled. Specifically, based on the displacement of a control lever 83 and an opening switching signal, the throttle opening of the engine 30 is controlled. As a result, the output of the engine 30 is controlled.

The starter motor 39 is driven based on the operation of a starter switch 39a by the vessel operator. Specifically, when the starter switch 39a is turned on by the vessel operator, an on signal is output from the starter switch 39a via a LAN 80. The ECU 86 basically drives the starter motor 39 when it receives an on signal from the starter switch 39a. Then, the engine 30 is started.

If the engine rotational speed is relatively high when the engine 30 is started, the engine 30 may be started without using the starter motor 39.

An engine rotational speed sensor 88 is connected to the ECU 86. The engine rotational speed sensor 88 detects the rotational speed of the crankshaft 31 of the engine 30 shown in FIG. 1. The engine rotational speed sensor 88 outputs the detected value of the engine rotational speed to the ECU 86.

A propeller rotational speed sensor 90 is disposed in the shift mechanism 34. Specifically, the propeller rotational speed sensor 90 is located in the shift case 45 of the shift mechanism 34. The propeller rotational speed sensor 90 detects the rotational speed of the third power-transmitting shaft 59 as the output shaft of the shift position switching mechanism 36. The propeller rotational speed sensor 90 outputs the detected value of the rotational speed of the third power-transmitting shaft 59 to the ECU 86. The ECU 86 calculates the rotational speed of the propeller 41 from the rotational speed of the third power-transmitting shaft 59 input thereinto, the speed reduction ratio of the speed reduction mechanism 37, and so on.

The installation position of the propeller rotational speed sensor 90 and the object whose rotational speed is detected by the propeller rotational speed sensor 90 are not particularly limited. The propeller rotational speed sensor 90 may directly detect the rotational speed of the propeller shaft 40 or the rotational speed of the propeller 41. The propeller rotational speed sensor 90 may detect the engine rotational speed and the ECU 86 may calculate the propeller rotational speed based on the detected value of the engine rotational speed, the state of the shift mechanism 34, and so on.

As shown in FIG. 5, the ECU 86 is connected to a shift position sensor 67. The shift position sensor 67 detects whether the shift position switching mechanism 36 is in forward, reverse, or neutral. The shift position sensor 67 outputs the detected shift position to the ECU 86.

The transmission ratio switching electromagnetic valve 72, the forward shift connecting electromagnetic valve 74, and the reverse shift connecting electromagnetic valve 73 are connected to the ECU 86. The opening and closing of the transmission ratio switching electromagnetic valve 72, the forward shift connecting electromagnetic valve 74, and the reverse shift connecting electromagnetic valve 73, and the degrees of the openings of the valves are controlled by the ECU 86.

The propulsion unit 33 has a water detecting sensor 93. The water detecting sensor 93 detects whether or not the propulsion unit 33 is positioned in water. The water detecting sensor 93 outputs information on whether or not the propulsion unit 33 is positioned in water to the ECU 86. When the propulsion unit 33 is positioned in water, the water detecting sensor 93 is turned on. In this case, the water detecting sensor 93 outputs an on signal to the ECU 86. When the propulsion unit 33 is not positioned in water, the water detecting sensor 93 is turned off. In this case, the water detecting sensor 93 outputs an off signal to the ECU 86.

A tilt switch 94 is connected to the ECU 86. When the vessel operator operates the tilt switch 94, the outboard motor body 21 is tilted or trimmed by the tilt-trim mechanism 22 shown in FIG. 1. Specifically, when the vessel operator operates the tilt switch 94, the tilt angle of the swivel bracket 25 with respect to the mount bracket 24 is adjusted. The outboard motor body 21 is thereby tilted or trimmed.

The outboard motor 20 has a tilt sensor 19. The angle between the mount bracket 24 and the swivel bracket 25 is detected. The tilt sensor 19 outputs the detected angle between the mount bracket 24 and the swivel bracket 25 to the ECU 86.

As shown in FIG. 5, the vessel 1 is provided with a local area network (LAN) 80. The LAN 80 is installed in the whole hull 10. In the vessel 1, signals are transmitted between the devices through the LAN 80.

To the LAN 80 are connected the ECU 86 of the outboard motor 20, the controller 82, a display device 81, a warning device 89, and so on. The display device 81 preferably displays the information outputted from the ECU 86, and the information output from the controller 82, which is described later. Specifically, the display device 81 preferably displays the current speed of the vessel 1, the shift position of the shift mechanism 34, and so on.

The warning device 89 informs the vessel operator of various failure conditions and so on. The warning device 89 is not particularly limited as long as it can inform the vessel operator of any necessary information. For example, the warning device 89 may be a buzzer, a loudspeaker, a display device, or a warning lamp.

In this preferred embodiment, an example in which the display device 81 and the warning device 89 are preferably provided separately is described. However, the display device 81 may include the function of the warning device 89.

The controller 82 has the control lever 83, an accelerator operation amount sensor 84, a shift position sensor 85, the starter switch 39*a*, and a canceling switch 92 for canceling propeller rotational speed reduction control.

The vessel operator of the vessel 1 operates the control lever 83 to input the shift position and the accelerator operation amount. Specifically, when the vessel operator operates the control lever 83, the accelerator operation amount and the shift position corresponding to the displacement and position of the control lever 83 are detected by the accelerator operation amount sensor 84 and the shift position sensor 85, respectively. The accelerator operation amount sensor 84 and the shift position sensor 85 are connected to the LAN 80. The accelerator operation amount sensor 84 and the shift position sensor 85 send an accelerator operation amount signal and a shift position signal, respectively, to the LAN 80. The ECU 86 receives the accelerator operation amount signal and the shift position signal output from the accelerator operation amount sensor 84 and the shift position sensor 85 via the LAN 80.

Specifically, when the control lever 83 is in the neutral range, the shift position sensor 85 outputs a shift position signal corresponding to neutral. When the control lever 83 is in the forward range, the shift position sensor 85 outputs a shift position signal corresponding to forward. When the control lever 83 is in the reverse range, the shift position sensor 85 outputs a shift position signal corresponding to reverse.

The accelerator operation amount sensor 84 detects the displacement of the control lever 83. Specifically, the accelerator operation amount sensor 84 detects an operational angle $\theta$ indicating how far the control lever 83 is displaced from the center position. The control lever 83 outputs the operational angle $\theta$ as the accelerator operation amount signal.

The canceling switch 92 shown in FIG. 5 is a switch for switching between a "normal mode" as a first mode in which propeller rotational speed reduction control is permitted and a "test operation mode" as a second mode in which propeller rotational speed reduction control is inhibited. The canceling switch 92 outputs the information on whether the selected mode is the "normal mode" or the "test operation mode" to the ECU 86 via the LAN 80.

In this preferred embodiment, the "normal mode" is basically selected when the vessel 1 travels under normal conditions. The "test operation mode" is selected when the outboard motor 20 is tested, for example.

Control of Vessel 1

Control of the vessel 1 is next described.

Figure 8:
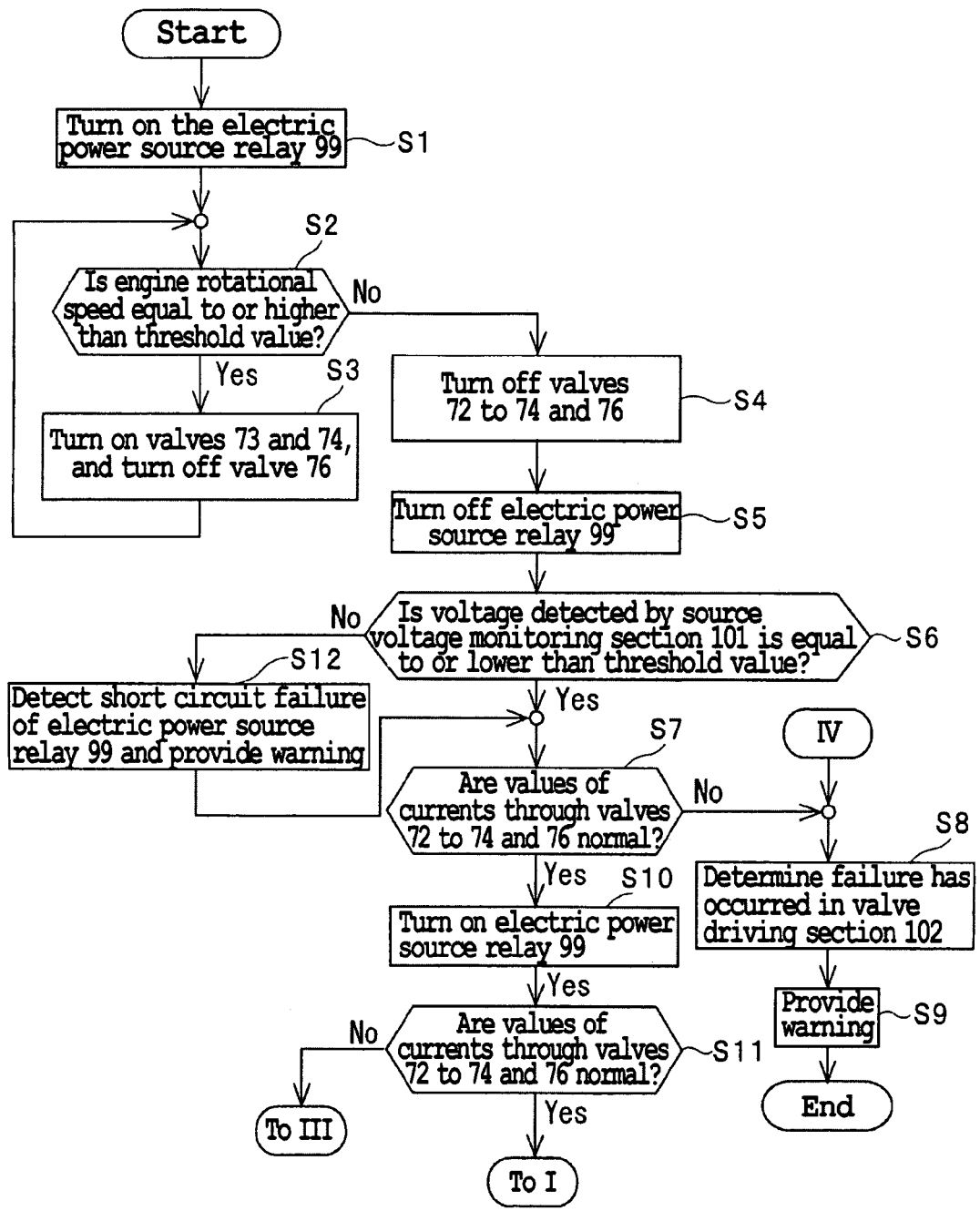
FIG. 8 is a flowchart illustrating a portion of a first control process.
Figure 9:
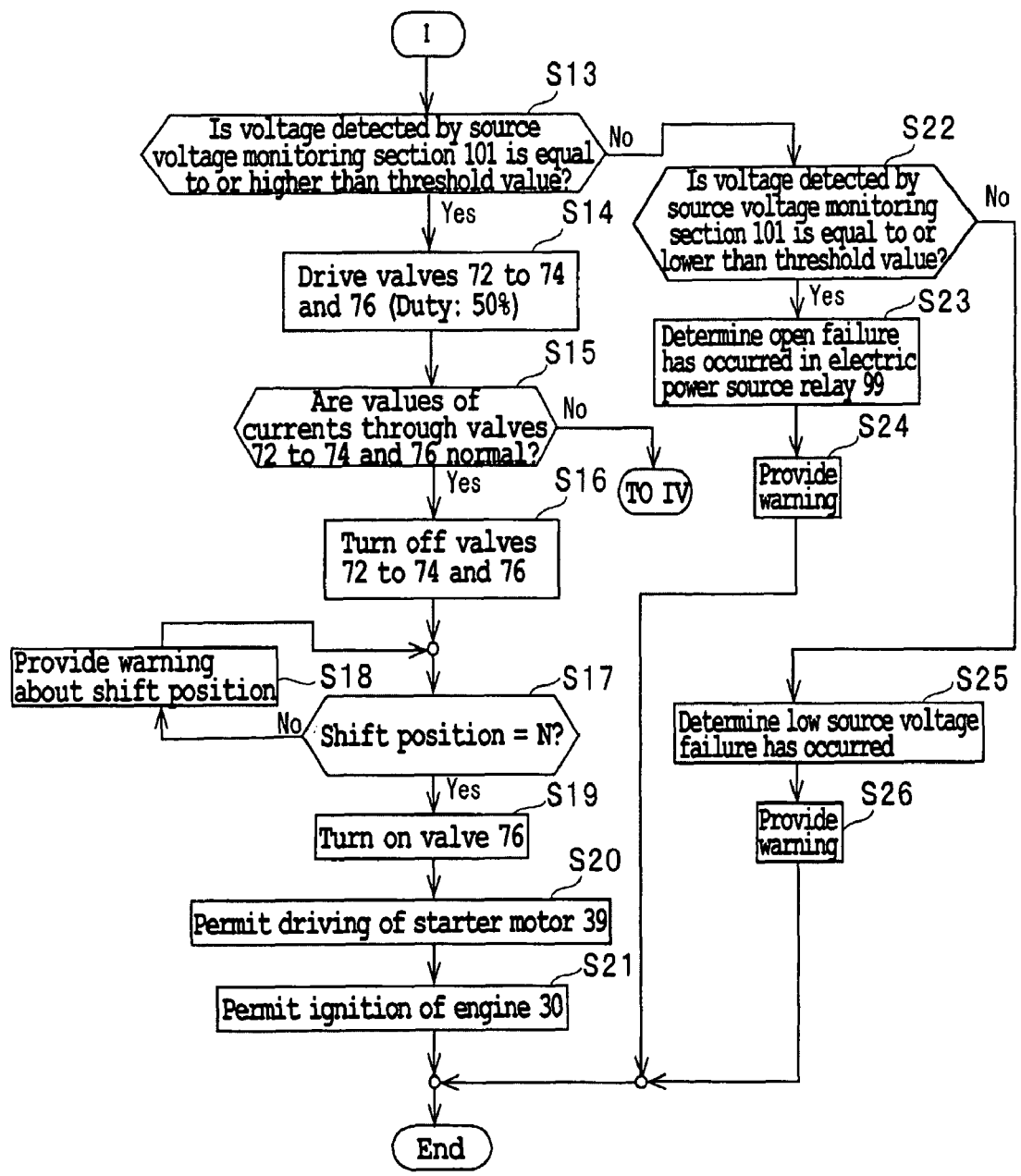
FIG. 9 is a flowchart illustrating a portion of a first control process.
Figure 10:
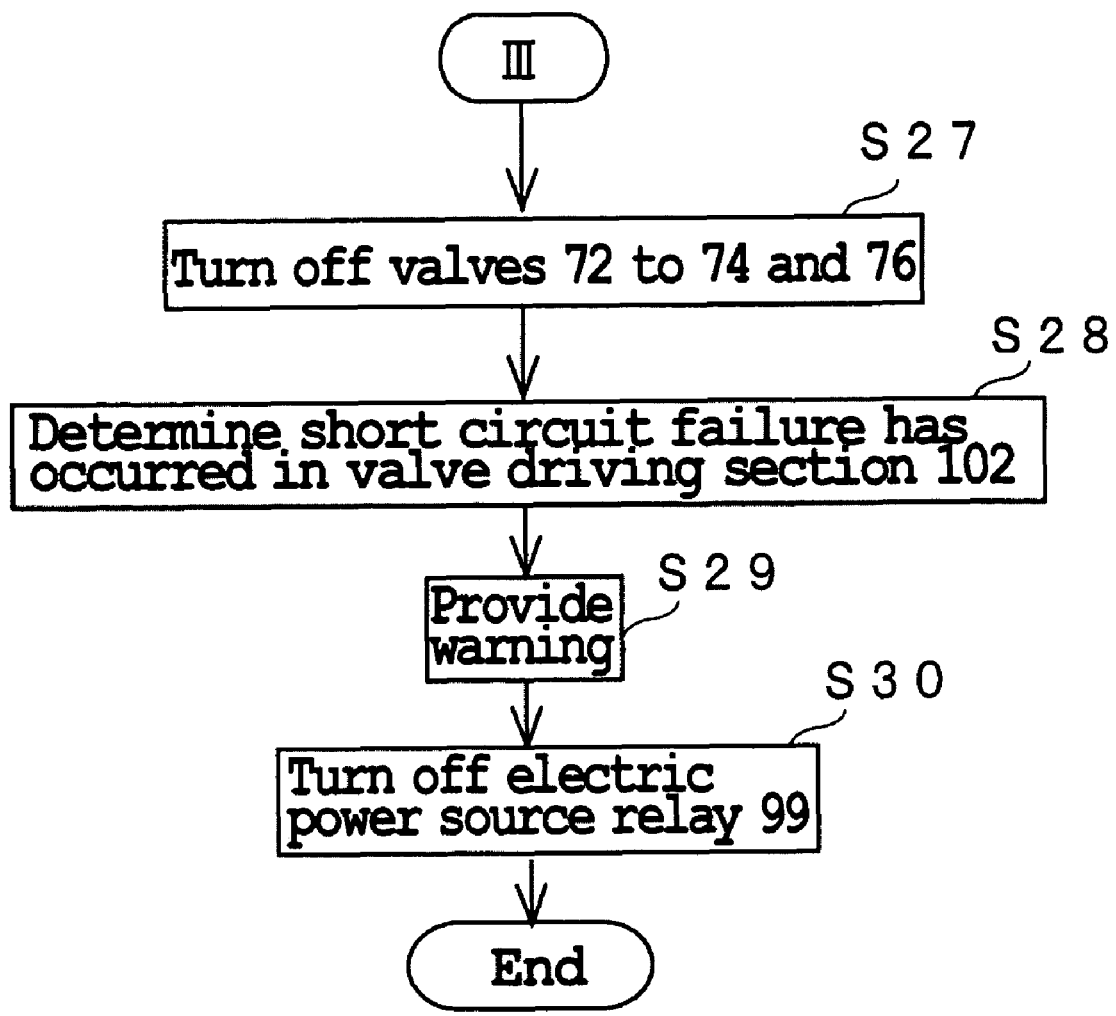
FIG. 10 is a flowchart illustrating a portion of a first control process.
Figure 11:
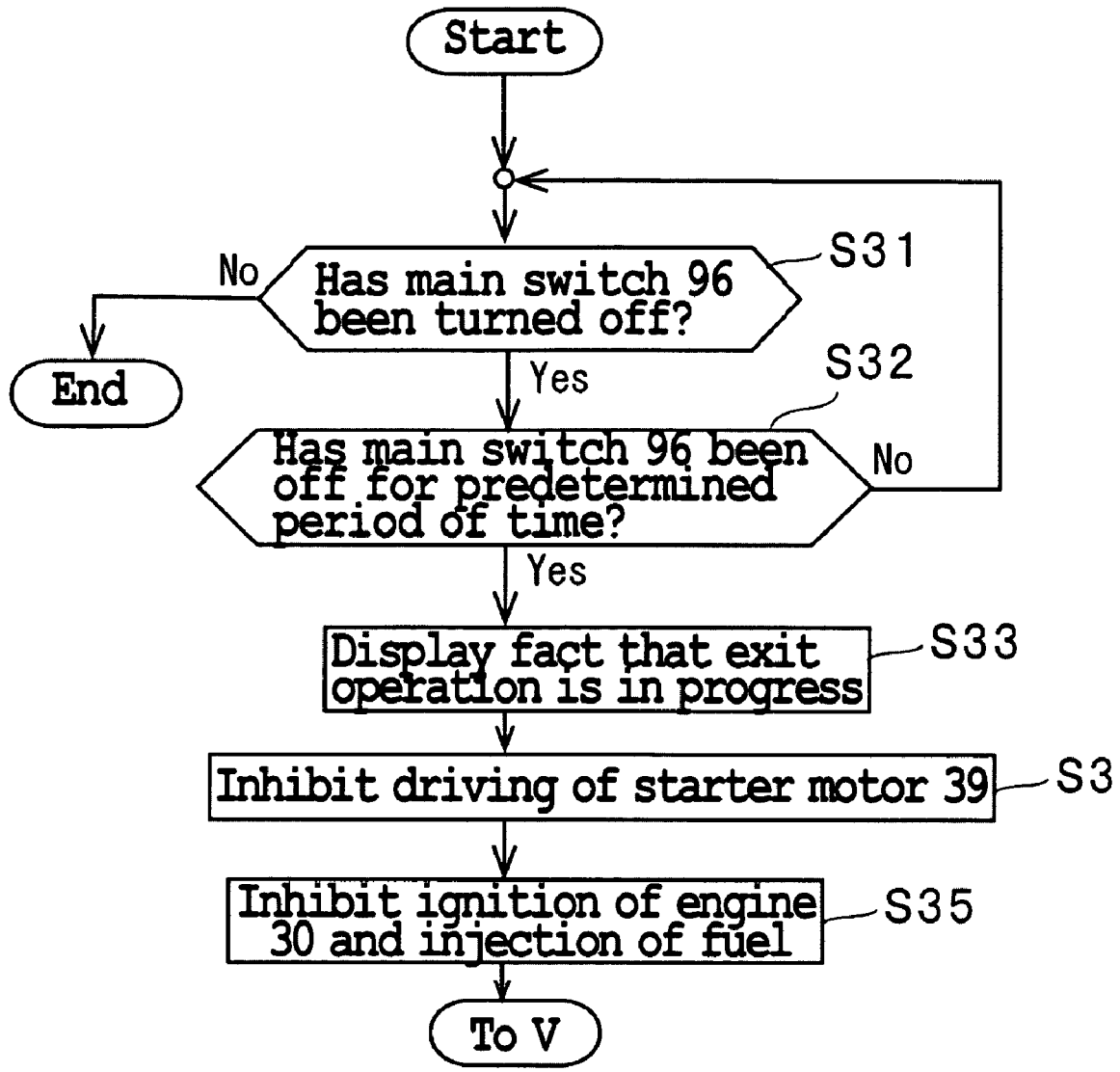
FIG. 11 is a flowchart illustrating a portion of a second control process.
Figure 12:
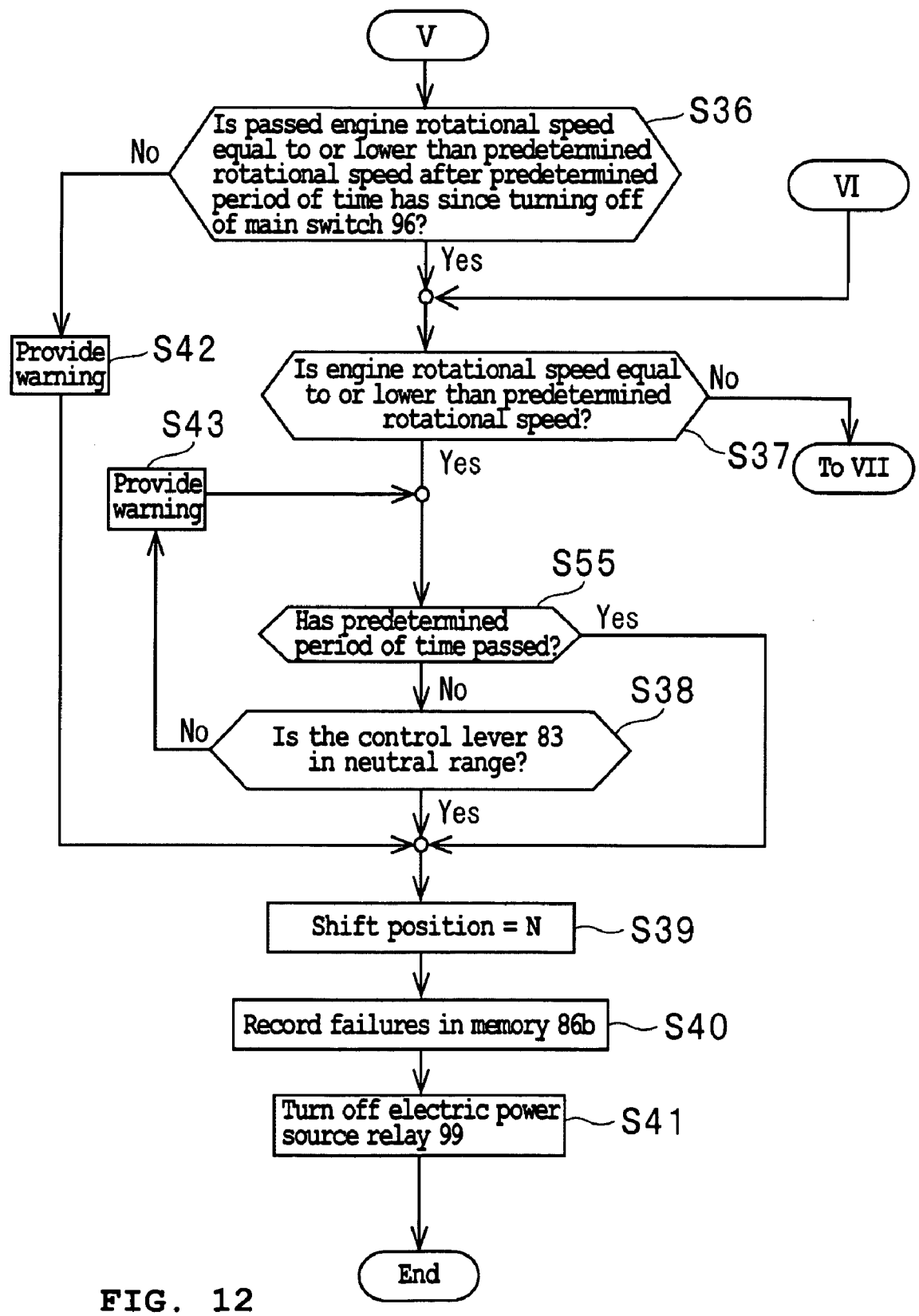
FIG. 12 is a flowchart illustrating a portion of a second control process.
Figure 13:
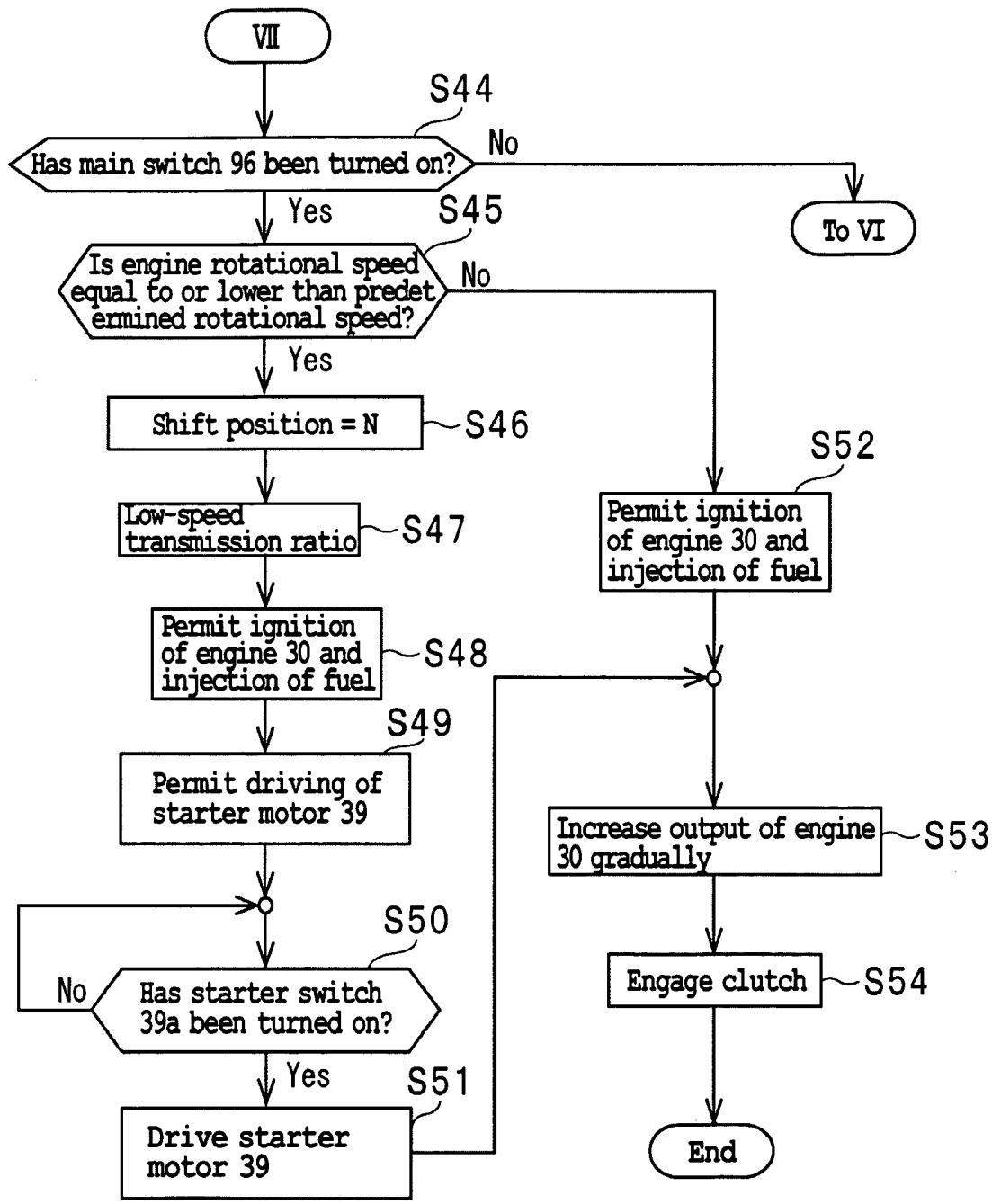
FIG. 13 is a flowchart illustrating a portion of a second control process.
Figure 25:
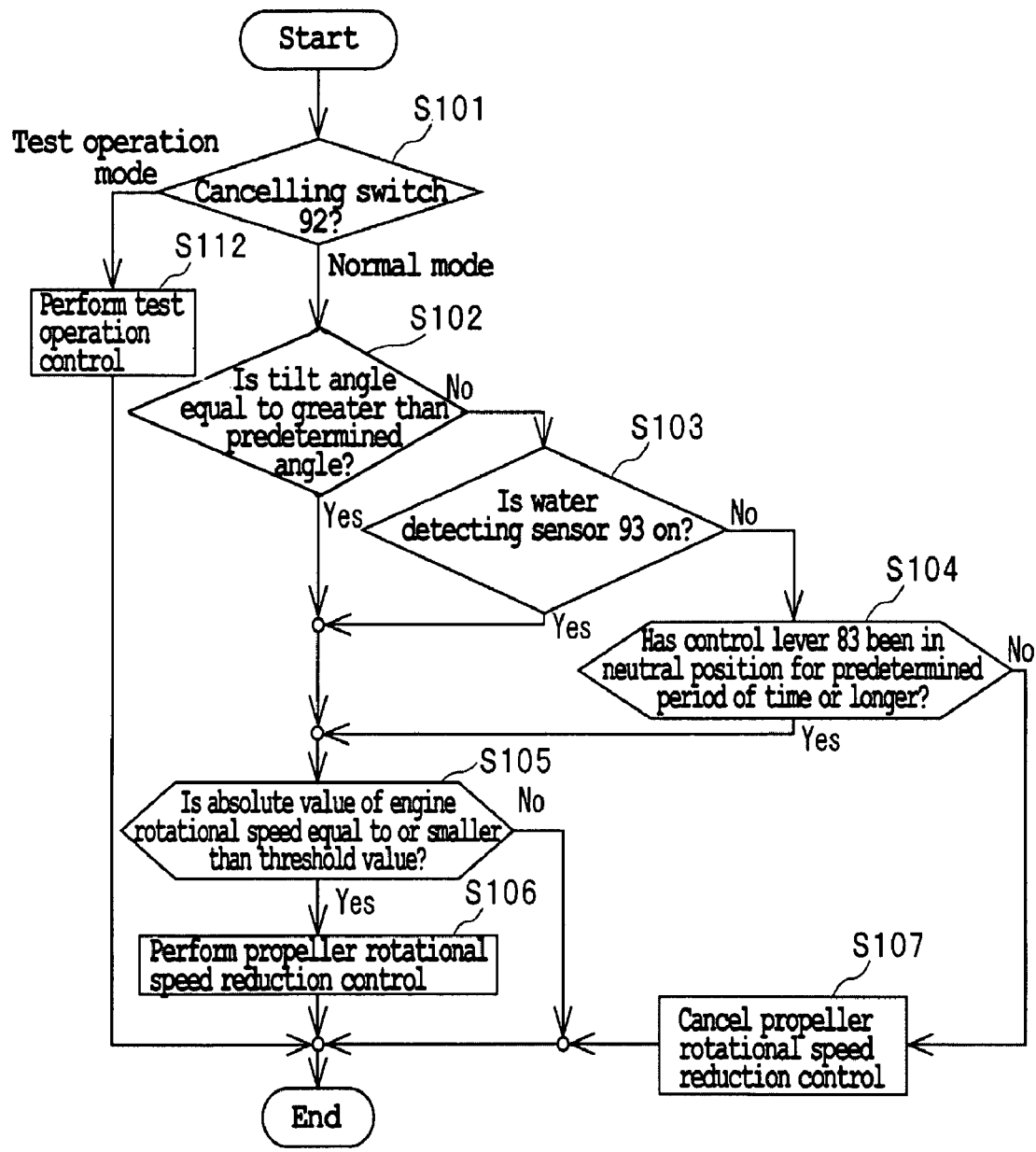
FIG. 25 is a flowchart illustrating a portion of a fourth control process.
Figure 29:
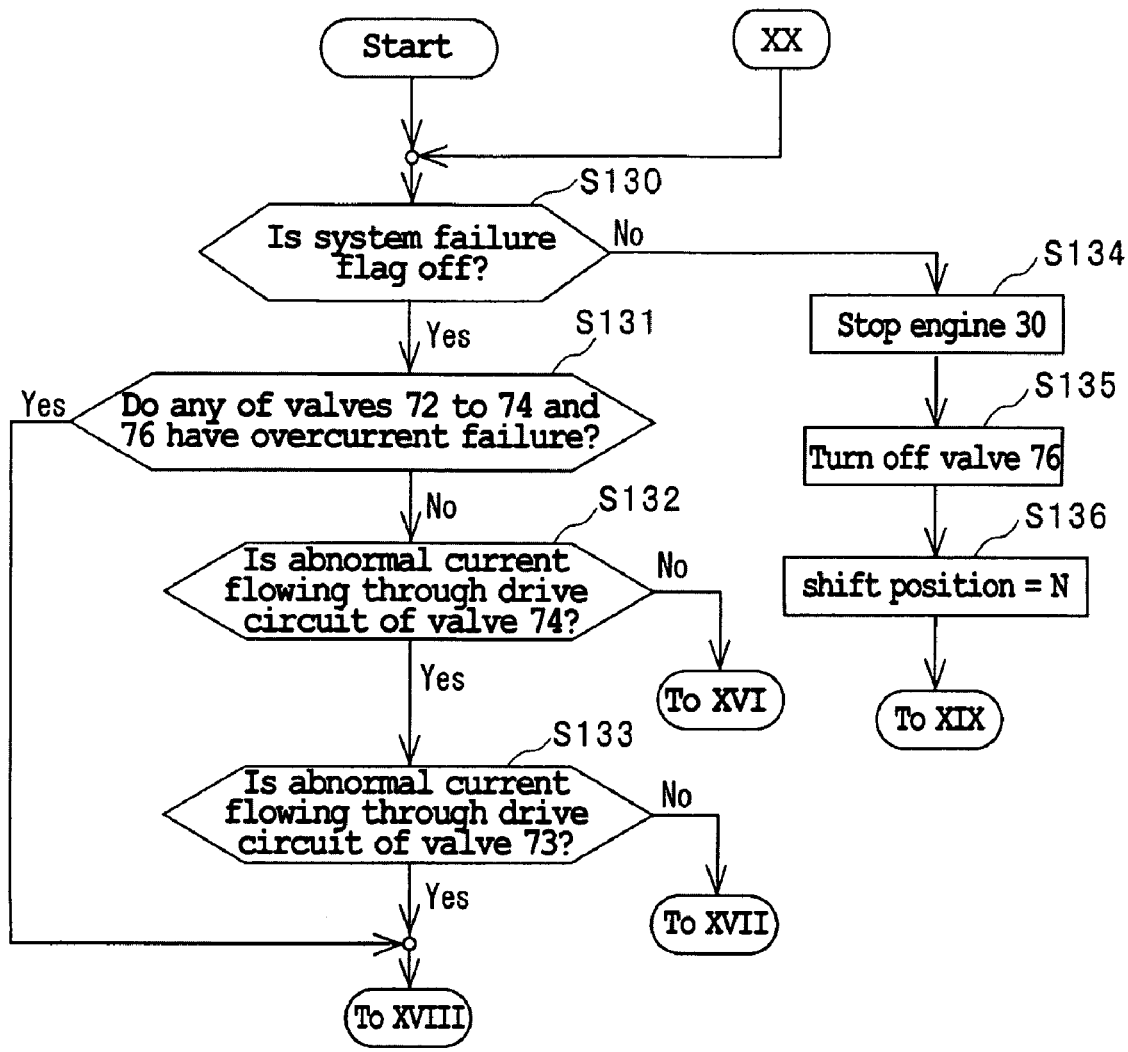
FIG. 29 is a flowchart illustrating a portion of a fifth control process.
Figure 30:
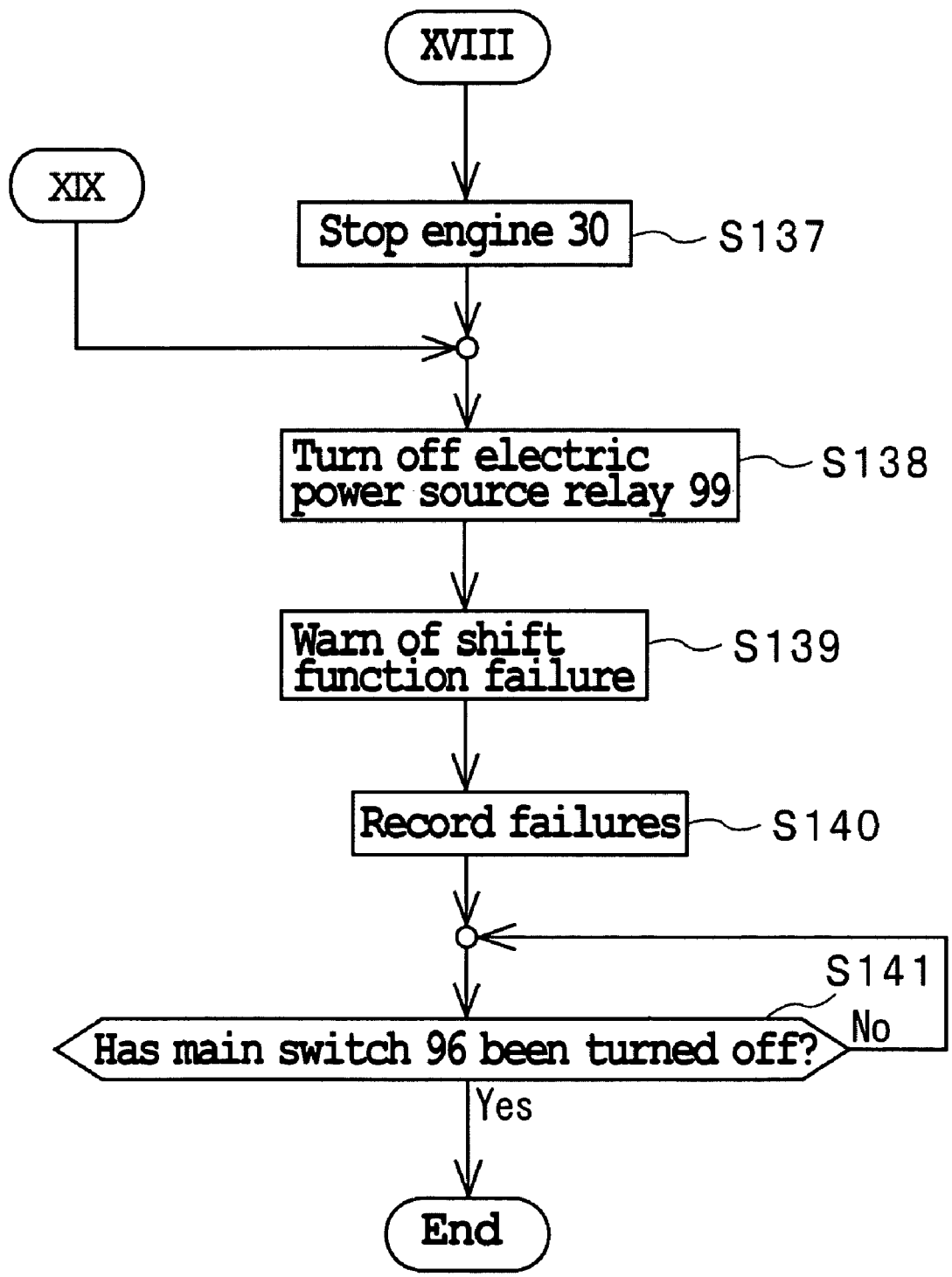
FIG. 30 is a flowchart illustrating a portion of a fifth control process.
Figure 31:
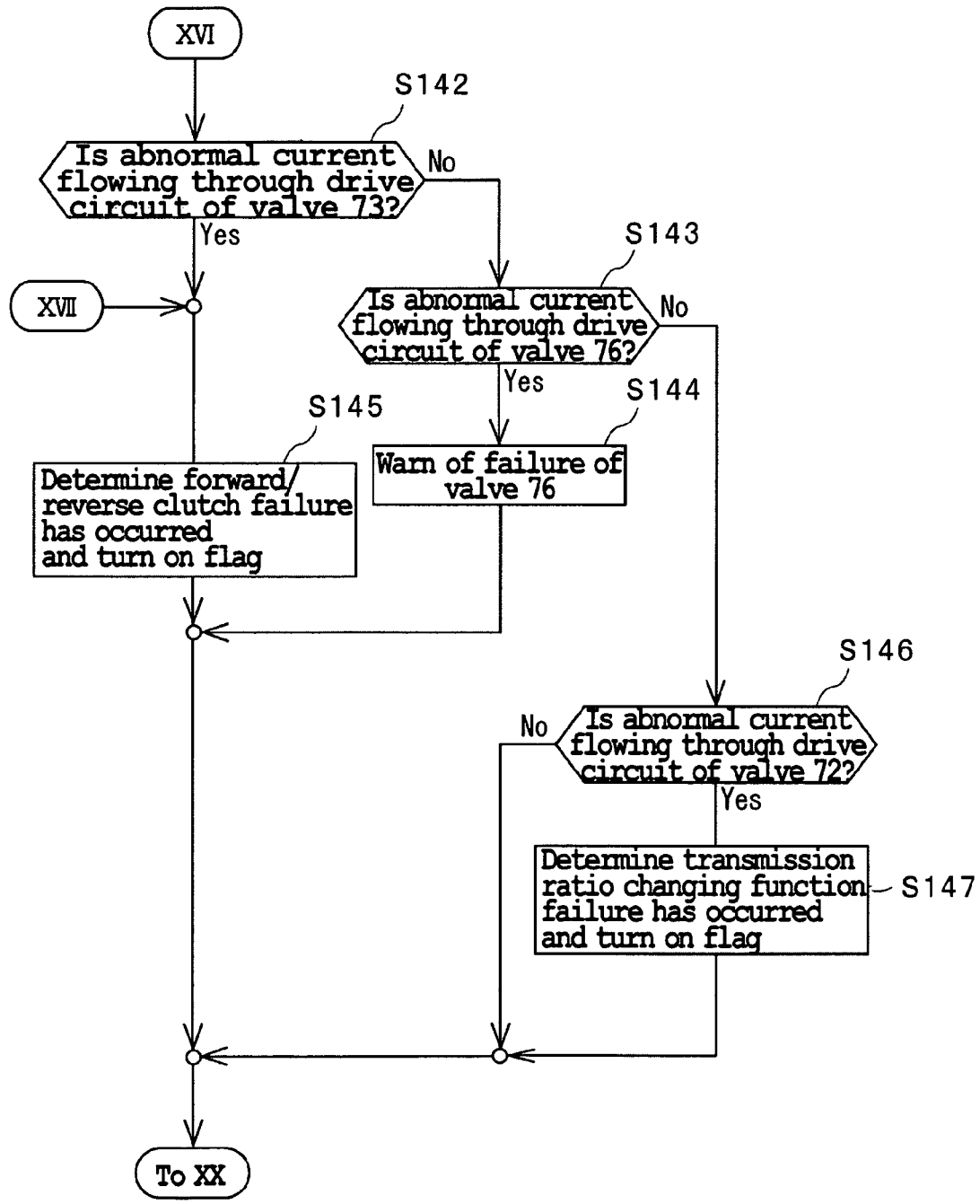
FIG. 31 is a flowchart illustrating a portion of a fifth control process.

In the vessel 1, a first control process shown in FIG. 8 to FIG. 10, a second control process shown in FIG. 11 to FIG. 13, a third control process shown in FIG. 14 to FIG. 20, a fourth control process shown in FIG. 25, a fifth control process shown in FIG. 29 to FIG. 31, and a sixth control process shown in FIG. 32 to FIG. 37 may preferably be performed.

The first control process is a control process which is performed only when the main switch 96 is turned on. The second control process, the third control process, the fourth control process, the fifth control process, and the sixth control process are performed repeatedly and concurrently while the main switch 96 is on. That is, each of the second control process, the third control process, the fourth control process, the fifth control process, and the sixth control process is repeatedly performed at predetermined intervals of, for example, about 5 ms to about 50 ms, over the period when the main switch 96 is on.

(1) First Control Process: Control Process Performed when the Main Switch 96 is Turned On Referring primarily to FIG. 8 to FIG. 10, the first control process in the present preferred embodiment, which is performed when the main switch 96 is turned on, is first described in detail.

When the main switch 96 shown in FIG. 6 is turned on, the supply of electric power to the control system low voltage converting section 97 is started. The control system such as the CPU 86a is therefore supplied with electric power.

When the main switch 96 is turned on, step S1 shown in FIG. 8 is first performed. In step S1, the CPU 86a turns on the electric power source relay 99. Specifically, the main switch state detecting section 98 detects the fact that the main switch 96 has been turned on. The main switch state detecting section 98 outputs an on signal indicating that the main switch 96 has been turned on to the CPU 86a. When the on signal from the main switch state detecting section 98 is input into the CPU 86a, the CPU 86a causes the relay driving section 100 to turn on the electric power source relay 99.

Step S1 is followed by step S2. In step S2, the CPU 86a determines whether or not the engine rotational speed is equal to or higher than a threshold value.

The "threshold value" in step S2 may be set as appropriate depending on the features of the outboard motor 20. The "threshold value" in step S2 may be set to about 500 rpm to about 1,000 rpm, for example.

If it is determined in step S2 that the engine rotational speed is equal to or higher than the threshold value, the process proceeds to step S3.

In step S3, the shift connecting electromagnetic valves 73 and 74 are turned on, and the pump-side electromagnetic valve 76 is turned off. The supply of hydraulic pressure to the hydraulic cylinders 61a and 62a is thereby cut off. As a result, the hydraulic clutches 61 and 62 are disengaged.

In step S3, the shift connecting electromagnetic valves 73 and 74 may be turned on without turning off the pump-side electromagnetic valve 76 or vice versa.

After the completion of step S3, the process returns to step S2.

If it is determined in step S2 that the engine rotational speed is lower than the threshold value, the process proceeds to step S4.

In step S4, all of the electromagnetic valves 72 to 74 and 76 are turned off. Here, the pump-side electromagnetic valve 76 is a normally low electromagnetic valve. Thus, when all of the electromagnetic valves 72 to 74 and 76 are turned off in step S4, the supply of hydraulic pressure to the hydraulic cylinders 53a, 61a, and 62a is prevented. Therefore, the hydraulic clutches 53, 61, and 62 are brought into the disengaged state.

Step S4 is followed by step S5. In step S5, the CPU 86a causes the relay driving section 100 to turn off the electric power source relay 99.

Step S5 is followed by step S6. In step S6, the CPU 86a determines whether or not the voltage detected by the source voltage monitoring section 101 is equal to or lower than a threshold value. Specifically, the source voltage monitoring section 101 detects the voltage applied thereto. The source voltage monitoring section 101 outputs the detected value of the voltage to the CPU 86a. The CPU 86a compares a threshold value stored in the memory 86b with the input voltage value to determine whether the voltage detected by the source voltage monitoring section 101 is equal to or lower than the threshold value.

Here, the electric power source relay 99 has been turned off since step S5. Thus, in step S6, the electric power source relay 99 is usually off. Therefore, substantially no voltage is normally being supplied to the source voltage monitoring section 101 located downstream of the electric power source relay 99. Thus, the voltage detected by the source voltage monitoring section 101 is normally equal to or lower than the threshold value unless there is a failure in the electric power source relay 99. If the voltage detected by the source voltage monitoring section 101 is equal to or lower than the threshold value in step S6, the process proceeds from step S6 to step S7.

If there is a failure, such as a short-circuit, in the electric power source relay 99, a relatively high voltage is supplied to the source voltage monitoring section 101. Thus, if there is a failure, such as a short circuit, in the electric power source relay 99, it is determined in step S6 that the voltage detected by the source voltage monitoring section 101 is higher than the threshold value. Then, the process proceeds from step S6 to step S12.

In step S12, the CPU 86a detects a short circuit failure of the electric power source relay 99. Then, the CPU 86a causes the warning device 89 shown in FIG. 5 to warn of the short circuit failure of the electric power source relay 99. After that, the process proceeds to step S7 as shown in FIG. 8.

The "threshold value" in step S6 may be set as appropriate depending on the features of the outboard motor 20. The "threshold value" in step S6 may be set to about 1 to 5 V, for example.

A waiting time period may be provided between step S5 and step S6. The waiting time period may be used to discharge the electric charge charged in a capacitor or the like in the ECU 86 or the like. The waiting time period may be set to about 0.1 second to about 0.5 second, for example.

Also, step S5 may be performed before the valves 72 to 74 and 76 are turned off in step S4. That is, when it is determined in step S2 that the engine rotational speed is lower than the threshold value, step S5 may be performed prior to step S4. Then, the electric charge charged in a capacitor or the like such as the ECU 86 has been substantially discharged when step S4 is completed. In this case, the waiting time period is not necessarily required.

As shown in FIG. 8, if it is determined in step S6 that the voltage detected by the source voltage monitoring section 101 is equal to or lower than the threshold value, the process proceeds to step S7.

In step S7, the CPU 86a determines whether or not the currents being supplied to the electromagnetic valves 72 to 74 and 76 are within their respective normal ranges.

Specifically, the valve supply current detecting section 103 shown in FIG. 6 detects the currents being supplied to the electromagnetic valves 72 to 74 and 76. The valve supply current detecting section 103 outputs the detected values of the currents to the electromagnetic valves 72 to 74 and 76 to the CPU 86a. The CPU 86a reads out the normal ranges of the currents to be supplied to the electromagnetic valves 72 to 74 and 76 from the memory 86b. The CPU 86a compares the normal ranges that have been read out with the values of the currents input thereinto to determine whether the currents being supplied to the electromagnetic valves 72 to 74 and 76 are within their respective normal ranges.

If it is determined in step S7 that any of the currents being supplied to the electromagnetic valves 72 to 74 and 76 are not within their respective normal ranges, step S8 and step S9 are performed in sequence. In step S8, the CPU 86a determines that a failure has occurred in the valve driving section 102. Then, in step S9, the CPU 86a causes the warning device 89 shown in FIG. 5 to warn that a failure has occurred in the valve driving section 102, and terminates the first control process. Thus, if it is determined in step S7 that any of the currents being supplied to the electromagnetic valves 72 to 74 and 76 are not within their respective normal ranges, starting of the engine 30 is prevented.

If it is determined in step S7 that the currents being supplied to the electromagnetic valves 72 to 74 and 76 are within their respective normal ranges, step S10 and step S11 are performed in sequence.

In step S10, the CPU 86a causes the relay driving section 100 to turn on the electric power source relay 99.

In step S11, the CPU 86a determines again whether or not the currents being supplied to the electromagnetic valves 72 to 74 and 76 which are detected by the valve supply current detecting section 103 are within their respective normal ranges.

If it is determined in step S11 that any of the currents being supplied to the electromagnetic valves 72 to 74 and 76 are not within their respective normal ranges, steps S27 to S30 are performed in sequence as shown in FIG. 8 and FIG. 10.

In step S27, the CPU 86a causes the valve driving section 102 to turn off the electromagnetic valves 72 to 74 and 76.

In step S28, the CPU 86a determines that a short circuit failure has occurred in the valve driving section 102.

In step S29, the CPU 86a causes the warning device 89 shown in FIG. 5 to warn of the short circuit failure of the valve driving section 102. In step S30, the CPU 86a causes the relay driving section 100 to turn off the electric power source relay 99. Thus, if it is determined in step S11 that any of the currents being supplied to the electromagnetic valves 72 to 74 and 76 are not within their respective normal ranges, starting of the engine 30 is also prevented.

If it is determined in step S11 that the currents being supplied to the electromagnetic valves 72 to 74 and 76 are within their respective normal ranges, the process proceeds to step S13 as shown in FIG. 8 and FIG. 9.

In step S13, the CPU 86a determines whether or not the voltage detected by the source voltage monitoring section 101 is equal to or higher than a threshold value. Specifically, the source voltage monitoring section 101 detects the voltage applied thereto. The source voltage monitoring section 101 outputs the detected value of the voltage to the CPU 86a. The CPU 86a compares a threshold value stored in the memory 86b with the input voltage value to determine whether the voltage detected by the source voltage monitoring section 101 is equal to or higher than the threshold value.

Here, the electric power source relay 99 has been turned on since step S10. Thus, in step S13, the electric power source relay 99 is usually on. Therefore, the voltage detected by the source voltage monitoring section 101 is substantially equal to the voltage of the battery 95 in normal times. Thus, in step S13, the CPU 86a consequently determines whether or not the voltage of the battery 95 is equal to or higher than the threshold value. That is, it is determined in step S13 whether or not the voltage of the battery 95 is lower than necessary.

The "threshold value" in step S13 may be set as appropriate depending on the features of the outboard motor 20. The "threshold value" in step S13 is usually set to a value equal to or lower than the preferred voltage value of the battery 95. Specifically, the "threshold value" in step S13 may preferably be set to about 7 V to about 10 V, for example.

As shown in FIG. 9, if it is determined in step S13 that the voltage detected by the source voltage monitoring section 101 is lower than the threshold value, the process proceeds to step S22.

In step S22, the CPU 86a determines whether or not the voltage detected by the source voltage monitoring section 101 is equal to or lower than a threshold value. The "threshold value" in step S22 is set to a value smaller than the "threshold value" in step S13. Specifically, the "threshold value" in step S22 is set to a value substantially close to 0. The "threshold value" in step S22 may be preferably set to about 0 V to about 3 V, for example. Thus, it is determined in step S22 whether or not a voltage is applied to the source voltage monitoring section 101. That is, it is determined whether or not the electric power source relay 99 has been turned on.

If it is determined in step S22 that the voltage detected by the source voltage monitoring section 101 is equal to or lower than the threshold value, step S23 and step S24 are performed in sequence.

In step S23, the CPU 86a determines that an open failure has occurred in the electric power source relay 99. That is, the CPU 86a determines that there is a failure condition in which the electric power source relay 99 has not been turned on.

In step S24, the CPU 86a causes the warning device 89 shown in FIG. 5 to warn of the open failure of the electric power source relay 99, and terminates the first control process.

If it is determined in step S22 that the voltage detected by the source voltage monitoring section 101 is higher than the threshold value, the process proceeds to step S25 and step 26 as shown in FIG. 9. Here, if it is determined in step S22 that the voltage detected by the source voltage monitoring section 101 is higher than the threshold value, it means that the voltage detected by the source voltage monitoring section 101 is lower than the preferred voltage of the battery 95 although a certain level of voltage has been detected by the source voltage monitoring section 101. That is, it is determined in step S22 that the voltage detected by the source voltage monitoring section 101 is higher than the threshold value when the voltage of the battery 95 is low.

In step S25, the CPU 86a determines that a low source voltage failure has occurred as the voltage of the battery 95 is abnormally low.

In step S26, the CPU 86a causes the warning device 89 shown in FIG. 5 to warn of the low source voltage failure.

As described above, if it is determined in step S13 that the voltage detected by the source voltage monitoring section 101 is equal to or higher than the threshold value, the process proceeds to step S14. In step S14, the CPU 86a causes the valve driving section 102 to drive the electromagnetic valves 72 to 74 and 76. In step S14, the driving voltage on each of the electromagnetic valves 72 to 74 and 76 preferably has a Duty of about 50%, for example.

Then, step S15 is performed with a voltage having a Duty=50% being applied to each of the electromagnetic valves 72 to 74 and 76. In step S15, the CPU 86a determines whether or not the values of the currents flowing through the electromagnetic valves 72 to 74 and 76 are within their respective normal ranges. Specifically, the valve supply current detecting section 103 shown in FIG. 6 detects the currents flowing through the electromagnetic valves 72 to 74 and 76. The valve supply current detecting section 103 outputs the detected values of the currents to the electromagnetic valves 72 to 74 and 76 to the CPU 86a. The CPU 86a compares the input values of the currents flowing through the electromagnetic valves 72 to 74 and 76 with their respective normal ranges read out from the memory 86b to determine whether the values of the currents flowing through the electromagnetic valves 72 to 74 and 76 are within their respective normal ranges.

As shown in FIG. 8 and FIG. 9, if it is determined in step S15 that any of the values of the currents flowing through the electromagnetic valves 72 to 74 and 76 are not within their respective normal ranges, step S8 and step S9 are performed in sequence.

In step S8, the CPU 86a determines that a valve driving section failure has occurred.

In step S9, the CPU 86a causes the warning device 89 shown in FIG. 5 to warn of the failure of the valve driving section 102, and terminates the first control process.

If it is determined in step S15 that the values of the currents flowing through the electromagnetic valves 72 to 74 and 76 are within their respective normal ranges, the process proceeds to step S16 as shown in FIG. 9.

In step S16, the CPU 86a causes the valve driving section 102 to turn off the electromagnetic valves 72 to 74 and 76. The supply of hydraulic pressure to the hydraulic clutches 53, 61, and 62 is thereby cutoff. As a result, the hydraulic clutches 53, 61, and 62 are disengaged.

Step S16 is followed by step S17.

In step S17, the CPU 86a determines whether or not the shift mechanism 34 is in neutral based on the output of the shift position sensor 67 shown in FIG. 5.

If it is determined in step S17 that the shift mechanism 34 is not in neutral, the process proceeds to step S18. In step S18, the CPU 86a causes the warning device 89 to provide a warning indicating that the shift position is not neutral. After the completion of step S18, the process returns to step S17. Thus, the warning device 89 continues to provide the warning until the shift mechanism 34 is put into neutral.

If it is determined in step S17 that the shift mechanism 34 is in neutral, step S19 to step S21 are performed in sequence.

In step S19, the CPU 86a turns on the pump-side electromagnetic valve 76.

In step S20, the CPU 86a permits driving of the starter motor 39 shown in FIG. 5.

In step S21, the CPU 86a permits ignition of the engine 30.

Thus, when the starter switch 39a shown in FIG. 5 is operated by the vessel operator after step S21 has been completed, the engine 30 is started. The setting is so made that the vessel operator cannot start the engine 30 until driving of the starter motor 39 is permitted in step S20 even after the main switch 96 has been turned on.

(2) Second Control Process: Control Process Performed when the Main Switch 96 is Turned Off Referring primarily to FIG. 11 to FIG. 13, the control process which is performed when the main switch 96 is turned off in this preferred embodiment is next described in detail. As described before, the second control process is repeatedly performed over the period when the main switch 96 is on.

As shown in FIG. 11, the CPU 86a determines in step S31 whether or not the main switch 96 has been turned off based on the output from the main switch state detecting section 98 shown in FIG. 6. If it is determined in step S31 that the main switch 96 has not been turned off, the CPU 86a terminates the second control process. If it is determined in step S31 that the main switch 96 has been turned off, the process proceeds to step S32.

In step S32, the CPU 86a determines whether or not the main switch 96 has been continuously off for a predetermined period of time based on the output from the main switch state detecting section 98. The "predetermined period of time" in step S32 is about 0.1 second, for example.

If it is determined in step S32 that the main switch 96 has not been continuously off for the predetermined period of time, the process returns to step S31. Thus, unless the main switch 96 has been completely turned off, the exit operation in step S33 and the following steps is not performed.

If it is determined in step S32 that the main switch 96 has been continuously off for the predetermined period of time, step S33 to step S36 are performed as shown in FIG. 11 and FIG. 12.

In step S33, the CPU 86a shown in FIG. 5 causes the display device 81 to display the fact that the exit operation is in progress. In step S33, the fact that the exit operation is in progress may be announced by sound or other type of indication. In this case, the electric power source of the display device 81 may be turned off when the main switch 96 is turned off, for example.

In step S34, the CPU 86a prevents driving of the starter motor 39.

In step S35, the CPU 86a prevents ignition of the engine 30 and injection of fuel.

In step S36 shown in FIG. 12, the CPU 86a determines whether or not the engine rotational speed is equal to or lower than a predetermined rotational speed after a predetermined period of time has passed since the turn-off of the main switch 96.

The "predetermined period of time" and the "predetermined rotational speed" in step S36 may be set as appropriate depending on the features of the outboard motor 20. The "predetermined period of time" in step S36 may be set to about 5 seconds, for example. The "predetermined rotational speed" in step S36 may be set to about 500 rpm to about 1,000 rpm, for example.

If the CPU 86a determines in step S36 that the engine rotational speed obtained after the predetermined period of time since the turn-off of the main switch 96 is higher than the predetermined rotational speed, the process proceeds to step S42. Then, in step S42, the CPU 86a shown in FIG. 5 causes the warning device 89 to provide a warning. After the completion of step S42, the process proceeds to step S39.

If it is determined in step S36 that the engine rotational speed obtained after the predetermined period of time since the turn-off of the main switch 96 is equal to or lower than the predetermined rotational speed, the process proceeds to step S37.

In step S37, the CPU 86a determines whether or not the engine rotational speed detected by the engine rotational speed sensor 88 shown in FIG. 5 is equal to or lower than a predetermined rotational speed.

The "predetermined rotational speed" in step S37 may be set as appropriate depending on the features of the outboard motor 20. The "predetermined rotational speed" in step S37 may be set to about 100 rpm to about 500 rpm, for example.

If it is determined in step S37 that the engine rotational speed is higher than the predetermined rotational speed, the process proceeds to step S44 as shown in FIG. 12 and FIG. 13. Here, the control process shown in step S44 to step S54 represents the control process which is performed when the engine 30 is restarted.

First, the CPU 86a determines in step S44 whether or not the main switch 96 has been turned on based on the output from the main switch state detecting section 98 shown in FIG. 6.

If it is determined in step S44 that the main switch 96 is off, the process returns to step S37 shown in FIG. 12.

If it is determined in step S44 that the main switch 96 is on, the process proceeds to step S45. In step S45, the ECU 86a determines whether or not the engine rotational speed is equal to or lower than a predetermined rotational speed based on the output from the engine rotational speed sensor 88.

The "predetermined rotational speed" in step S45 may be set as appropriate depending on the features of the outboard motor 20. The "predetermined rotational speed" in step S45 is set to a rotational speed at which the engine 30 can be driven without driving the starter motor 39. The "predetermined rotational speed" in step S45 may be set to about 500 rpm to about 2,000 rpm, for example.

If it is determined in step S45 that the engine rotational speed is higher than the predetermined rotational speed, step S52, step S53, and step S54 are performed in sequence.

In step S52, the CPU 86a permits ignition of the engine 30 and injection of fuel.

In step S53, the CPU 86a gradually increases the output of the engine 30 to a level corresponding to the throttle opening calculated from the accelerator operation amount.

In step S54, the first shift switching hydraulic clutch 62 or the second shift switching hydraulic clutch 61 is engaged to achieve a shift position corresponding to the position of the control lever 83.

If it is determined in step S45 that the engine rotational speed is equal to or lower than the predetermined rotational speed, step S46 to step S50 are performed in sequence.

In step S46, the CPU 86a puts the shift mechanism 34 into neutral. If the shift mechanism 34 is in neutral, the shift position is maintained in step S46.

In step S47, the CPU 86a changes the transmission ratio of the transmission ratio switching mechanism 35 to the low-speed transmission ratio. If the transmission ratio of the transmission ratio switching mechanism 35 is the low-speed transmission ratio, the low-speed transmission ratio is maintained in step S47.

In step S48, the CPU 86a permits ignition of the engine 30 and injection of fuel.

In step S49, the CPU 86a permits driving of the starter motor 39.

Step S49 is followed by step S50. In step S50, the CPU 86a determines whether or not the starter switch 39a has been turned on.

If it is determined in step S50 that the starter switch 39a has not been turned on, step S50 is repeated. That is, step S50 is repeated until the starter switch 39a is turned on.

If it is determined in step S50 that the starter switch 39a has been turned on, step S51, step S53, and step S54 are performed in sequence.

In step S51, the CPU 86a drives the starter motor 39. As a result, the engine 30 is started.

In step S53, the CPU 86a gradually increases the output of the engine 30 to a level corresponding to the throttle opening calculated from the accelerator operation amount.

In step S54, the first shift switching hydraulic clutch 62 or the second shift switching hydraulic clutch 61 is engaged to achieve a shift position corresponding to the position of the control lever 83.

If it is determined in step S37 that the engine rotational speed is equal to or lower than the predetermined rotational speed, the process proceeds to step S55 as shown in FIG. 12.

In step S55, the CPU 86a determines whether or not a predetermined period of time has passed since it was determined in step S37 that the engine rotational speed was equal to or lower than the predetermined rotational speed. Here, the "predetermined period of time" in step S55 may be set to about 5 seconds to about 10 seconds, for example.

If it is determined in step S55 that the predetermined period of time has passed, the process skips step S38 and proceeds to step S39.

If it is determined in step S55 that the predetermined period of time has not passed, the process proceeds to step S38. In step S38, the CPU 86a determines whether or not the control lever 83 is in the neutral range corresponding to neutral based on the output from the shift position sensor 85.

If it is determined in step S38 that the control lever 83 is not in the neutral range, the process proceeds to step S43. In step S43, the CPU 86a shown in FIG. 5 causes the warning device 89 to warn that the control lever 83 is not in the neutral range. After the completion of step S43, step S55 is performed again. That is, the warning device 89 continuously provides a warning indicating that the control lever 83 is not in the neutral range until the control lever 83 is positioned in the neutral range.

If it is determined in step S38 that the control lever 83 is in the neutral range, step S39 to step S41 are performed in sequence. Also, as described before, step S39 to step S41 are performed in sequence following step S42.

In step S39, the CPU 86a puts the shift mechanism 34 into neutral.

In step S40, the CPU 86a records the failures which have occurred until now since the main switch 96 was turned on in the memory 86b.

In step S41, the CPU 86a turns off the electric power source relay 99, and terminates the second control process.

(3) Third Control Process

Referring primarily to FIG. 14 to FIG. 24, the third control process in this preferred embodiment is next described in detail. The third control process and the fourth and fifth control processes, which are described later, are mutually related.

Figure 14:
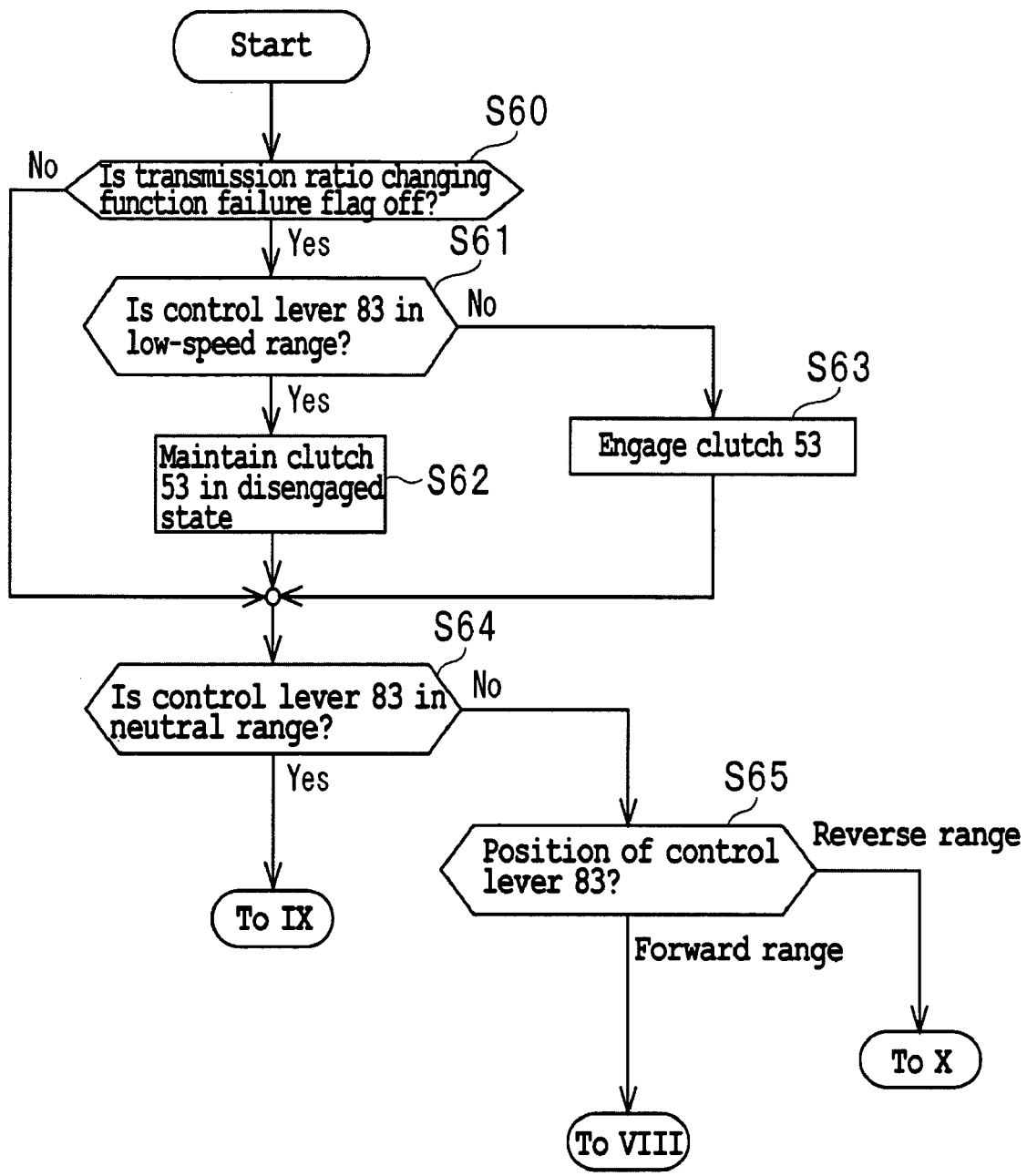
FIG. 14 is a flowchart illustrating a portion of a third control process.
Figure 15:
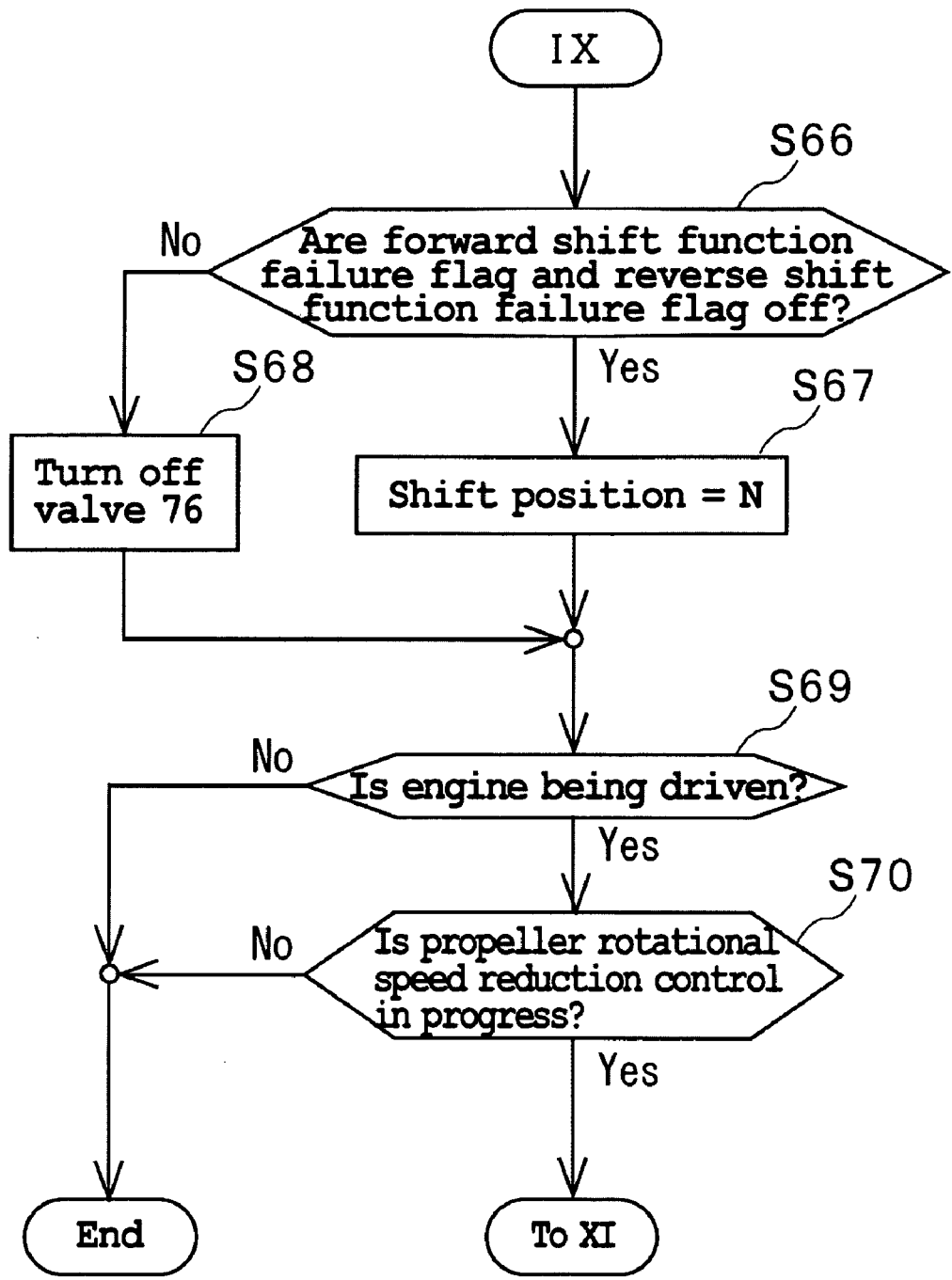
FIG. 15 is a flowchart illustrating a portion of a third control process.

In the third control process in the present preferred embodiment, step S60 is first performed as shown in FIG. 14. In step S60, the CPU 86a determines whether or not a transmission ratio changing function failure flag is off. Normally, the transmission ratio changing function failure flag is off. Thus, it is usually determined in step S60 that the transmission ratio changing function failure flag is off. When step S60 is performed after the transmission ratio changing function failure flag was turned on in steps S84 or S96 in the third control process or in step S147 in the fifth control process, it is determined in step S60 that the transmission ratio changing function failure flag is on.

If it is determined in step S60 that the transmission ratio changing function failure flag is on, the process proceeds to step S64. If it is determined in step S60 that the transmission ratio changing function failure flag is off, the process proceeds to step S61.

In step S61, the CPU 86a determines whether or not the control lever 83 is in the low-speed range based on the output from the shift position sensor 85.

If it is determined in step S61 that the control lever 83 is in the high-speed range, the process proceeds to step S63. In step S63, the CPU 86a engages the transmission ratio switching hydraulic clutch 53. As a result, the transmission ratio of the transmission ratio switching mechanism 35 shown in FIG. 2 changes to the low-speed transmission ratio.

If it is determined in step S61 that the control lever 83 is in the low-speed range, the process proceeds to step S62. In step S62, the CPU 86a maintains the transmission ratio switching hydraulic clutch 53 in the disengaged state.

Step S64 is performed following step S62 and step S63. Also, if it is determined in step S60 that the transmission ratio changing function failure flag is on, step S64 is performed.

In step S64, the CPU 86a determines whether or not the control lever 83 is in the neutral range based on the output from the shift position sensor 85.

If it is determined in step S64 that the control lever 83 is in the neutral range, the process proceeds to step S66.

In step S66, the CPU 86a determines whether or not a forward shift function failure flag and a reverse shift function failure flag are both off. It is normally determined that the forward shift function failure flag and the reverse shift function failure flag are both off. For example, when step S66 is performed after the forward shift function failure flag was turned on in step S75 in the third control process or step S189 in sixth control process, it is determined in step S66 that the forward shift function failure flag is on. When step S66 is performed after the reverse shift function failure flag was turned on in step S76 in the third control process or step S188 in the sixth control process, it is determined in step S66 that the reverse shift function failure flag is on.

If at least one of the forward shift function failure flag and the reverse shift function failure flag is on in step S66, the process proceeds to step S68. In step S68, the CPU 86a turns off the pump-side electromagnetic valve 76.

If it is determined in step S66 that the forward shift function failure flag and the reverse shift function failure flag are both off, the process proceeds to step S67. In step S67, the CPU 86a puts the shift mechanism 34 into neutral.

Step S67 and step S68 are performed followed by step S69. In step S69, the CPU 86a determines whether or not the engine 30 is being driven. If it is determined in step S69 that the engine 30 is not being driven, the third control process is terminated.

If it is determined in step S69 that the engine 30 is being driven, the process proceeds to step S70. In step S70, it is determined whether or not propeller rotational speed reduction control included in the fourth control process, which is described later, is in progress.

If it is determined in step S70 that the propeller rotational speed reduction control is not in progress, the third control process is terminated.

Figure 16:
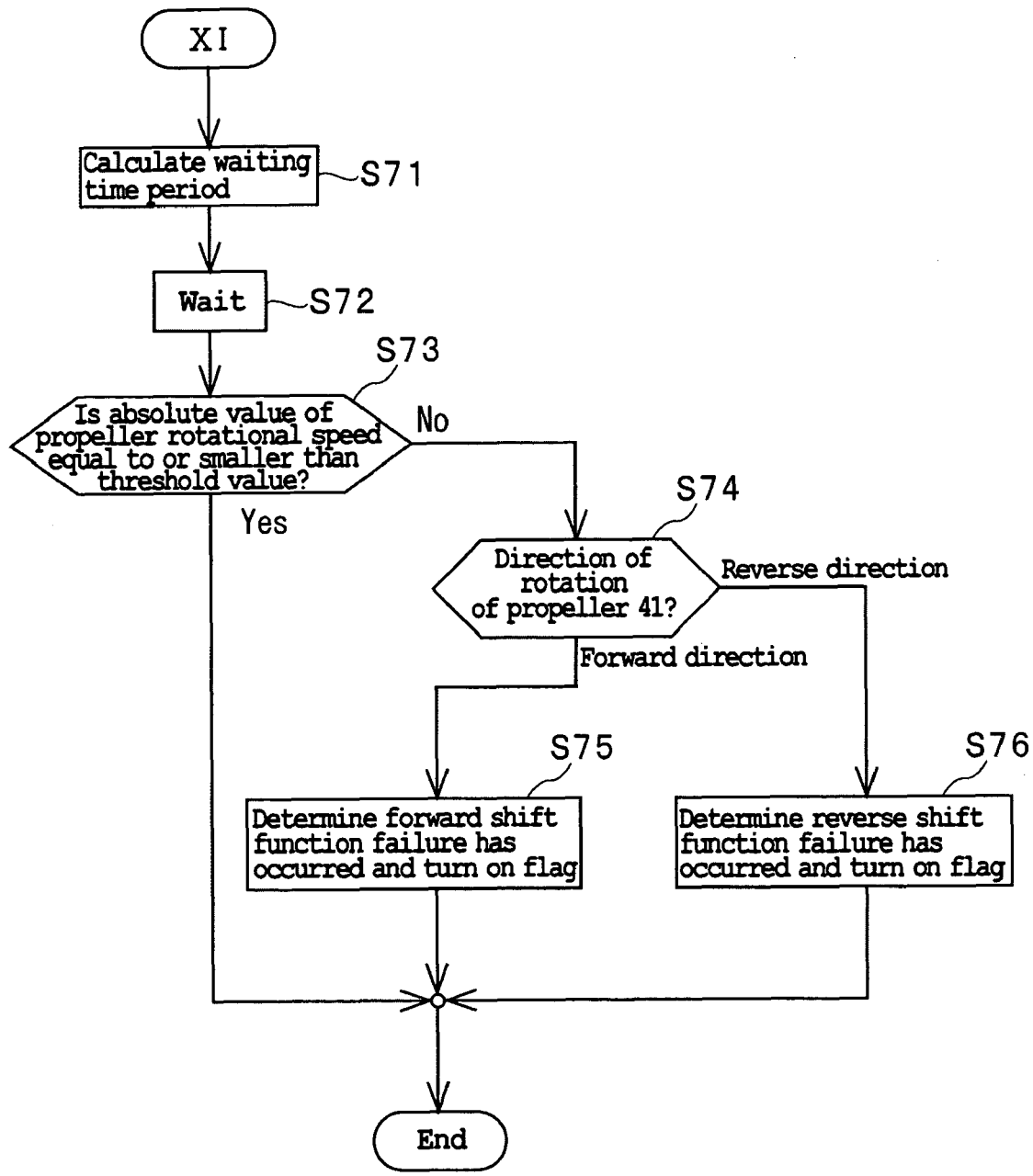
FIG. 16 is a flowchart illustrating a portion of a third control process.
Figure 21:
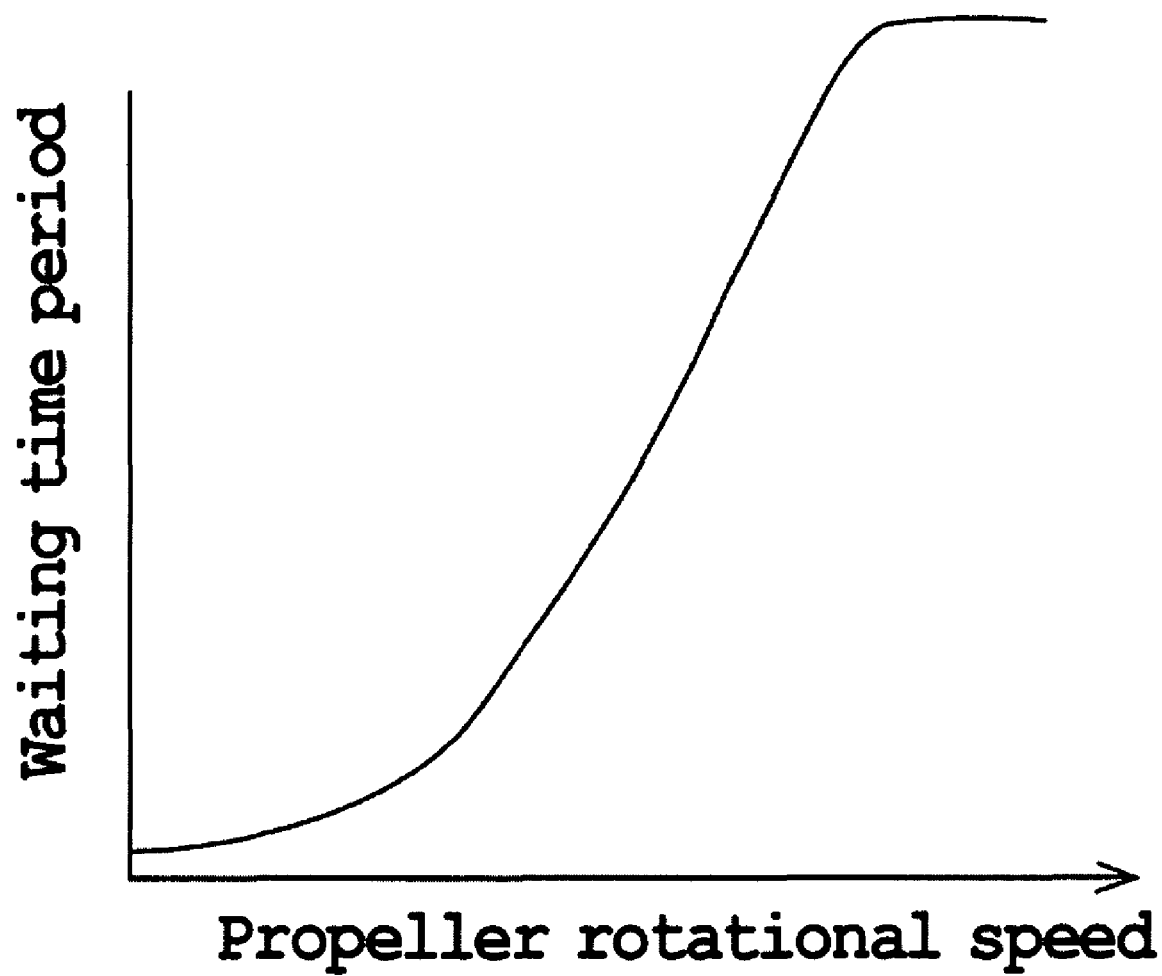
FIG. 21 is a map which defines the relationship between the propeller rotational speed and a waiting time period.

If it is determined in step S70 that the propeller rotational speed reduction control is in progress, the process proceeds to step S71 shown in FIG. 16. In step S71, the CPU 86a calculates a waiting time period. Specifically, the CPU 86a reads out a map shown in FIG. 21 from the memory 86b. The map shown in FIG. 21 is a map which defines the relationship between the propeller rotational speed and the waiting time period. The CPU 86a calculates the waiting time period by applying the propeller rotational speed input from the propeller rotational speed sensor 90 shown in FIG. 5 to the map shown in FIG. 21.

Step S72 and step S73 are performed in sequence following step S71.

In step S72, the CPU 86a waits for the waiting time period calculated in step S71 to elapse.

In step S73, the CPU 86a determines whether or not the absolute value of the propeller rotational speed is equal to or smaller than a threshold value based on the input from the propeller rotational speed sensor 90 shown in FIG. 5.

The "threshold value" in step S73 may be set as appropriate depending on the features of the outboard motor 20. The "threshold value" in step S73 may be set to about 300 to 2,000 rpm, for example.

If it is determined in step S73 that the absolute value of the propeller rotational speed is equal to or smaller than the threshold value, the third control process is terminated.

If it is determined in step S73 that the absolute value of the propeller rotational speed is greater than the threshold value, the process proceeds to step S74. In step S74, the CPU 86a determines the direction of rotation of the propeller 41.

If it is determined in step S74 that the direction of rotation of the propeller 41 is the forward direction, the process proceeds to step S75. Then, the CPU 86a determines that a forward shift function failure has occurred, turns on the forward shift function failure flag in step S75, and terminates the third control process.

If it is determined in step S74 that the direction of rotation of the propeller 41 is the reverse direction, the process proceeds to step S76. Then, the CPU 86a determines that a reverse shift function failure has occurred, turns on the reverse shift function failure flag in step S76, and terminates the third control process.

If it is determined in step S64 that the control lever 83 is not in the neutral range, the process proceeds to step S65 as shown in FIG. 14. In step S65, the CPU 86a determines the position of the control lever 83 based on the output from the shift position sensor 85.

Figure 17:
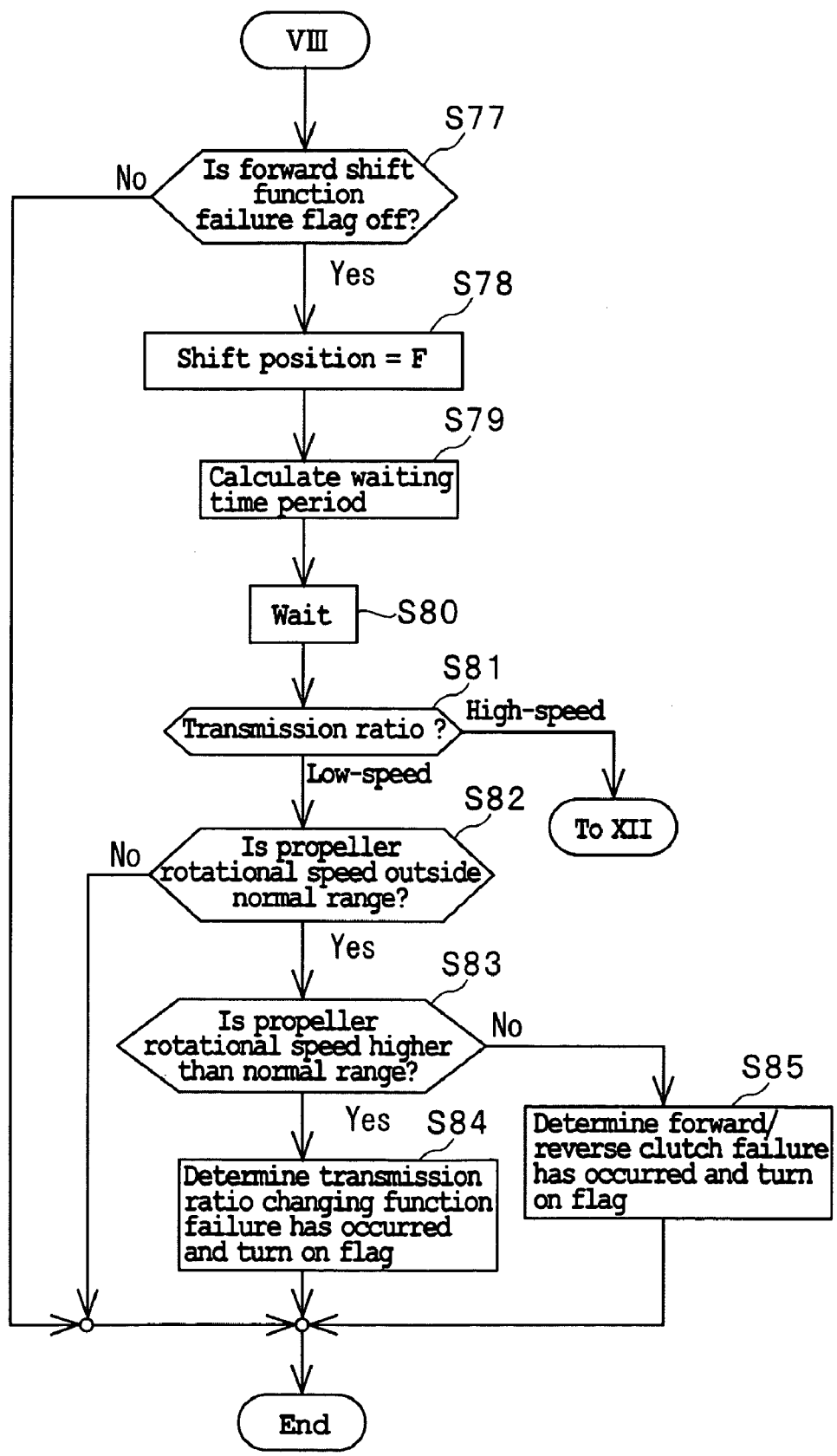
FIG. 17 is a flowchart illustrating a portion of a third control process.
Figure 18:
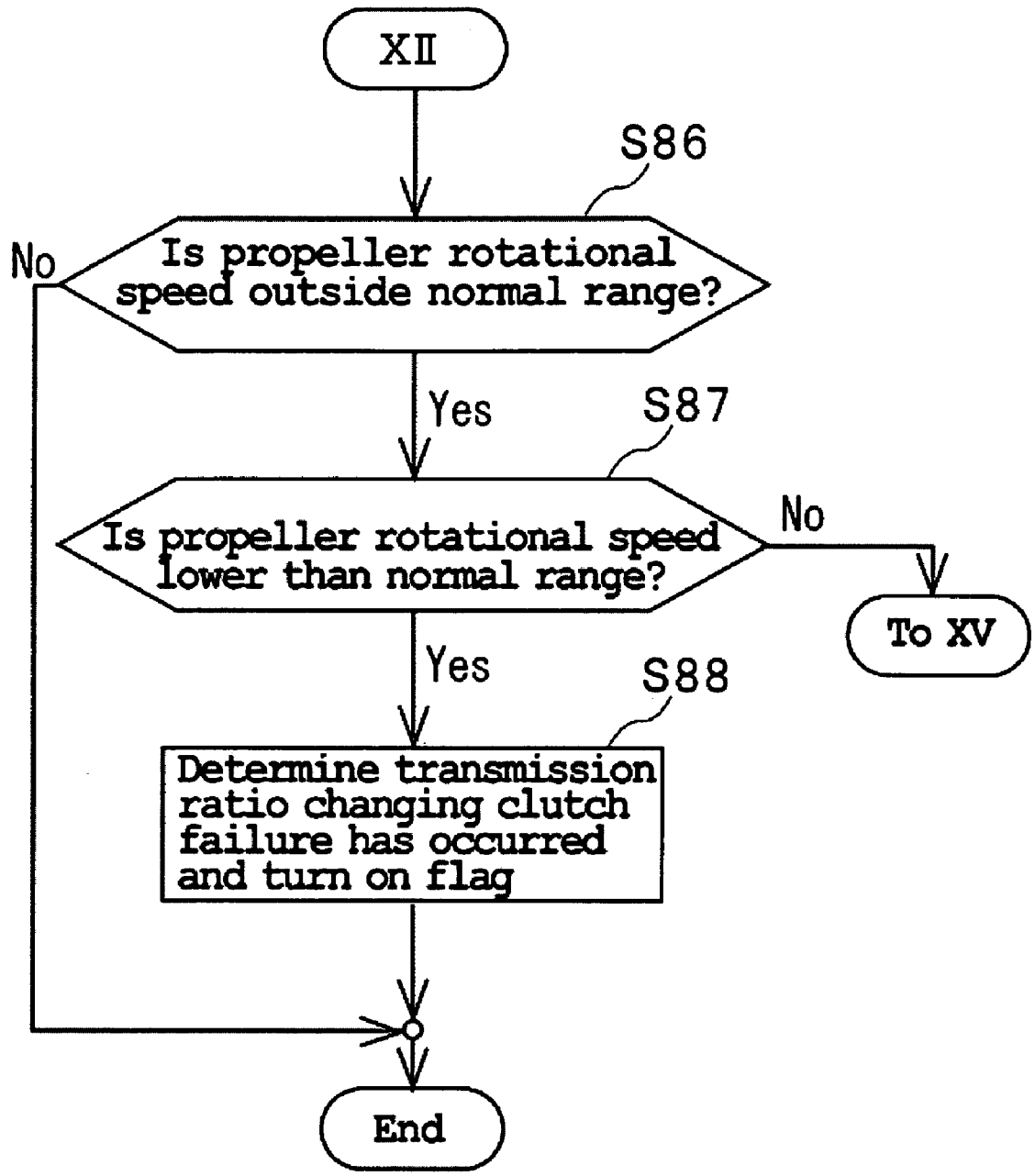
FIG. 18 is a flowchart illustrating a portion of a third control process.

If it determined in step S65 that the control lever 83 is in the forward range, the process proceeds to step S77 shown in FIG. 17.

In step S77, the CPU 86a determines whether or not the forward shift function failure flag is off. Normally, the forward shift function failure flag is off. For example, when step S77 is performed after the forward shift function failure flag was turned on in step S75 in the third control process or step S189 in the sixth control process, it is determined in step S77 that the forward shift function failure flag is on.

If it is determined in step S77 that the forward shift function failure flag is on, the third control process is terminated.

If it is determined in step S77 that the forward shift function failure flag is off, the process proceeds to step S78, step S79, step S80, and step S81 in sequence.

In step S78, the CPU 86a puts the shift position switching mechanism 36 into forward.

Figure 24:
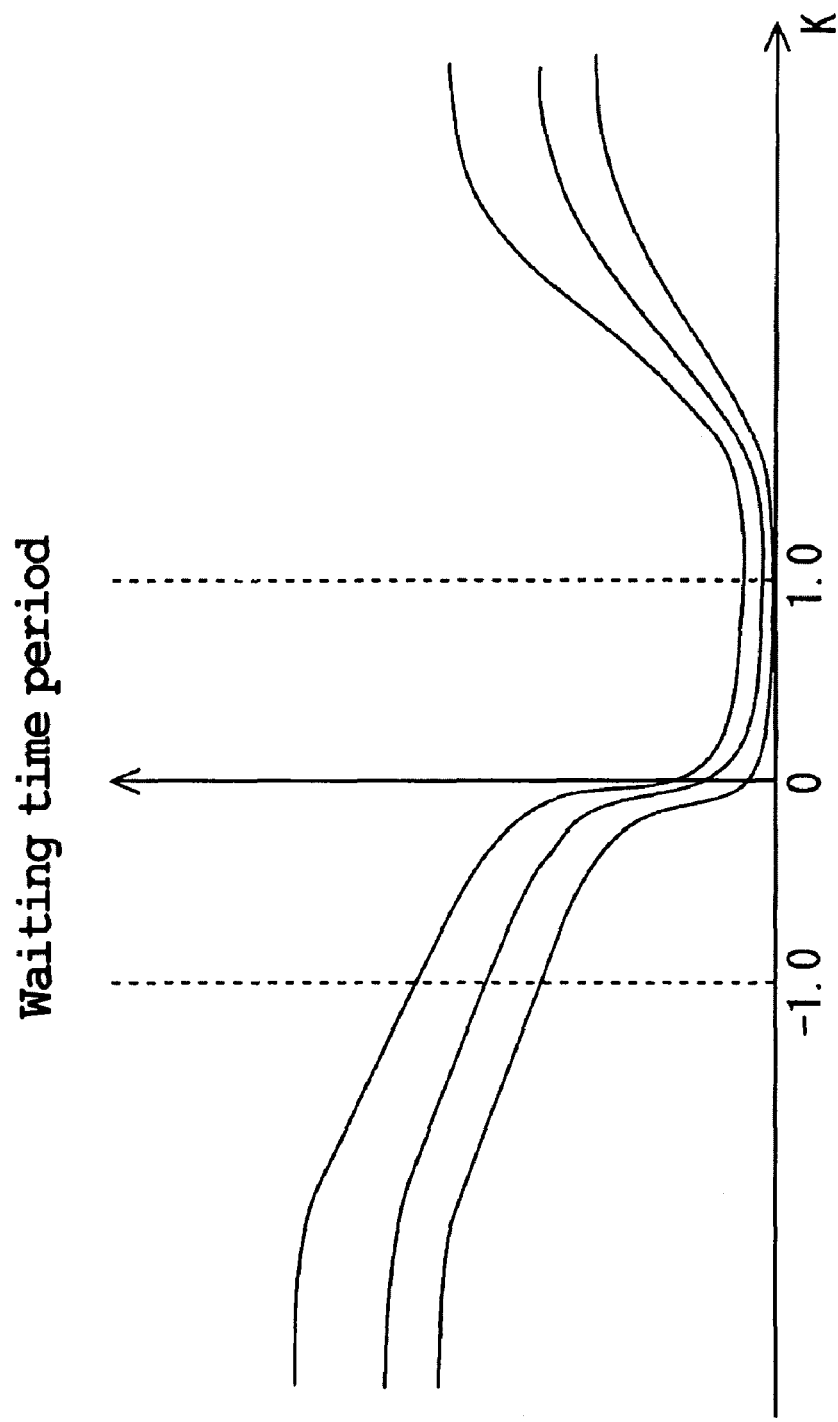
FIG. 24 is a map which defines the relationship between the propeller rotational speed and a waiting time period.

In step S79, the CPU 86a calculates a waiting time period. Specifically, the CPU 86a reads out a map shown in FIG. 24 from the memory 86b. The map shown in FIG. 24 is a map which defines the relationship between K and the waiting time period. Here, K in FIG. 24 is represented by the equation; K={(propeller rotational speed)×A}/{(speed reduction ratio)×(engine rotational speed)}. When the direction of rotation of the propeller 41 is the forward direction, A=1. When the direction of rotation of the propeller 41 is the reverse direction, A=−1. The CPU 86a calculates the waiting time period by applying the propeller rotational speed, the engine rotational speed, and the output from the propeller rotational speed sensor 90, the engine rotational speed sensor 88, and the shift position sensor 67, respectively, shown in FIG. 5 to the map shown in FIG. 24.

In step S80, the CPU 86a waits for the waiting time period calculated in step S79 to elapse.

In step S81, the CPU 86a determines the transmission ratio of the transmission ratio switching mechanism 35. If it is determined in step S81 that the transmission ratio of the transmission ratio switching mechanism 35 is the high-speed transmission ratio, the process proceeds to step S86 shown in FIG. 18.

Figure 23:
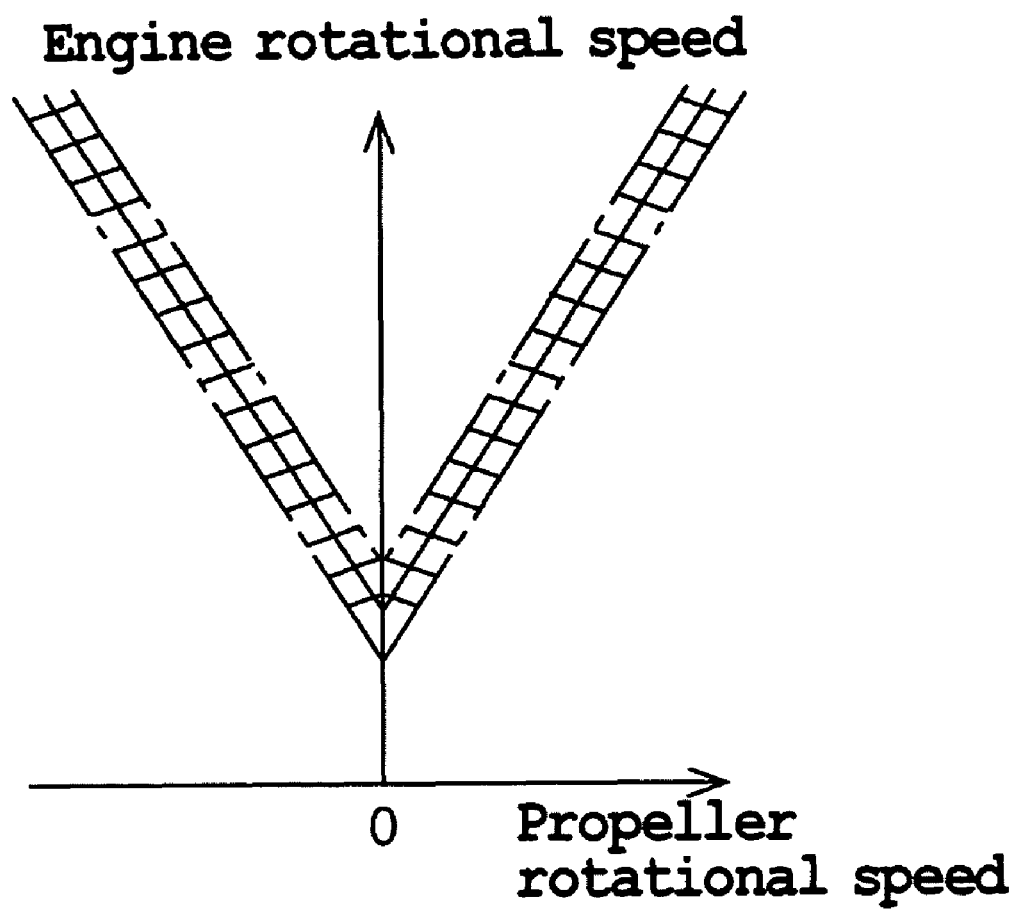
FIG. 23 is a map which defines the preferable range of the relationship between the propeller rotational speed and the engine rotational speed in the case of a high-speed transmission ratio.

In step S86, the CPU 86a determines whether or not the propeller rotational speed is outside its normal range based on the inputs from the propeller rotational speed sensor 90 and the engine rotational speed sensor 88 shown in FIG. 5. Specifically, the CPU 86a reads out a map shown in FIG. 23 from the memory 86b. The map shown in FIG. 23 is a map which defines the normal range of the relationship between the propeller rotational speed and the engine rotational speed in the case where the transmission ratio of the transmission ratio switching mechanism 35 is the high-speed transmission ratio. The hatched area in FIG. 23 represents the normal range of the relationship between the propeller rotational speed and the engine rotational speed. The CPU 86a determines whether or not the propeller rotational speed is outside its normal range by applying the propeller rotational speed and the engine rotational speed input from the propeller rotational speed sensor 90 and the engine rotational speed sensor 88, respectively, shown in FIG. 5 to the map shown in FIG. 23.

If it is determined in step S86 that the propeller rotational speed is within its normal range, the third control process is terminated.

If it is determined in step S86 that the propeller rotational speed is outside its the normal range, the process proceeds to step S87. In step S87, the CPU 86a determines whether or not the propeller rotational speed is lower than the normal range defined in the map shown in FIG. 23 based on the inputs from the propeller rotational speed sensor 90 and the engine rotational speed sensor 88 shown in FIG. 5.

If it is determined in step S87 that the propeller rotational speed is lower than the normal range, the process proceeds to step S88. In step S88, the CPU 86a determines that a transmission ratio changing clutch failure has occurred, and turns on a transmission ratio changing clutch failure flag. After the completion of step S88, the third control process is terminated.

Figure 19:
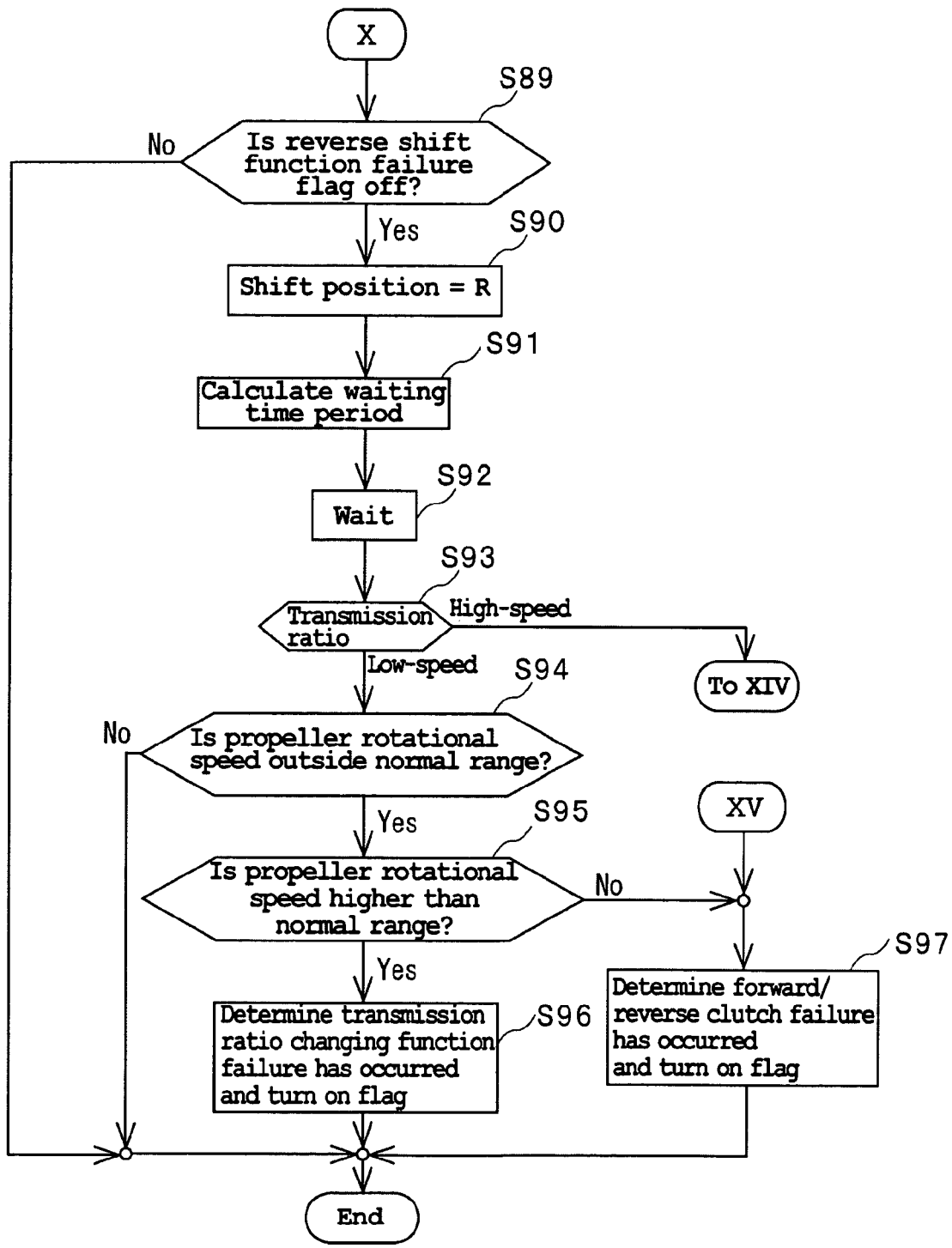
FIG. 19 is a flowchart illustrating a portion of a third control process.
Figure 20:
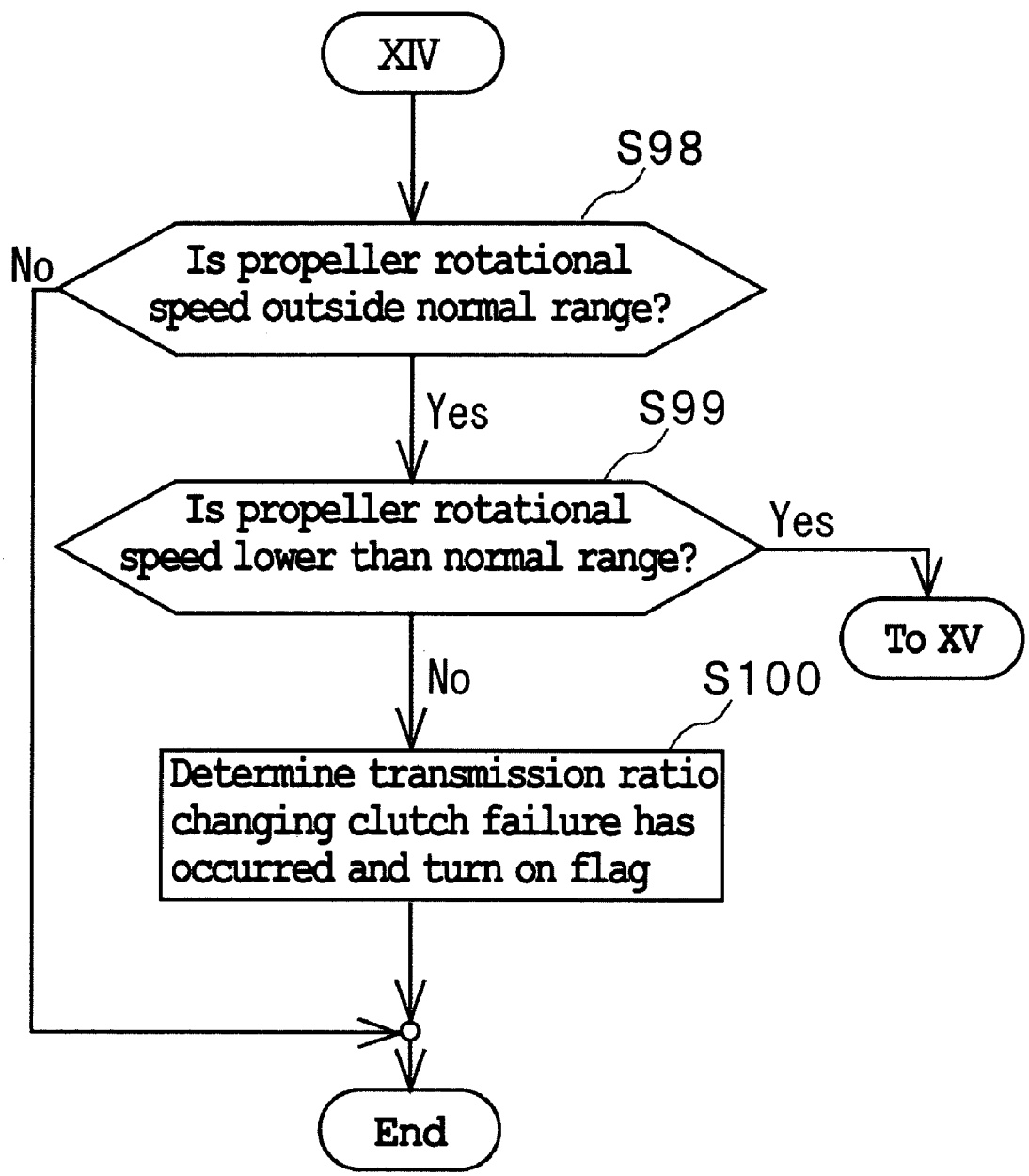
FIG. 20 is a flowchart illustrating a portion of a third control process.

If it is determined in step S87 that the propeller rotational speed is within or higher than the normal range, the process proceeds to step S97 shown in FIG. 19. In step S97, the CPU 86a determines that a forward/reverse clutch failure has occurred, and turns on a forward/reverse clutch failure flag. After the completion of step S97, the third control process is terminated.

If it is determined in step S81 shown in FIG. 17 that the transmission ratio of the transmission ratio switching mechanism 35 is the low-speed transmission ratio, the process proceeds to step S82.

Figure 22:
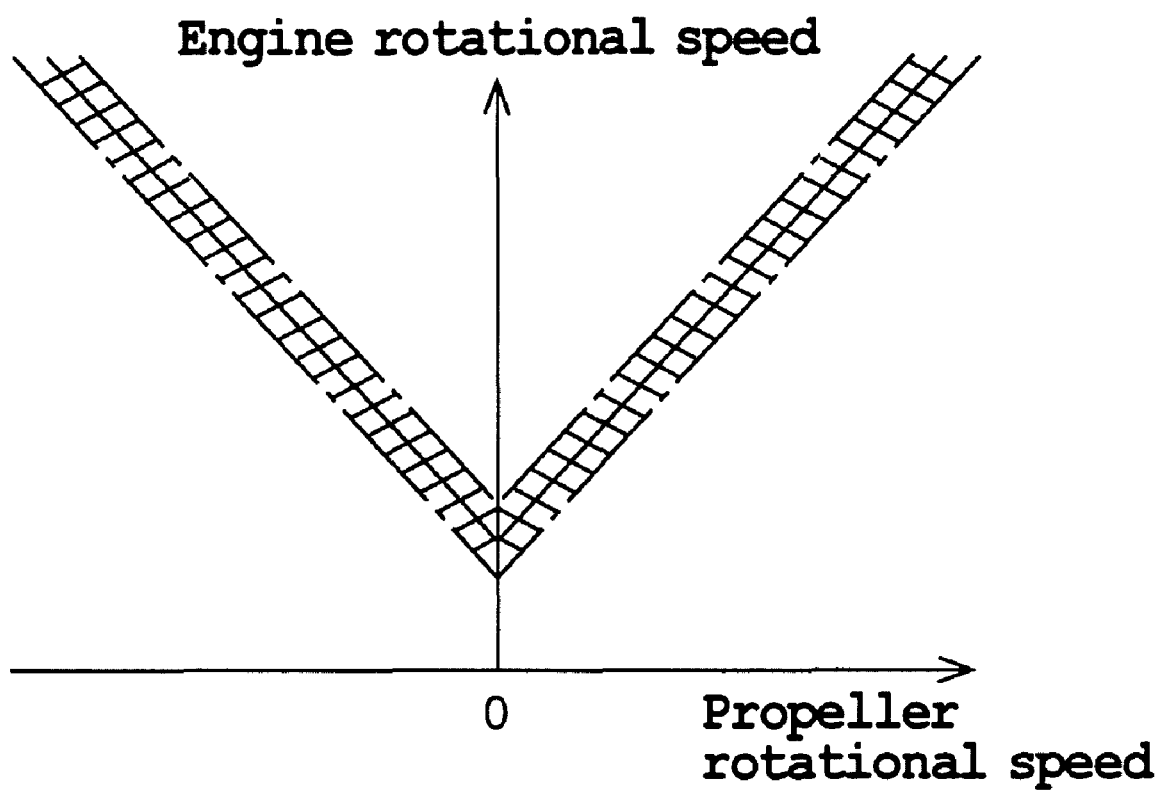
FIG. 22 is a map which defines the preferred range of the relationship between the propeller rotational speed and the engine rotational speed in the case of a low-speed transmission ratio.

In step S82, the CPU 86a determines whether or not the propeller rotational speed is outside its normal range based on the inputs from the propeller rotational speed sensor 90 and the engine rotational speed sensor 88 shown in FIG. 5. Specifically, the CPU 86a reads out a map shown in FIG. 22 from the memory 86b. The map shown in FIG. 22 is a map which defines the normal range of the relationship between the propeller rotational speed and the engine rotational speed in the case where the transmission ratio of the transmission ratio switching mechanism 35 is the low-speed transmission ratio. The hatched area in FIG. 22 represents the normal range of the relationship between the propeller rotational speed and the engine rotational speed. The CPU 86a determines whether or not the propeller rotational speed is outside its normal range by applying the propeller rotational speed and the engine rotational speed input from the propeller rotational speed sensor 90 and the engine rotational speed sensor 88, respectively, shown in FIG. 5 to the map shown in FIG. 22.

If it is determined in step S82 that the propeller rotational speed is within its normal range, the third control process is terminated.

If it is determined in step S82 that the propeller rotational speed is outside its the normal range, the process proceeds to step S83. In step S83, the CPU 86a determines whether or not the propeller rotational speed is higher than the normal range defined in the map shown in FIG. 22 based on the inputs from the propeller rotational speed sensor 90 and the engine rotational speed sensor 88 shown in FIG. 5.

If it is determined in step S83 that the propeller rotational speed is higher than the normal range, the process proceeds to step S84. In step S84, the CPU 86a determines that a transmission ratio changing function failure has occurred, and turns on the transmission ratio changing function failure flag. After the completion of step S84, the third control process is terminated.

If it is determined in step S83 that the propeller rotational speed is within or lower than the normal range, the process proceeds to step S85. In step S85, the CPU 86a determines that a forward/reverse clutch failure has occurred, and turns on a forward/reverse clutch failure flag. After the completion of step S85, the third control process is terminated.

If it is determined in step S65 that the control lever 83 is in the reverse range as shown in FIG. 14, the process proceeds to step S89 shown in FIG. 19.

In step S89, the CPU 86a determines whether or not the reverse shift function failure flag is off. Normally, the reverse shift function failure flag is off. For example, when step S89 is performed after the reverse shift function failure flag was turned on in step S76 in the third control process or step S188 in the sixth control process, it is determined in step S89 that the forward shift function failure flag is on.

If it is determined in step S89 that the reverse shift function failure flag is on, the third control process is terminated.

If it is determined in step S89 that the reverse shift function failure flag is off, the process proceeds to step S90, step S91, step S92, and step S93 in sequence.

In step S90, the CPU 86a puts the shift position switching mechanism 36 into reverse.

In step S91, the CPU 86a calculates a waiting time period. The method of calculating a waiting time period in step S91 is the same as the method of calculating a waiting time period in step S79.

In step S92, the CPU 86a waits for the waiting time period calculated in step S91 to elapse.

In step S93, the CPU 86a determines the transmission ratio of the transmission ratio switching mechanism 35. If it is determined in step S93 that the transmission ratio of the transmission ratio switching mechanism 35 is the high-speed transmission ratio, the process proceeds to step S98 shown in FIG. 20.

In step S98, the CPU 86a determines whether or not the propeller rotational speed is outside its normal range based on the inputs from the propeller rotational speed sensor 90 and the engine rotational speed sensor 88 shown in FIG. 5. Step S98 is substantially the same as step S86.

If it is determined in step S98 that the propeller rotational speed is within its normal range, the third control process is terminated.

If it is determined in step S98 that the propeller rotational speed is outside its the normal range, the process proceeds to step S99. In step S99, the CPU 86a determines whether or not the propeller rotational speed is lower than the normal range defined in the map shown in FIG. 23 based on the inputs from the propeller rotational speed sensor 90 and the engine rotational speed sensor 88 shown in FIG. 5.

If it is determined in step S99 that the propeller rotational speed is within or higher than the normal range, the process proceeds to step S100. In step S100, the CPU 86a determines that a transmission ratio changing clutch failure has occurred, and turns on a transmission ratio changing clutch failure flag. After the completion of step S100, the third control process is terminated.

If it is determined in step S99 that the propeller rotational speed is lower than the normal range, the process proceeds to step S97 shown in FIG. 19. In step S97, the CPU 86a determines that a forward/reverse clutch failure has occurred, and turns on a forward/reverse clutch failure flag. After the completion of step S97, the third control process is terminated.

If it is determined in step S19 shown in FIG. 19 that the transmission ratio of the transmission ratio switching mechanism 35 is the low-speed transmission ratio, the process proceeds to step S94.

In step S94, the CPU 86a determines whether or not the propeller rotational speed is outside its normal range based on the inputs from the propeller rotational speed sensor 90 and the engine rotational speed sensor 88 shown in FIG. 5. Step S94 is substantially the same as step S82.

If it is determined in step S94 that the propeller rotational speed is within its normal range, the third control process is terminated.

If it is determined in step S94 that the propeller rotational speed is outside its the normal range, the process proceeds to step S95. In step S95, the CPU 86a determines whether or not the propeller rotational speed is higher than the normal range defined in the map shown in FIG. 22 based on the inputs from the propeller rotational speed sensor 90 and the engine rotational speed sensor 88 shown in FIG. 5.

If it is determined in step S95 that the propeller rotational speed is higher than the normal range, the process proceeds to step S96. In step S96, the CPU 86a determines that a transmission ratio changing function failure has occurred and turns on the transmission ratio changing function failure flag. After the completion of step S84, the third control process is terminated.

If it is determined in step S95 that the propeller rotational speed is within or lower than the normal range, the process proceeds to step S97. In step S97, the CPU 86a determines that a forward/reverse clutch failure has occurred, and turns on a forward/reverse clutch failure flag. After the completion of step S97, the third control process is terminated.

(4) Fourth Control Process: Propeller Rotational Speed Reduction Control

In this preferred embodiment, if the propeller rotational speed sensor 90 detects a rotational speed of the propeller 41 when the control lever 83 is in the neutral position, the shift mechanism 34 is controlled so as to reduce the rotational speed of the propeller 41. Specifically, when the propeller rotational speed sensor 90 detects a rotational speed of the propeller 41 equal to or higher than a predetermined rotational speed for a predetermined period of time or longer, the shift mechanism 34 is controlled so as to reduce the rotational speed of the propeller 41. Also, when the outboard motor 20 is in a tilted state, or when the water detecting sensor 93 determines that the propulsion unit 33 is not positioned in water, the shift mechanism 34 is controlled so as to reduce the rotational speed of the propeller 41.

Figure 26:
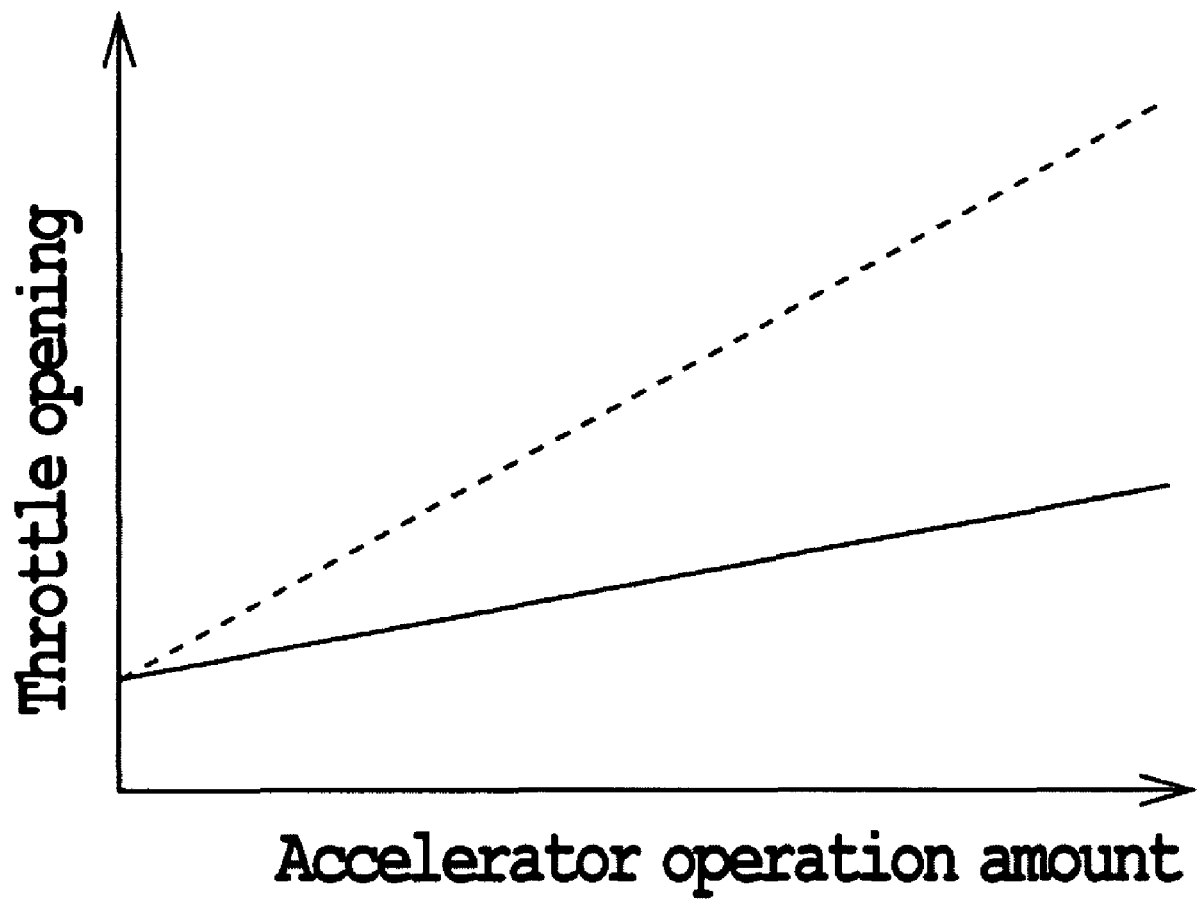
FIG. 26 is a map which defines the relationship between the accelerator operation amount and the throttle opening.
Figure 27:
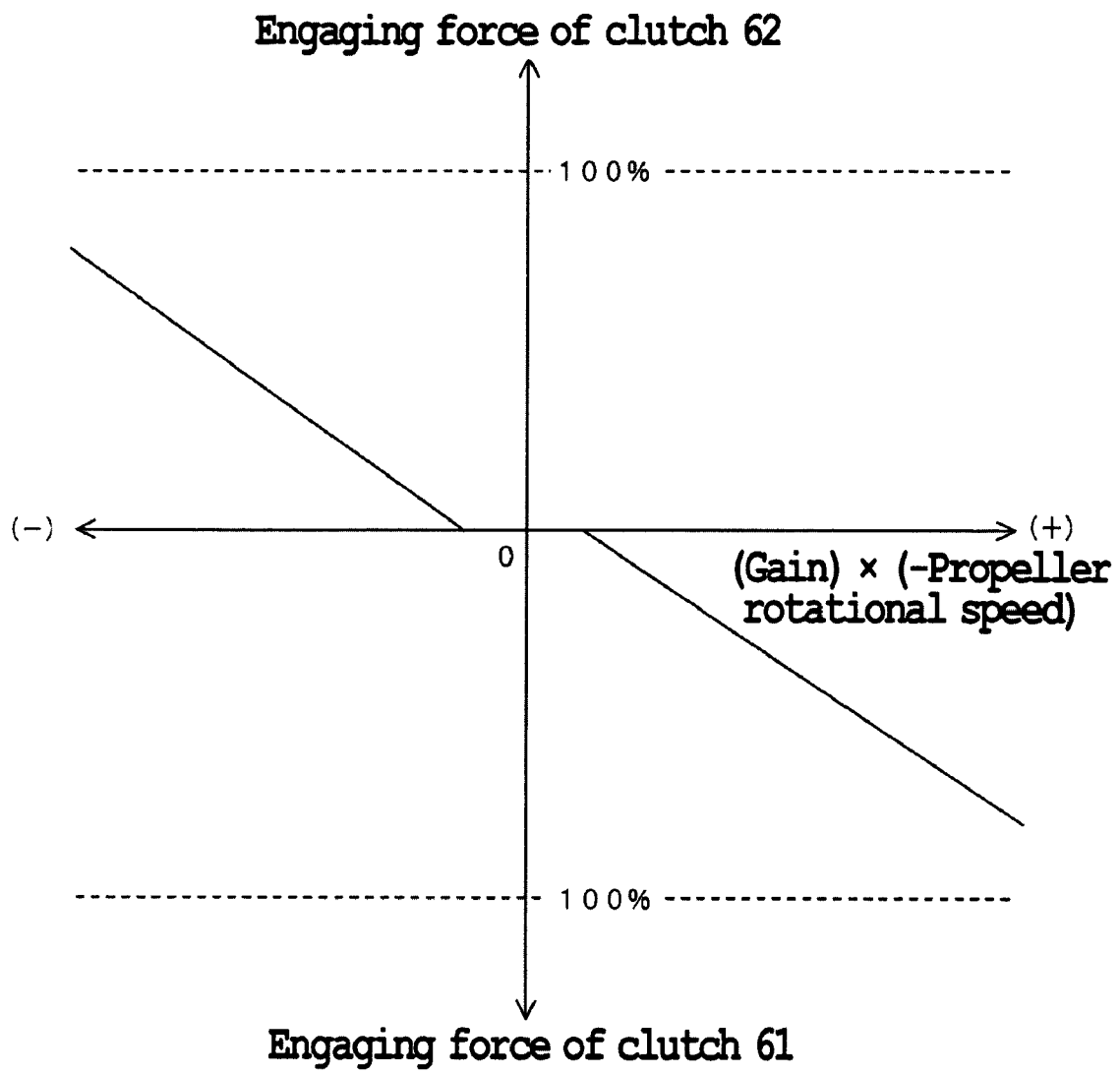
FIG. 27 is a map which defines the relationship between the engaging forces of first and second shift switching hydraulic clutches and {(gain)×(−propeller rotational speed)}.

Referring to FIG. 25 to FIG. 27, the propeller rotational speed reduction control process in this preferred embodiment is described in further detail.

When the outboard motor 20 is being driven, the control process shown in FIG. 25 is repeatedly performed. In this control process, the CPU 86a first determines the position of the canceling switch 92 in step S101. If the test operation mode has been selected by the canceling switch 92, the process proceeds to step S112.

In step S112, the CPU 86a performs test operation control. In the test operation control process, the CPU 86a controls the engine 30 based on a map shown in FIG. 26. Specifically, the map shown in FIG. 26 is stored in the memory 86b shown in FIG. 5. The CPU 86a reads out the map shown in FIG. 26 from the memory 86b in step S112. The CPU 86a controls the throttle opening according to the solid line in the map shown in FIG. 26.

Here, the broken line in the map shown in FIG. 26 is the line which is used as a reference when the throttle opening is controlled in the normal mode. In the map shown in FIG. 26, the throttle opening determined by the solid line is smaller than that determined by the broken line. Thus, in the test operation control step of step S112, the throttle opening is controlled to be smaller than in the normal mode. Therefore, in the test operation control step of step S112, the engine rotational speed is controlled to be lower than in the normal mode.

If the normal mode has been selected by the canceling switch 92, the process proceeds to step S102.

In step S102, the CPU 86a determines whether or not the tilt angle is equal to or greater than a predetermined angle. Here, the "tilt angle" is the angle between the mount bracket 24 and the swivel bracket 25. If it is determined in step S102 that the tilt angle is smaller than the predetermined angle, the process proceeds to step S103. If it is determined that the tilt angle is equal to or greater than the predetermined angle, the process proceeds to step S105.

The "predetermined angle" in step S102 may be set as appropriate depending on the features of the outboard motor 20 and so on. The "predetermined angle" in step S102 may be set to an angle at which the propeller 41 is considered to be exposed above water. Specifically, the "predetermined angle" in step S102 may be equal to or greater than 50°, for example.

In step S103, the CPU 86a determines whether or not the water detecting sensor 93 is on. If the water detecting sensor 93 is on because the propulsion unit 33 is positioned in water, the process proceeds to step S105. If the water detecting sensor 93 is off because the propulsion unit 33 is not positioned in water, the process proceeds to step S104.

In step S104, the CPU 86a determines whether or not the control lever 83 has been in the neutral position corresponding to neutral for a predetermined period of time or longer.

The "predetermined period of time" in step S104 may be set as appropriate depending on the features of the outboard motor 20. The "predetermined period of time" in step S104 may be set to about 0.1 second to about 10 seconds, for example. For example, the "predetermined period of time" may be set to about 1 second.

If it is determined in step S104 that the control lever 83 has been in the neutral position for the predetermined period of time or longer, the process proceeds to step S105. If it is determined that the control lever 83 has not been in the neutral position for the predetermined period of time or longer, the process proceeds to step S107.

In step S107, the propeller rotational speed reduction control process is cancelled. Specifically, when the propeller rotational speed reduction control is in progress, the CPU 86a cancels the propeller rotational speed reduction control process. When the propeller rotational speed reduction control process is not in progress, nothing is done.

In step S105, the CPU 86a determines whether or not the absolute value of the engine rotational speed is equal to or smaller than a predetermined threshold value. If it is determined in step S105 that the absolute value of the engine rotational speed is equal to or smaller than the predetermined threshold value, the process proceeds to step S106. If it is determined that the absolute value of the engine rotational speed is greater than the predetermined threshold value, step S106 is not performed.

The "threshold value" in step S105 may be set as appropriate depending on the features of the outboard motor 20 and so on. The "threshold value" in step S105 may be set to about 300 rpm to about 2,000 rpm, for example.

In step S106, the CPU 86a performs propeller rotational speed reduction control process. More specifically, the CPU 86a controls the shift mechanism 34 to a shift position in which rotary torque in a direction opposite the direction in which the propeller 41 is rotating is applied to the propeller 41. Specifically, the CPU 86a changes the engaging forces of the shift switching hydraulic clutches 61 and 62 with the shift connecting electromagnetic valves 73 and 74 to control the shift mechanism 34 to a shift position in which rotary torque in a direction opposite the direction in which the propeller 41 is rotating is applied to the propeller 41.

The propeller rotational speed reduction control process in this preferred embodiment is next described in detail. First, the CPU 86a acquires the rotational speed of the propeller 41 from the propeller rotational speed sensor 90. The CPU 86a multiplies the value obtained by subtracting the acquired value of the propeller rotational speed from 0 by a gain. The CPU 86a reads out a map shown in FIG. 27 from the memory 86b. The CPU 86a calculates target values for the engaging forces of the first shift switching hydraulic clutch 62 and the second shift switching hydraulic clutch 61 by inputting (gain)×(−propeller rotational speed) into the map shown in FIG. 27. Then, the CPU 86a causes the actuator 70 to change the engaging forces of the first shift switching hydraulic clutch 62 and the second shift switching hydraulic clutch 61 to the calculated engaging forces.

In the propeller rotational speed reduction control process in this preferred embodiment, the gain described above is not particularly limited. The gain may be a proportional gain, a differential gain, or an integral gain, for example.

Figure 28:
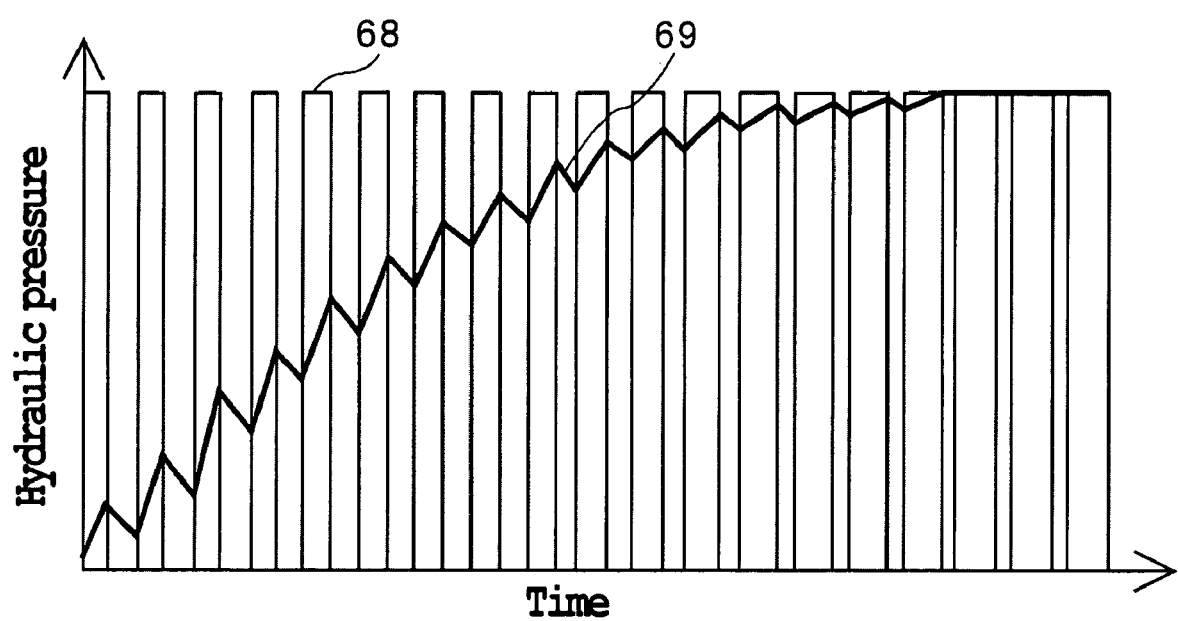
FIG. 28 is a graph showing an example of the change with time in the engaging force of a hydraulic clutch in the case where the engaging force of the hydraulic clutch is increased gradually.

In this preferred embodiment, when the engaging force of the shift switching hydraulic clutch 61 or 62 is increased, the hydraulic pressure to the shift connecting electromagnetic valve 73 or 74 is gradually increased as shown in FIG. 28. As a result, the engaging force of the shift switching hydraulic clutch 61 or 62 is gradually increased. The lines identified as "68" in FIG. 28 represent PWM signals which are output to the shift connecting electromagnetic valve 73 or 74. The curve identified as "69" in FIG. 28 represents the hydraulic pressure to the shift connecting electromagnetic valve 73 or 74.

As described above, in this preferred embodiment, if the propeller rotational speed sensor 90 detects a rotational speed of the propeller 41 when the control lever 83 is in the neutral position, the shift mechanism 34 is controlled so as to reduce the rotational speed of the propeller 41. Thus, the rotation of the propeller 41 can be restricted when the control lever 83 is in the neutral position.

Especially, in this preferred embodiment, the rotation of the propeller 41 is restricted by applying rotary torque in a direction opposite the direction in which the propeller 41 is rotating to the propeller 41. Thus, the rotation of the propeller 41 can be restricted more quickly. Also, the rotational speed of the propeller 41 can be maintained within a narrower range.

Also, in this preferred embodiment, the magnitudes of the hydraulic pressures to be supplied to the shift connecting electromagnetic valves 73 and 74 can be gradually changed. In other words, the hydraulic pressures to be supplied to the shift connecting electromagnetic valves 73 and 74 can be of any desired magnitude. Thus, the rotational speed of the propeller 41 can be maintained within a very narrow range.

In this preferred embodiment, an example in which the propeller rotational speed reduction control is achieved by controlling the shift mechanism 34. However, the propeller rotational speed reduction control may not necessarily be achieved by controlling the shift mechanism 34 alone. For example, the propeller rotational speed reduction control may be achieved by controlling the shift mechanism 34 and controlling the output of the engine 30. Also, the propeller rotational speed reduction control may be achieved by controlling the output of the engine 30 without controlling the shift mechanism 34, for example.

In this preferred embodiment, the shift mechanism 34 is also controlled so as to reduce the rotational speed of the propeller 41 if the propeller rotational speed sensor 90 detects a rotational speed of the propeller 41 when the tilt angle is equal to or greater than a predetermined angle. Thus, when the propeller 41 does not substantially contribute to propulsion, such as when the propeller 41 is exposed above water, and when the control lever 83 is in the neutral position, the rotation of the propeller 41 is restricted.

(5) Fifth Control Process

Referring primarily to FIG. 29 to FIG. 31, the fifth control process in this preferred embodiment is next described.

First, the CPU 86a determines in step S130 whether or not a system failure flag is off as shown in FIG. 29. Here, the system failure flag is a flag which indicates a failure of the engine rotational speed sensor 88, the water detecting sensor 93, the propeller rotational speed sensor 90, and so on.

If it is determined in step S130 that the system failure flag is on, step S134 and step S135 are performed in sequence.

In step S134, the CPU 86a stops the engine 30.

In step S135, the CPU 86a causes the valve driving section 102 to turn off the electromagnetic valve 76.

In step S136, the CPU 86a causes the actuator 70 to put the shift position switching mechanism 36 shown in FIG. 2 into neutral. Step S136 is followed by step S138 shown in FIG. 30.

If it is determined in step S130 that the system failure flag is off, the process proceeds to step S131. In step S131, the CPU 86a determines whether or not there is a failure condition in which an overcurrent is flowing through any of the electromagnetic valves 72 to 74 and 76 based on the output from the valve supply current detecting section 103.

If it is determined in step S131 that there is a failure condition in which an overcurrent is flowing through at least one of the valves 72 to 74 and 76, the process proceeds to step S137 shown in FIG. 30.

If it is determined in step S131 shown in FIG. 29 that there is not a failure condition in which an overcurrent is flowing through at least one of the valves 72 to 74 and 76, the process proceeds to step S132. In step S132, the CPU 86a determines whether or not an abnormal current is flowing through the drive circuit of the electromagnetic valve 74 based on the output from the valve supply current detecting section 103.

If it is determined in step S132 that an abnormal current is flowing through the drive circuit of the valve 74, the process proceeds to step S133. In step S133, the CPU 86a determines whether or not an abnormal current is flowing through the drive circuit of the valve 73 based on the output from the valve supply current detecting section 103. If it is determined in step S133 that an abnormal current is flowing through the drive circuit of the valve 73, the process proceeds to step S137 shown in FIG. 30.

In step S137, the CPU 86a stops the engine 30.

Step S138 to step S141 shown in FIG. 30 are performed in sequence following step S137. Also, as described above, step S138 to step S141 are performed in sequence following step S136 shown in FIG. 29.

In step S138, the CPU 86a causes the relay driving section 100 to turn off the electric power source relay 99.

In step S139, the CPU 86a causes the warning device 89 shown in FIG. 5 to provide a warning indicating that a shift function failure has occurred.

In step S140, the CPU 86a records the failures which have been determined until now since the main switch 96 shown in FIG. 6 was turned on in the memory 86b.

In step S141, the CPU 86a determines whether or not the main switch 96 has been turned off based on the output from the main switch state detecting section 98.

If it is determined in step S141 that the main switch 96 is on, step S141 is performed again. If it is determined in step S141 that the main switch 96 has been turned off, the fifth control process is terminated.

If it is determined in step S132 shown in FIG. 29 that an abnormal current is not flowing through the drive circuit of the valve 74, the process proceeds to step S142 shown in FIG. 31. In step S142, the CPU 86a determines whether or not an abnormal current is flowing through the drive circuit of the electromagnetic valve 73 based on the output from the valve supply current detecting section 103.

If it is determined in step S142 that an abnormal current is flowing through the drive circuit of the electromagnetic valve 73, the process proceeds to step S145. If it is determined in step S133 shown in FIG. 29 that an abnormal current is not flowing through the drive circuit of the electromagnetic valve 73, the process also proceeds to step S145. In step S145, the CPU 86a determines that a forward/reverse clutch failure has occurred, and turns on the forward/reverse clutch failure flag.

After the completion of step S145, step S130 shown in FIG. 29 is performed again.

If it is determined in step S142 that an abnormal current is not flowing through the drive circuit of the electromagnetic valve 73, the process proceeds to step S143. In step S143, the CPU 86a determines whether or not an abnormal current is flowing through the drive circuit of the electromagnetic valve 76 based on the output from the valve supply current detecting section 103.

If it is determined in step S143 that an abnormal current is flowing through the drive circuit of the electromagnetic valve 76, the process proceeds to step S144.

In step S144, the CPU 86a causes the warning device 89 shown in FIG. 5 to provide a warning indicating that the valve 76 has a failure.

After the completion of step S144, step S130 shown in FIG. 29 is performed again.

If it is determined in step S143 that an abnormal current is not flowing through the drive circuit of the electromagnetic valve 76, the process proceeds to step S146. In step S146, the CPU 86a determines whether or not an abnormal current is flowing through the drive circuit of the electromagnetic valve 72 based on the output from the valve supply current detecting section 103.

If it is determined in step S146 that an abnormal current is not flowing through the drive circuit of the electromagnetic valve 72, the process returns to step S130 shown in FIG. 29.

If it is determined in step S146 that an abnormal current is flowing through the drive circuit of the electromagnetic valve 72, the process proceeds to step S147. In step S147, the CPU 86a determines that a transmission ratio changing function failure has occurred, and turns on the transmission ratio changing function failure flag. After the completion of step S147, step S130 shown in FIG. 29 is performed again.

(6) Sixth Control Process

Referring primarily to FIG. 32 to FIG. 37, the sixth control process in this preferred embodiment is next described.

Figure 32:
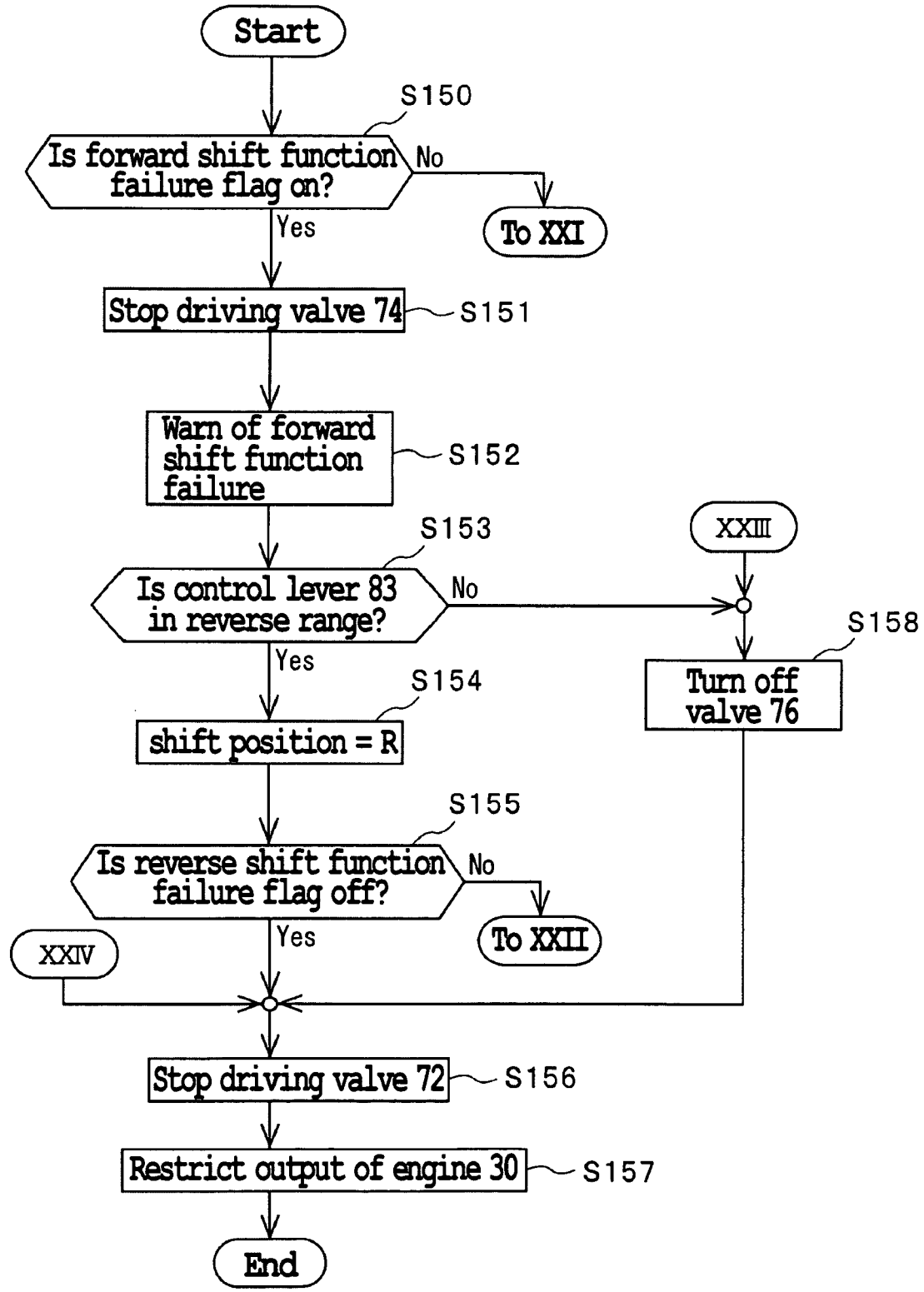
FIG. 32 is a flowchart illustrating a portion of a fifth control process.

In the sixth control process in this preferred embodiment, step S150 is first performed as shown in FIG. 32. In step S150, the CPU 86a determines whether or not the forward shift function failure flag has been turned on. Normally, the forward shift function failure flag is not on. For example, when step S150 is performed after the forward shift function failure flag was turned on in step S75 in the third control process or in step S189 in the sixth control process, it is determined in step S150 that the forward shift function failure flag is on.

If it is determined in step S150 that the forward shift function failure flag is on, step S151, step S152, and step S153 are performed in sequence.

In step S151, the CPU 86a causes the valve driving section 102 to stop driving the electromagnetic valve 74.

In step S152, the CPU 86a causes the warning device 89 shown in FIG. 5 to provide a warning indicating that a forward shift function failure has occurred.

In step S153, the CPU 86a determines whether or not the control lever 83 is in the reverse range corresponding to reverse based on the output from the shift position sensor 85 shown in FIG. 5.

If it is determined in step S153 that the control lever 83 is not in the reverse range, the process proceeds to step S158. In step S158, the CPU 86a causes the valve driving section 102 to turn off the electromagnetic valve 76. After the completion of step S158, step S156 is performed.

If it is determined in step S153 that the control lever 83 is in the reverse range, step S154 and step S155 are performed in sequence.

In step S154, the CPU 86a causes the actuator 70 shown in FIG. 2 to put the shift position switching mechanism 36 into reverse.

In step S155, the CPU 86a determines whether or not the reverse shift function failure flag is off. Normally, the reverse shift function failure flag is off. For example, when step S155 is performed after the reverse shift function failure flag was turned on in step S76 in the third control process or in step S188 in the sixth control process, it is determined in step S155 that the reverse shift function failure flag is on.

Figure 33:
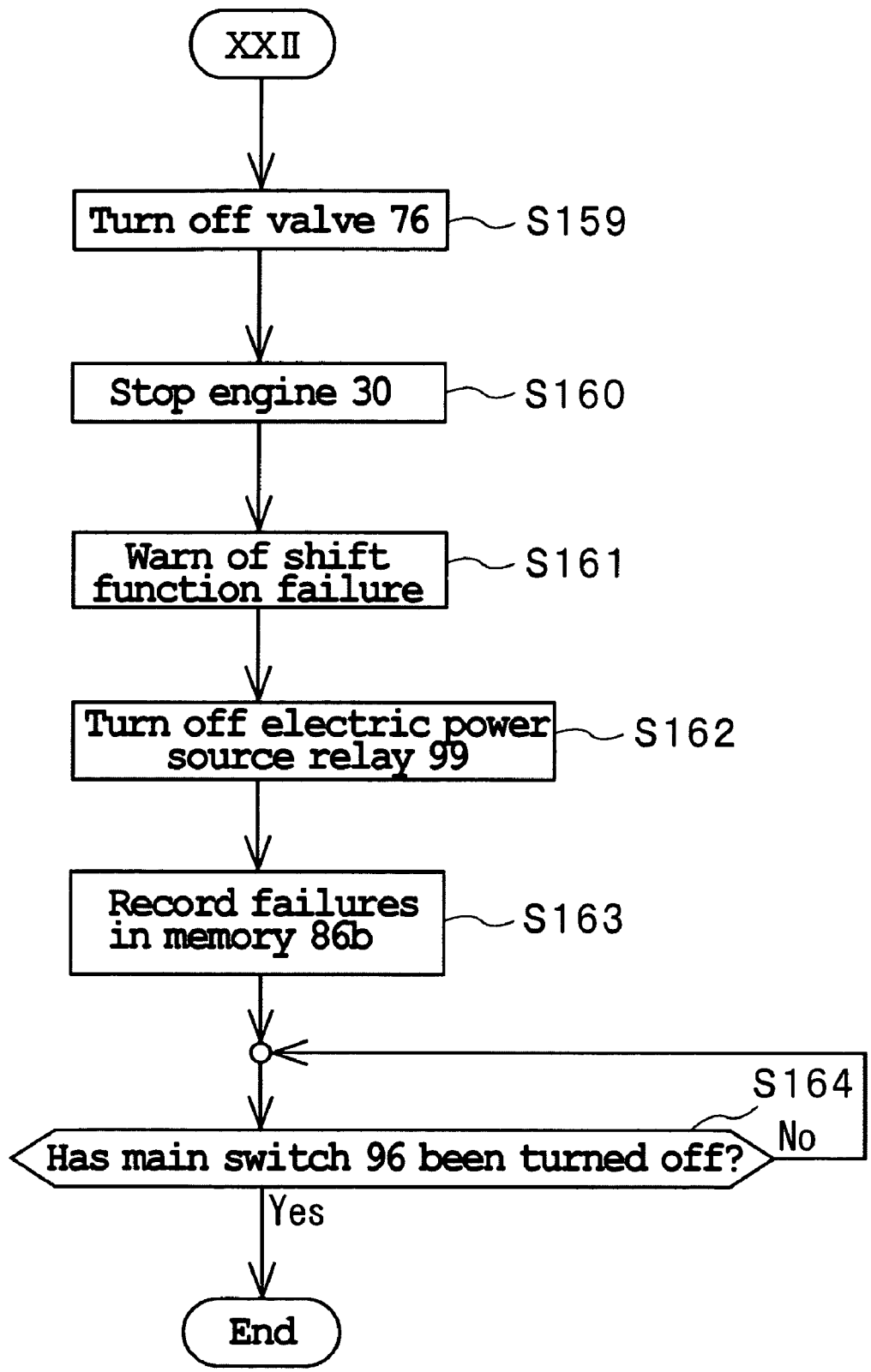
FIG. 33 is a flowchart illustrating a portion of a fifth control process.

If it is determined in step S155 that the reverse shift function failure flag is on, step S159 to step S164 shown in FIG. 33 are performed in sequence.

In step S159, the CPU 86a causes the valve driving section 102 to turn off the electromagnetic valve 76.

In step S160, the CPU 86a stops the engine 30.

In step S161, the CPU 86a causes the warning device 89 shown in FIG. 5 to provide a warning indicating that a shift function failure has occurred.

In step S162, the CPU 86a causes the relay driving section 100 to turn off the electric power source relay 99.

In step S163, the CPU 86a records the failures which have been determined until now since the main switch 96 was turned on in the memory 86b.

In step S164, the CPU 86a determines whether or not the main switch 96 has been turned off based on the output from the main switch state detecting section 98.

If it is determined in step S164 that the main switch 96 has not been turned off, step S164 is performed again. If it is determined in step S164 that the main switch 96 has been turned off, the sixth control process is terminated.

Figure 34:
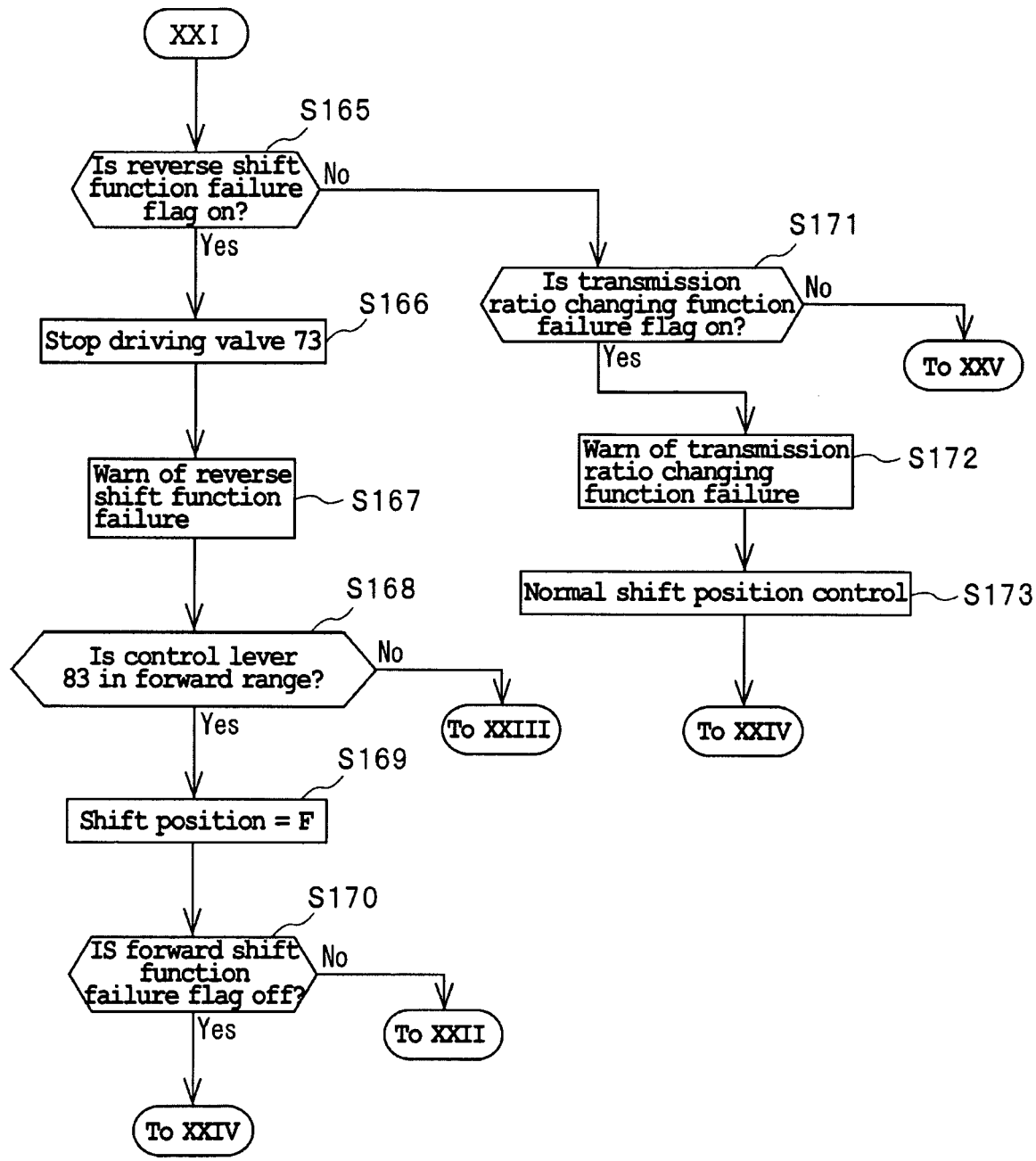
FIG. 34 is a flowchart illustrating a portion of a fifth control process.

If it is determined in step S150 shown in FIG. 32 that the forward shift function failure flag is not on, the process proceeds to step S165 shown in FIG. 34. In step S165, the CPU 86a determines whether or not the reverse shift function failure flag has been turned on.

If it is determined in step S165 that the reverse shift function failure flag has been turned on, step S166, step S167, and step S168 are performed in sequence.

In step S166, the CPU 86a causes the valve driving section 102 to stop driving the electromagnetic valve 73.

In step S167, the CPU 86a causes the warning device 89 shown in FIG. 5 to provide a warning indicating that a reverse shift function failure has occurred.

In step S168, the CPU 86a determines whether or not the control lever 83 is in the forward range based on the output from the shift position sensor 85 shown in FIG. 5.

If it is determined in step S168 that the control lever 83 is not in the forward range, the process proceeds to step S158 shown in FIG. 32. In step S158, the CPU 86a causes the valve driving section 102 to turn off the electromagnetic valve 76. Step S158 is followed by step S156.

If it is determined in step S168 shown in FIG. 34 that the control lever 83 is in the forward range, step S169 and step S170 are performed in sequence.

In step S169, the CPU 86a causes the actuator 70 shown in FIG. 2 to put the shift position switching mechanism 36 into forward.

In step S170, the CPU 86a determines whether or not the forward shift function failure flag is off. Normally, the forward shift function failure flag is off. For example, when step S170 is performed after the forward shift function failure flag was turned on in step S75 in the third control process or in step S189 in the sixth control process, it is determined in step S170 that the forward shift function failure flag is on.

If it is determine in step S170 that the forward shift function failure flag is on, step S159 to step S164 shown in FIG. 33 are performed in sequence just as in the case where it is determined that the reverse shift function failure flag is on in step S155.

If it is determined in step S170 that the forward shift function failure flag is off, step S156 and step S157 shown in FIG. 32 are performed in sequence. Also, step S156 and step S157 are performed in sequence following step S155 and step S158.

In step S156, the CPU 86a causes the valve driving section 102 to stop driving the electromagnetic valve 72.

In step S157, the CPU 86a restricts the engine output. Specifically, the throttle opening relative to the accelerator operation amount is restricted. After the completion of step S157, the sixth control process is terminated.

If it is determined in step S165 shown in FIG. 34 that the reverse shift function failure flag is off, the process proceeds to step S171. In step S171, the CPU 86a determines whether or not the transmission ratio changing function failure flag is on. Normally, the transmission ratio changing function failure flag is off. For example, when step S171 is performed after the transmission ratio changing function failure flag was turned on in step S84 or step S196 in the third control process or in step S147 in the fifth control process, it is determined in step S171 that the transmission ratio changing function failure flag is on.

If it is determined in step S171 that the transmission ratio changing function failure flag is on, step S172 and step S173 are performed in sequence.

In step S172, the CPU 86a causes the warning device 89 shown in FIG. 5 to provide a warning indicating that a transmission ratio changing function failure has occurred.

In step S173, the CPU 86a performs normal shift position control. That is, even if it is determined in step S171 that the transmission ratio changing function failure flag is on, a normal shift position change is carried out.

After the completion of step S173, step S156 and step S157 shown in FIG. 32 as described above are performed, and the sixth control process is terminated.

Figure 35:
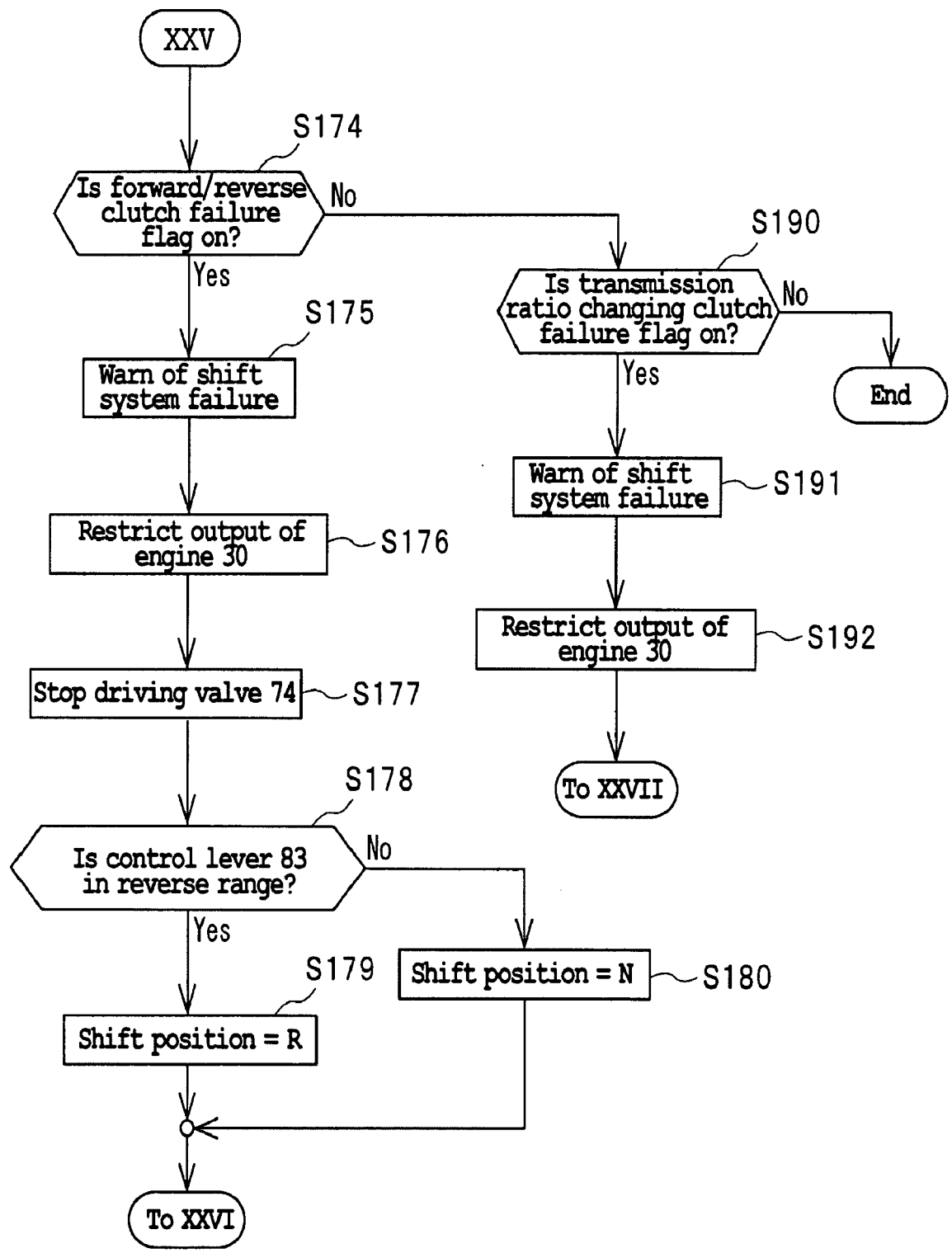
FIG. 35 is a flowchart illustrating a portion of a fifth control process.

If it is determined in step S171 that the transmission ratio changing function failure flag is off, the process proceeds to step S174 shown in FIG. 35. In step S174, the CPU 86a determines whether or not the forward/reverse clutch failure flag has been turned on. Normally, the forward/reverse clutch failure flag is off. For example, when step S174 is performed after the forward/reverse clutch failure flag was turned on in step S85 or step S97 in the third control process or in step S145 in the fifth control process, it is determined in step S174 that the forward/reverse clutch failure flag is on.

If it is determined in step S174 that the forward/reverse clutch failure flag is on, step S175 to step S178 are performed in sequence.

In step S175, the CPU 86a causes the warning device 89 shown in FIG. 5 to provide a warning indicating that a shift system failure has occurred.

In step S176, the CPU 86a restricts the output of the engine 30.

In step S177, the CPU 86a causes the valve driving section 102 to stop driving the electromagnetic valve 74.

In step S178, the CPU 86a determines whether or not the control lever 83 is in the reverse range based on the output from the shift position sensor 85 shown in FIG. 5.

If it is determined in step S178 that the control lever 83 is in the reverse range, the process proceeds to step S179. In step S179, the CPU 86a causes the actuator 70 shown in FIG. 2 to put the shift position switching mechanism 36 into reverse.

If it is determined in step S178 that the control lever 83 is not in the reverse range, the process proceeds to step S180. In step S180, the CPU 86a causes the actuator 70 shown in FIG. 2 to put the shift position switching mechanism 36 into neutral.

Figure 36:
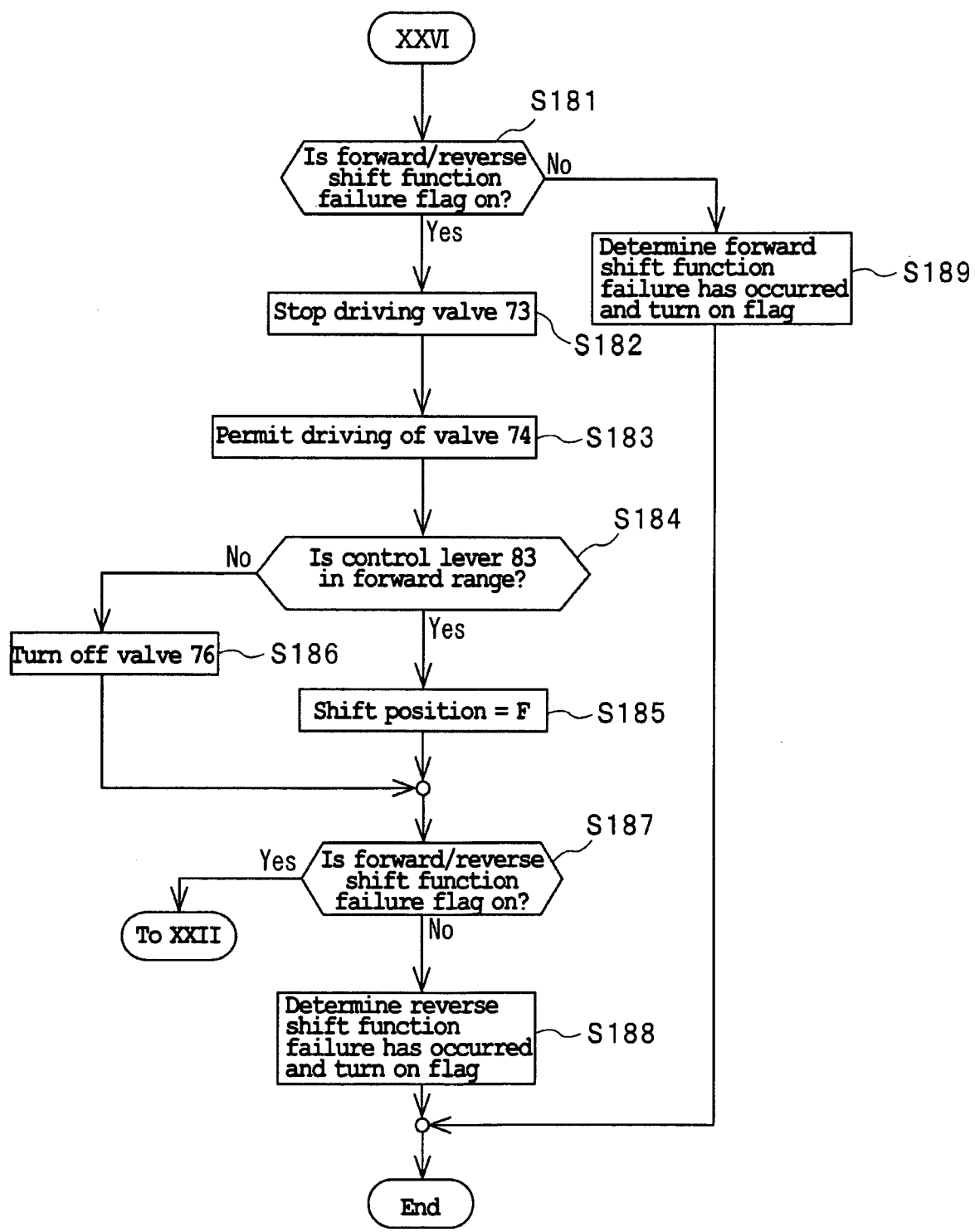
FIG. 36 is a flowchart illustrating a portion of a fifth control process.

Step S181 shown in FIG. 36 is performed following step S179 and step S180. In step S181, the CPU 86a determines whether or not a forward/reverse shift function failure flag is on.

If it is determined in step S181 that the forward/reverse shift function failure flag is off, the process proceeds to step S189. In step S189, the CPU 86a determines that a forward shift function failure has occurred, and turns on the forward shift function failure flag. After the completion of step S189, the sixth control process is terminated.

If it is determined in step S181 that the forward/reverse shift function failure flag is on, step S182 to step S184 are performed in sequence.

In step S182, the CPU 86a causes the valve driving section 102 to stop driving the electromagnetic valve 73.

In step S183, the CPU 86a permits the valve driving section 102 to drive the electromagnetic valve 74.

In step S184, the CPU 86a determines whether or not the control lever 83 is in the forward range based on the output from the shift position sensor 85 shown in FIG. 5.

If it is determined in step S184 that the control lever 83 is in the forward range, the process proceeds to step S185. In step S185, the CPU 86a causes the actuator 70 shown in FIG. 2 to put the shift position switching mechanism 36 into forward.

If it is determined in step S184 that the control lever 83 is not in the forward range, the process proceeds to step S186. In step S186, the CPU 86a causes the valve driving section 102 to turn off the electromagnetic valve 76.

Step S187 is performed following step S185 and step S186. In step S187, the CPU 86a determines whether or not the forward/reverse shift function failure flag is on. Here, if the forward/reverse shift function failure flag has been cancelled after it was determined in step S181 that the forward/reverse shift function failure flag was on, it is determined in step S187 that the forward/reverse shift function failure flag is off.

If it is determined in step S187 that the forward/reverse shift function failure flag is on, step S159 to step S164 shown in FIG. 33 are performed, and then the sixth control process is terminated.

If it is determined in step S187 that the forward/reverse shift function failure flag is off, the process proceeds to step S188. In step S188, the CPU 86a determines that a reverse shift function failure has occurred, and turns on the reverse shift function failure flag. After the completion of step S188, the sixth control process is terminated.

If it is determined in step S174 shown in FIG. 35 that the forward/reverse clutch failure flag is off, the process proceeds to step S190.

In step S190, the CPU 86a determines whether or not the transmission ratio changing clutch failure flag is on. Normally, the transmission ratio changing clutch failure flag is off. For example, when step S190 is performed after the transmission ratio changing clutch failure flag was turned on in step S88 or step S100 in the third control process, it is determined in step S190 that the transmission ratio changing clutch failure flag is on.

If it is determined in step S190 that the transmission ratio changing clutch failure flag is off, the sixth control process is terminated.

Figure 37:
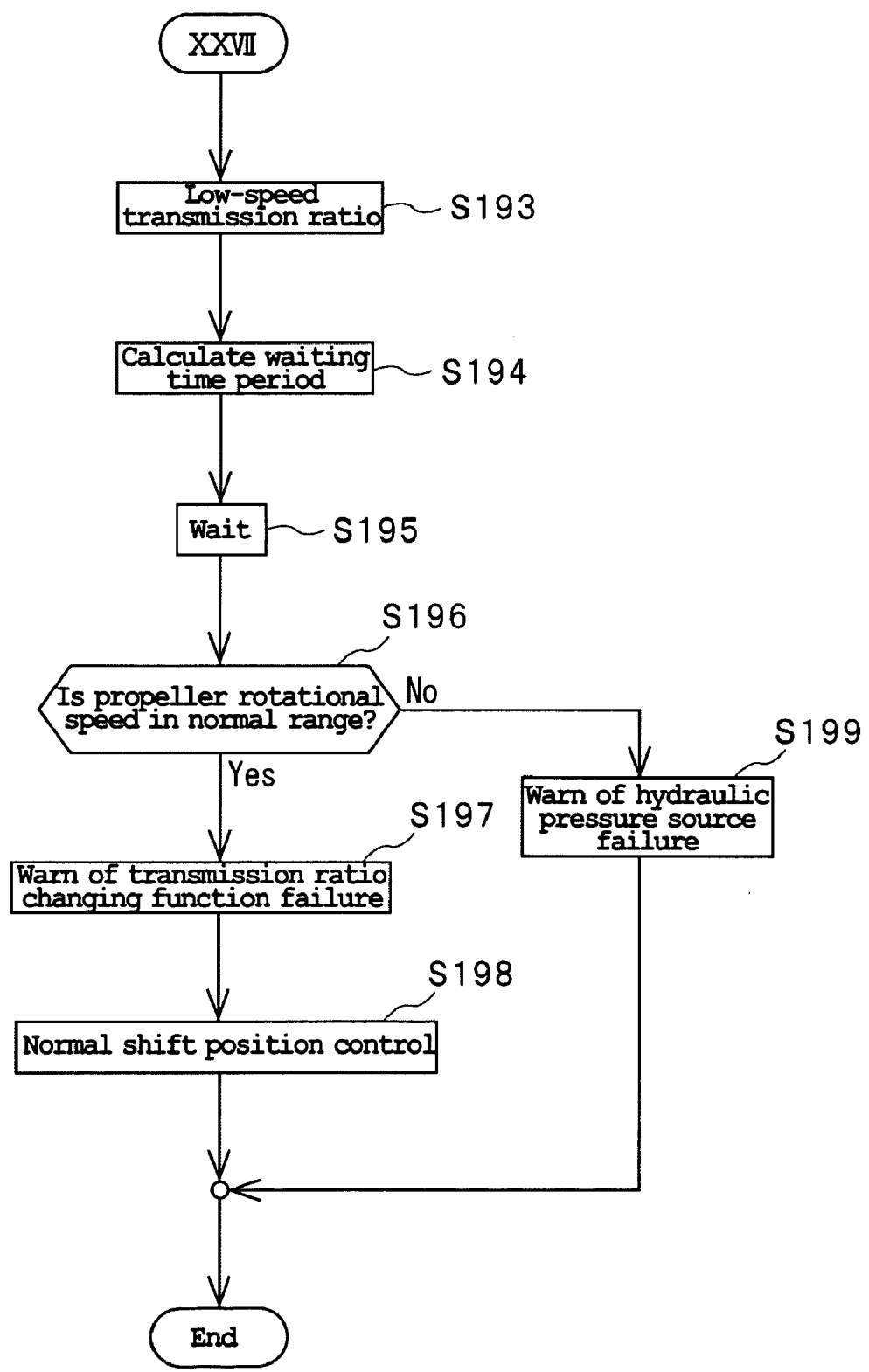
FIG. 37 is a flowchart illustrating a portion of a fifth control process.

If it is determined in step S190 that the transmission ratio changing clutch failure flag is on, step S191 and step S192, and step S193 to step S196 shown in FIG. 37 are performed in sequence.

In step S191, the CPU 86a causes the warning device 89 shown in FIG. 5 to provide a warning indicating that a shift system failure has occurred.

In step S192, the CPU 86a restricts the output of the engine 30.

In step S193 shown in FIG. 37, the CPU 86a causes the actuator 70 to change the transmission ratio of the transmission ratio switching mechanism 35 to the low-speed transmission ratio.

In step S194, the CPU 86a calculates a waiting time period. Step S194 is substantially the same as step S79 shown in FIG. 17.

In step S195, the CPU 86a waits for the waiting time period calculated in step S194 to elapse.

In step S196, the CPU 86a determines whether or not the propeller rotational speed is within its normal range. Step S196 is substantially the same as step S82 shown in FIG. 17.

If it is determined in step S196 that the propeller rotational speed is not in its normal range, the process proceeds to step S199. In step S199, the CPU 86a causes the warning device 89 shown in FIG. 5 to provide a warning indicating that a hydraulic pressure source failure has occurred. After the completion of step S199, the sixth control process is terminated.

If it is determined in step S196 that the propeller rotational speed is in its normal range, step S197 and step S198 are performed in sequence.

In step S197, the CPU 86a causes the warning device 89 shown in FIG. 5 to provide a warning indicating that a transmission ratio changing function failure has occurred.

In step S198, the CPU 86a performs normal shift position control. That is, normal shift position change is permitted. After the completion of step S198, the sixth control process is terminated.

As described above, in this preferred embodiment, the pump-side electromagnetic valve 76 is provided in addition to the forward shift connecting electromagnetic valve 74 and the reverse shift connecting electromagnetic valve 73. The pump-side electromagnetic valve 76 can open and close the communication between each of the forward shift connecting electromagnetic valve 74 and the reverse shift connecting electromagnetic valve 73 and the oil pump 71. This increases the options in the selection of the shift position when a failure has occurred in either the forward shift connecting electromagnetic valve 74 or the reverse shift connecting electromagnetic valve 73. This allows the shift position switching mechanism 36 to move during maneuvering when a failure has occurred.

Specifically, when a failure condition has occurred in which either the first shift switching hydraulic clutch 62 or the second shift switching hydraulic clutch 61 is locked, for example, a shift position change between forward or reverse and neutral can be accomplished.

Also, in this preferred embodiment, even when a failure has occurred in the transmission ratio switching mechanism 35, a shift position change is permitted. Thus, even when the transmission ratio switching mechanism 35 has a failure, the vessel 1 can still run.

Specifically, even when a failure condition in which the first shift switching hydraulic clutch 62 is locked in the disengaged state is detected, a shift position change between reverse and neutral can be accomplished by opening the pump-side electromagnetic valve 76 and opening or closing the reverse shift connecting electromagnetic valve 73. Even when a failure condition in which the first shift switching hydraulic clutch 62 is locked in the engaged state is detected, a shift position change between forward and neutral can be accomplished by opening the reverse shift connecting electromagnetic valve 73 and opening or closing the pump-side electromagnetic valve 76.

Even when a failure condition in which the second shift switching hydraulic clutch 61 is locked in the disengaged state is detected, a shift position change between forward and neutral can be accomplished by opening the pump-side electromagnetic valve 76 and opening or closing the forward shift connecting electromagnetic valve 74. Even when a failure condition in which the second shift switching hydraulic clutch 61 is locked in the engaged state is detected, a shift position change between reverse and neutral can be accomplished by opening the forward shift connecting electromagnetic valve 74 and opening or closing the pump-side electromagnetic valve 76.

The method for detecting a locking failure of the first shift switching hydraulic clutch 62 and the second shift switching hydraulic clutch 61 is not particularly limited. For example, it may be determined that a locking failure has occurred in the first shift switching hydraulic clutch 62 or the second shift switching hydraulic clutch 61 by detecting a locking failure of the forward shift connecting electromagnetic valve 74 or the reverse shift connecting electromagnetic valve 73.

For example, when a failure condition in which the forward shift connecting electromagnetic valve 74 is locked in the open state is detected, it may be determined that the first shift switching hydraulic clutch 62 is locked in the engaged state. When a failure condition in which the forward shift connecting electromagnetic valve 74 is locked in the closed state is detected, it may be determined that the first shift switching hydraulic clutch 62 is locked in the disengaged state.

When a failure condition in which the reverse shift connecting electromagnetic valve 73 is locked in the open state is detected, it may be determined that the second shift switching hydraulic clutch 61 is locked in the engaged state. When a failure condition in which the reverse shift connecting electromagnetic valve 73 is locked in the closed state is detected, it may be determined that the second shift switching hydraulic clutch 61 is locked in the disengaged state.

Also, the locking failure of the first shift switching hydraulic clutch 62 or the second shift switching hydraulic clutch 61 may be detected based on the engine rotational speed and the propeller rotational speed, for example.

In addition, because of step S17 in FIG. 9, the engine 30 is prevented from being started unless the shift position switching mechanism 36 is in neutral. Thus, the engine 30 cannot be started if the shift position switching mechanism 36 is in forward or reverse.

Also, because of step S38 and step S39 shown in FIG. 12, the electric power source cannot be turned off unless the shift position switching mechanism 36 is in neutral. Thus, the electric power source cannot be definitely turned off unless the shift position switching mechanism 36 is in neutral.

For example, if the interlocking mechanism 38 also has the function of a shift position switching mechanism as in the outboard motor described in JP-A-2006-264361, the propeller rotational speed sensor should be located closer to the propeller 41 than the interlocking mechanism. Thus, there is no choice but to position the propeller rotational speed sensor in a location which is positioned in water when the vessel 1 is running. Thus, the propeller rotational speed sensor is difficult to install. In addition, when the propeller rotational speed sensor is located closer to the propeller than the interlocking mechanism, what is called the shell-shaped portion tends to increase in size. Therefore, the propulsion resistance of the outboard motor tends to increase.

In this preferred embodiment, however, the shift position switching mechanism 36 is located at a higher position than the interlocking mechanism 38 as shown in FIG. 1. Thus, the propeller rotational speed sensor 90 can be located at a higher position than the interlocking mechanism 38. As a result, the propeller rotational speed sensor 90 can be positioned easily.

Also, the propeller rotational speed sensor 90 can be located at a higher position than the shell-shaped portion 12 shown in FIG. 1. Thus, an increase in the propulsion resistance of the outboard motor 20 can be prevented.

In addition, the influence of water on the propeller rotational speed sensor 90 can be reduced.

Especially in this preferred embodiment, the propeller rotational speed sensor 90 is housed in the shift case 45 of the shift mechanism 34. Thus, the influence of water on the propeller rotational speed sensor 90 can be much smaller.

In addition, in this preferred embodiment, the shift case 45 is filled with oil. Thus, the influence of water on the propeller rotational speed sensor 90 can be particularly smaller.

In this preferred embodiment, the pump-side electromagnetic valve 76 shown in FIG. 4 preferably is a normally low electromagnetic valve, for example. Thus, when the electric power source is off, no hydraulic pressure is applied to the hydraulic cylinders 53a, 61a, and 62a. Therefore, when the electric power source is off, the hydraulic clutches 53, 61, and 62 can be reliably maintained in the disengaged state.

Modifications

Figure 38:
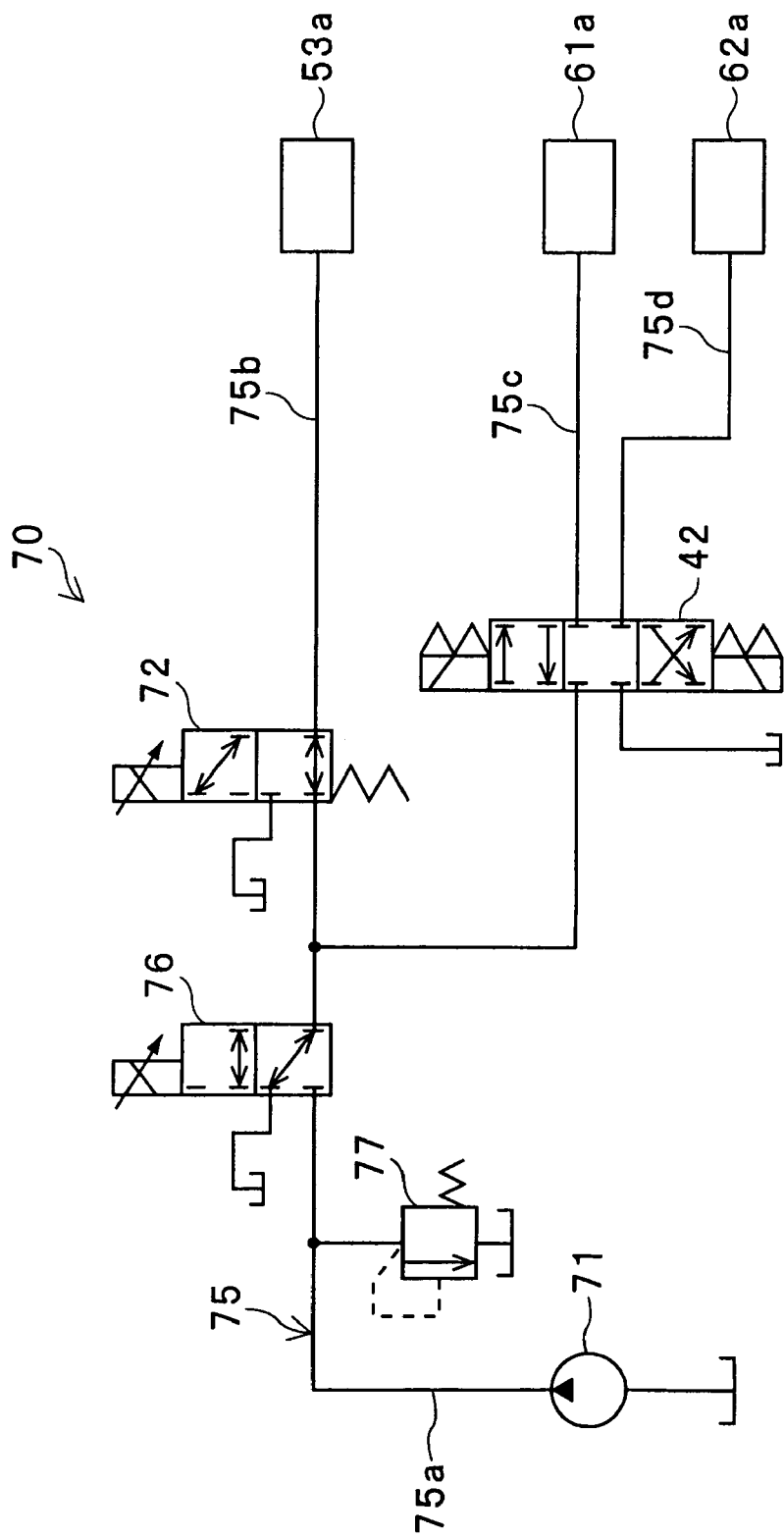
FIG. 38 is an oil circuit diagram according to a first modification of a preferred embodiment of the present invention.

In the above preferred embodiment, an example in which the reverse shift connecting electromagnetic valve 73 and the forward shift connecting electromagnetic valve 74 are provided separately is described. In the present invention, however, the reverse shift connecting electromagnetic valve 73 and the forward shift connecting electromagnetic valve 74 may be defined by one electromagnetic valve. For example, as shown in FIG. 38, an electromagnetic valve 42 may adjust the flow passage area of both the third oil passage and the fourth oil passage.

Figure 39:
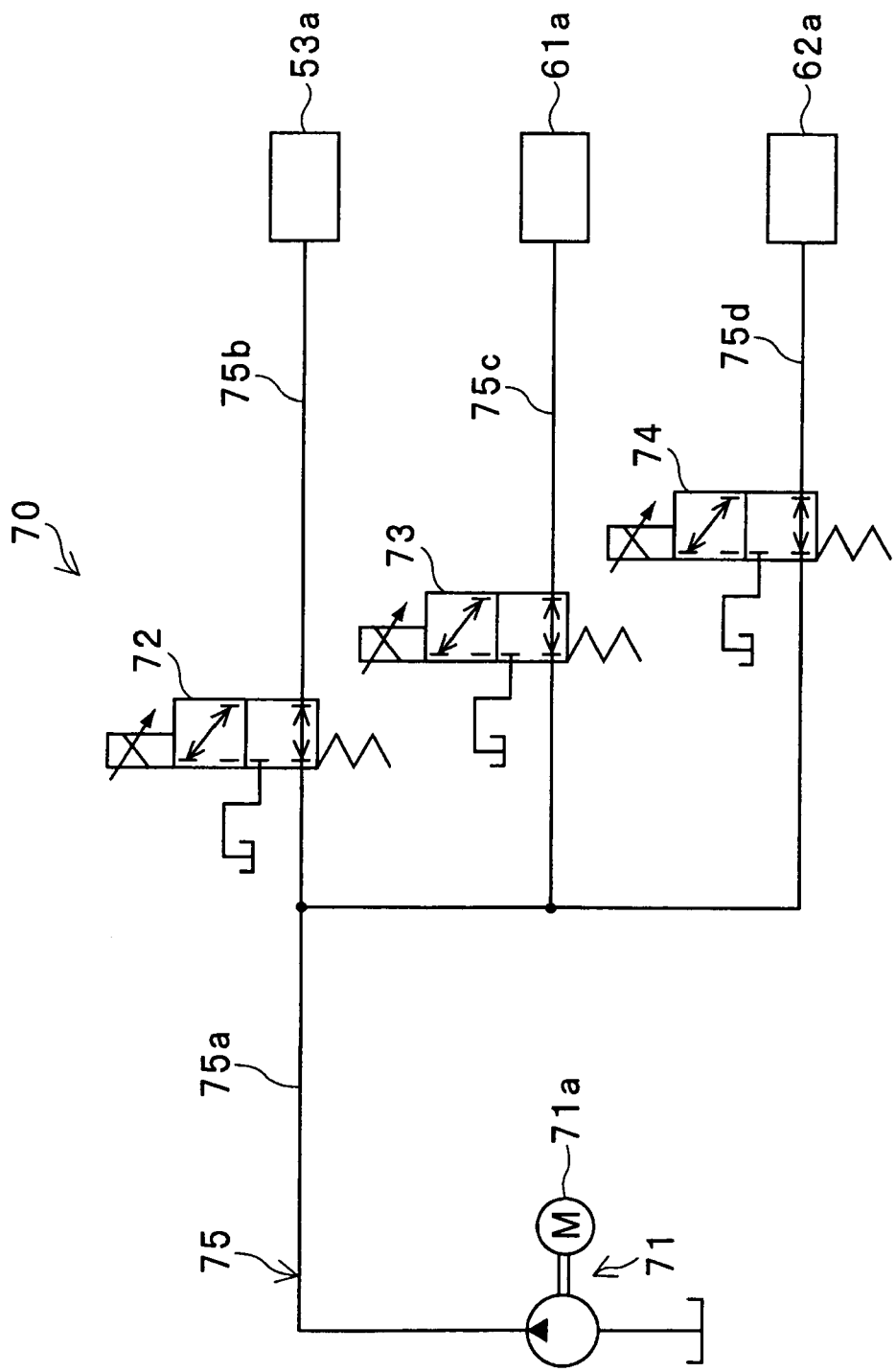
FIG. 39 is an oil circuit diagram according to a second modification of a preferred embodiment of the present invention.

Also, in the above preferred embodiment, an example in which the oil pump 71 is driven by the engine 30 is described. However, the oil pump 71 may be driven by a power source other than the engine 30. For example, the oil pump 71 may be driven by a motor 71a as shown in FIG. 39. In this case, the motor 71a can be controlled irrespective of the driving state of the engine 30. Thus, there is not necessarily a need to provide the relief valve 77 and the pump-side electromagnetic valve 76 shown in FIG. 4 as shown in FIG. 39.

In the above preferred embodiment, an example in which the pump-side electromagnetic valve 76 preferably is a normally low electromagnetic valve and each of the electromagnetic valves 72 to 74 preferably is a normally high electromagnetic valve is described. In the present invention, however, the electromagnetic valves 72 to 74 and 76 are not particularly limited.

Figure 40:
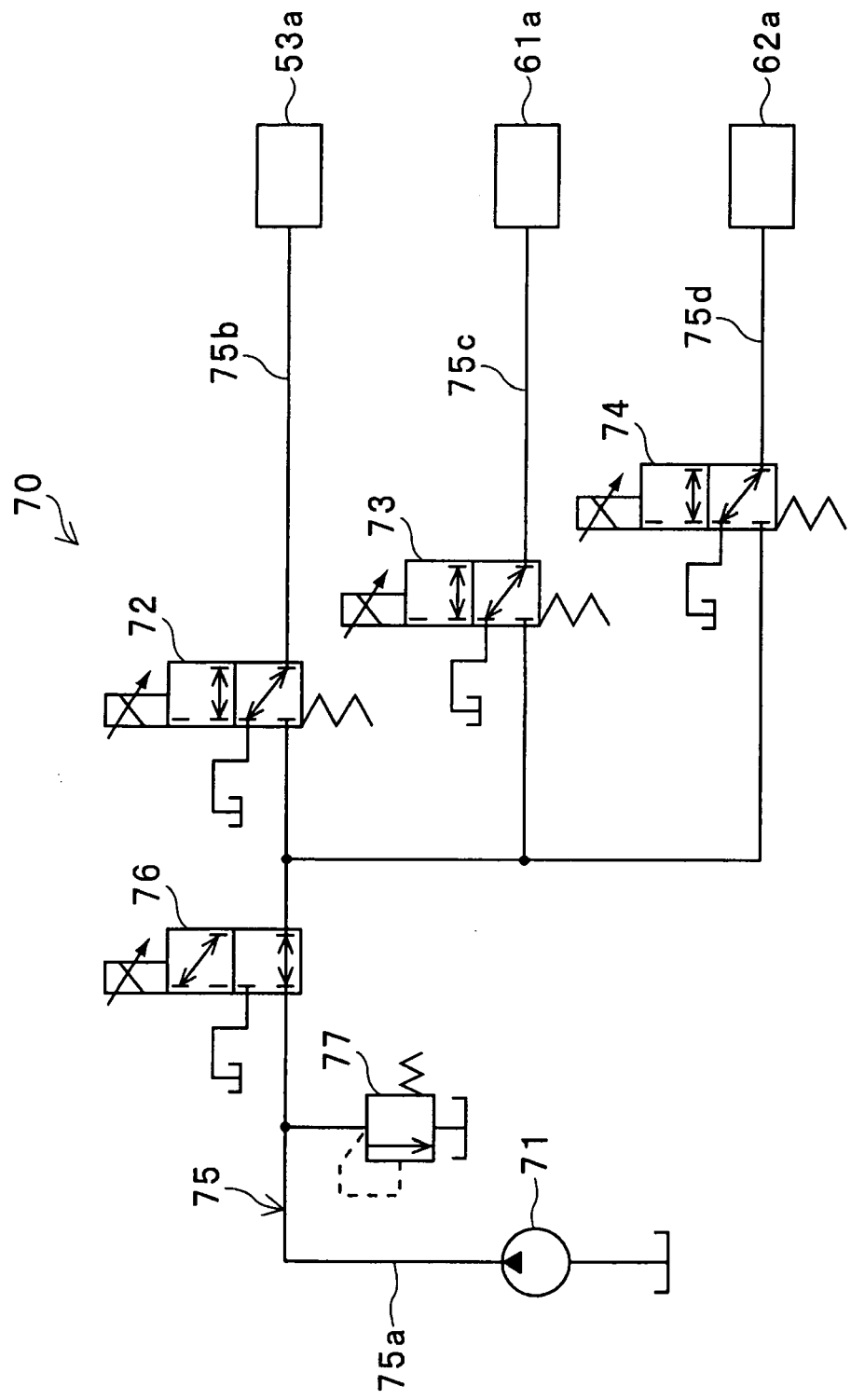
FIG. 40 is an oil circuit diagram according to a third modification of a preferred embodiment of the present invention.

For example, the pump-side electromagnetic valve 76 may preferably be a normally high electromagnetic valve and each of the electromagnetic valve 72 to 74 may preferably be a normally low electromagnetic valve as shown in FIG. 40. Also, all of the pump-side electromagnetic valve 76 and the electromagnetic valve 72 to 74 may preferably be normally high or normally low electromagnetic valves.

When the electromagnetic valves 72 to 74 are normally low electromagnetic valves as shown in FIG. 40, no hydraulic pressure is applied to the hydraulic cylinders 53a, 61a, and 62a when the electric power source is off. Therefore, when the electric power source is off, the hydraulic clutches 53, 61 and 62 can be reliably maintained in the disengaged state.

In the above preferred embodiment, a map for use in controlling the transmission ratio switching mechanism 35 and a map for use in controlling the shift position switching mechanism 36 are preferably stored in the memory 86b in the ECU 86 mounted in the outboard motor 20. Also, control signals for use in controlling the electromagnetic valves 72, 73, and 74 are preferably output from the CPU 86a in the ECU 86 mounted in the outboard motor 20.

However, the present invention is not limited to this configuration. For example, the controller 82 mounted on the hull 10 is provided with a memory as a storage section and a CPU as a computing section in addition to or instead of the memory 86b and the CPU 86a. In this case, the map for use in controlling the transmission ratio switching mechanism 35 and the map for use in controlling the shift position switching mechanism 36 may be stored in the memory provided in the controller 82. Also, the control signals for use in controlling the electromagnetic valves 72, 73 and 74 may be output from the CPU provided in the controller 82.

In the above preferred embodiment, an example in which the ECU 86 preferably controls both the engine 30 and the electromagnetic valves 72, 73, and 74 is described. However, the present invention is not limited to the configuration. For example, an ECU for controlling the engine and an ECU for controlling the electromagnetic valves may be provided separately.

In the above preferred embodiment, an example in which the controller 82 is what is called an "electronically-controlled controller" is described. Here, the term "electronically-controlled controller" means a controller which converts the displacement of the control lever 83 into an electric signal and outputs the electric signal to the LAN 80.

In the present invention, however, the controller 82 may not be an electronically-controlled controller. The controller 82 may be what is called a mechanical controller, for example. Here, the term "mechanical controller" means a controller which has a control lever and a wire connected to the control lever, and transmits the displacement and the direction of displacement of the control lever to the outboard motor as physical quantities, the displacement and the direction of displacement of the wire.

In the above preferred embodiment, an example in which the shift mechanism 34 has the transmission ratio switching mechanism 35 is described. However, the shift mechanism 34 may not have the transmission ratio switching mechanism 35. For example, the shift mechanism 34 may have only the shift position switching mechanism 36.

The engaging force of a clutch means a value representing the engagement state of the clutch. For example, the expression "the engaging force of the transmission ratio switching hydraulic clutch 53 is 100%" means the state in which the hydraulic cylinder 53a has been driven to bring the plate set 53b into a completely compressed state and the transmission ratio switching hydraulic clutch 53 is therefore in the completely engaged state. On the other hand, for example, the expression "the engaging force of the transmission ratio switching hydraulic clutch 53 is 0%" means the state in which the hydraulic cylinder 53a is not being driven and the plates of the plate set 53b have been separated into a non-compressed state until the transmission ratio switching hydraulic clutch 53 are completely disengaged. Also, for example, the expression "the engaging force of the transmission ratio switching hydraulic clutch 53 is 80%" means the state in which the transmission ratio switching hydraulic clutch 53 is engaged such that the driving torque transmitted from the first power-transmitting shaft 50 as an input shaft to the second power-transmitting shaft 51 as an output shaft or the rotational speed of the second power-transmitting shaft 51 is 80% of that which can be achieved when the hydraulic clutch 53 has been driven to bring the plate set 53b into a completely compressed state and the transmission ratio switching hydraulic clutch 53 is therefore in the completely engaged state, in other words, the transmission ratio switching hydraulic clutch 53 is in a partially engaged position.

In this specification, the expression "the direction of rotation of the propeller 41 is the forward direction" means that the propeller 41 is rotated such that a forward propulsive force is generated by the propeller 41. The expression "the direction of rotation of the propeller 41 is the reverse direction" means that the propeller 41 is rotated such that a reverse propulsive force is generated by the propeller 41.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A marine propulsion system comprising:
a power source to generate rotary force;
a propeller driven by the power source;
a shift position switching mechanism located between the power source and the propeller, having a first hydraulic clutch and a second hydraulic clutch to connect and disconnect the power source and the propeller, and to be switchable among a first shift position in which the first hydraulic clutch is engaged and the second hydraulic clutch is disengaged so that the rotary force from the power source can be transmitted to the propeller as a rotary force in a first rotational direction, a second shift position in which the first hydraulic clutch is disengaged and the second hydraulic clutch is engaged so that the rotary force from the power source can be transmitted to the propeller as a rotary force in a second rotational direction which is opposite the first direction, and a neutral position in which both the first hydraulic clutch and the second hydraulic clutch are disengaged so that the rotary force from the power source cannot be substantially transmitted to the propeller;
an oil pump to generate hydraulic pressure;
a first valve located between the oil pump and the first hydraulic clutch to open and close communication of oil between the oil pump and the first hydraulic clutch;
a second valve located between the oil pump and the second hydraulic clutch to open and close communication of oil between the oil pump and the second hydraulic clutch;
a third valve located between the oil pump and the first and second valves to open and close communication of oil between the oil pump and each of the first valve and the second valve; and
a control device to control the first valve, the second valve, and the third valve.

2. The marine propulsion system according to claim 1, wherein the control device detects a failure of the first valve and the second valve, and disengages the first hydraulic clutch and the second hydraulic clutch by causing the third valve to close the communication of oil between the oil pump and the first and the second valves when a failure of at least one of the first valve and the second valve is detected.

3. The marine propulsion system according to claim 1, wherein the control device detects a failure condition in which the first hydraulic clutch is locked in a disengaged state, and switches the shift position switching mechanism between the second shift position and the neutral position by opening or closing the second valve when a failure condition in which the first hydraulic clutch is locked in a disengaged state is detected.

4. The marine propulsion system according to claim 1, wherein the control device detects a failure condition in which the first hydraulic clutch is locked in an engaged state, and switches the shift position switching mechanism between the first shift position and the neutral position by maintaining the second valve in an open state and opening or closing the third valve when a failure condition in which the first hydraulic clutch is locked in an engaged state is detected.

5. The marine propulsion system according to claim 3, wherein the control device detects a failure condition in which the first valve is locked in an open state and a failure condition in which the first valve is locked in a closed state, determines that the first hydraulic clutch is locked in an engaged state when a failure condition in which the first valve is locked in an open state, and to determines that the first hydraulic clutch is locked in a disengaged state when a failure condition in which the first valve is locked in a closed state.

6. The marine propulsion system according to claim 3, wherein the control device detects a rotational speed of the power source and a rotational speed of the propeller, and detects a failure condition in which the first hydraulic clutch is locked based on the rotational speed of the power source and the rotational speed of the propeller.

7. The marine propulsion system according to claim 1, further comprising:
an electric power source to supply electric power to the control device;
a switch to connect and disconnect the electric power source to and from the control device; and
a shift position detecting section to detect the shift position of the shift position switching mechanism; wherein
the control device prevents starting of the power source in a case where the shift position switching mechanism is in the first shift position or the second shift position when the vessel operator turns on the switch.

8. The marine propulsion system according to claim 1, further comprising:
an electric power source to supply electric power to the control device;
a first electric line to connect the electric power source and the control device;
a second electric line to connect the electric power source and the control device;
a first switch interposed in the first electric line and operable by the vessel operator to connect and disconnect the electric power source to and from the control device;
a second switch interposed in the second electric line to connect and disconnect the electric power source to and from the control device; and
a shift position detecting section to detect the shift position of the shift position switching mechanism; wherein
the control device turns on the second switch when the first switch is turned off, turns off the second switch if the shift position switching mechanism is in the neutral position when the first switch is turned off by the vessel operator, and maintains the second switch in an on state if the shift position switching mechanism is in the first shift position or the second shift position when the first switch is turned off by the vessel operator.

9. The marine propulsion system according to claim 1, wherein the shift position switching mechanism further includes an output shaft to output a rotary force, and the marine propulsion system further comprises:
a propeller shaft to which the propeller is attached and which extends in a different direction from the direction in which the output shaft extends;
an interlocking mechanism located between the output shaft and the propeller shaft to transmit rotation of the output shaft to the propeller shaft; and
a rotational speed detecting section located closer to the power source than the interlocking mechanism to detect a rotational speed of the output shaft.

10. The marine propulsion system according to claim 9, wherein the shift position switching mechanism further includes a casing in which the first hydraulic clutch and the second hydraulic clutch are housed and which is filled with oil, and the rotational speed detecting section is disposed in the casing.

11. The marine propulsion system according to claim 1, further comprising:
a transmission ratio switching mechanism located between the power source and the propeller to switch a transmission ratio between the power source and the propeller between a high-speed transmission ratio and a low-speed transmission ratio; wherein
the control device detects a failure of the transmission ratio switching mechanism, and prevents driving of the transmission ratio switching mechanism and continuously controls the first valve, the second valve, and the third valve when a failure of the transmission ratio switching mechanism is detected.

12. The marine propulsion system according to claim 1, wherein the third valve is closed when no voltage is applied hereto.

13. The marine propulsion system according to claim 1, wherein each of the first valve and the second valve is closed when no voltage is applied thereto.

* * * * *